US007053227B2

(12) United States Patent
Jaeger et al.

(10) Patent No.: US 7,053,227 B2
(45) Date of Patent: May 30, 2006

(54) METHODS FOR MAKING COLORANT COMPOUNDS

(75) Inventors: C. Wayne Jaeger, Beaverton, OR (US); Jeffery H. Banning, Hillsboro, OR (US)

(73) Assignee: Xerox Corporation, Stamford, CT (US)

( * ) Notice: Subject to any disclaimer, the term of this patent is extended or adjusted under 35 U.S.C. 154(b) by 217 days.

(21) Appl. No.: 10/260,379

(22) Filed: Sep. 27, 2002

(65) Prior Publication Data

US 2004/0082801 A1    Apr. 29, 2004

(51) Int. Cl.
*C09B 1/16*    (2006.01)
(52) U.S. Cl. ...................... 552/247; 552/243
(58) Field of Classification Search ............... 560/155; 556/247, 243
See application file for complete search history.

(56) References Cited

U.S. PATENT DOCUMENTS

| | | | | |
|---|---|---|---|---|
| 2,756,234 | A | 7/1956 | Elslager | |
| 3,076,808 | A | 2/1963 | Blout et al. | |
| 3,324,131 | A | 6/1967 | Genta | |
| 3,653,932 | A | 4/1972 | Berry et al. | 106/22 |
| 3,734,934 | A * | 5/1973 | Kolliker et al. | 552/249 |
| 3,793,349 | A * | 2/1974 | Johnson et al. | 552/248 |
| 4,390,369 | A | 6/1983 | Merritt et al. | 106/31 |
| 4,484,948 | A | 11/1984 | Merritt et al. | 106/31 |
| 4,684,956 | A | 8/1987 | Ball | 346/1.1 |
| 4,775,760 | A | 10/1988 | Pruett et al. | |
| 4,851,045 | A | 7/1989 | Taniguchi | 106/31 |
| 4,889,560 | A | 12/1989 | Jaeger et al. | 106/27 |
| 4,889,761 | A | 12/1989 | Titterington et al. | 428/195 |
| 5,006,170 | A | 4/1991 | Schwarz et al. | 106/20 |
| 5,151,120 | A | 9/1992 | You et al. | 106/27 |
| 5,221,335 | A | 6/1993 | Williams et al. | 106/23 |
| 5,372,852 | A | 12/1994 | Titterington et al. | 427/288 |
| 5,496,879 | A | 3/1996 | Griebel et al. | 524/320 |

(Continued)

FOREIGN PATENT DOCUMENTS

BE    680 765    11/1966

(Continued)

OTHER PUBLICATIONS

Copending Application U.S. Appl. No. 10/260,146, filed on Sep. 27, 2002, entitled "Colorant Compounds," by Banning et al.

(Continued)

*Primary Examiner*—Samuel Barts
(74) *Attorney, Agent, or Firm*—Judith L. Byorick

(57) ABSTRACT

A process for preparing a colorant of the formula

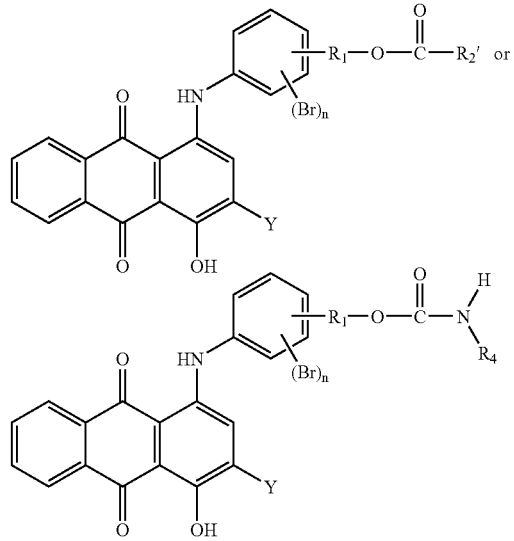

which comprises preparing a first reaction mixture by admixing leucoquinizarin and, optionally, quinizarin, an aminobenzene substituted with an alcohol group of the formula —$R_1$—OH, boric acid, and an optional solvent, and heating the first reaction mixture to prepare an alcohol-substituted colorant of the formula

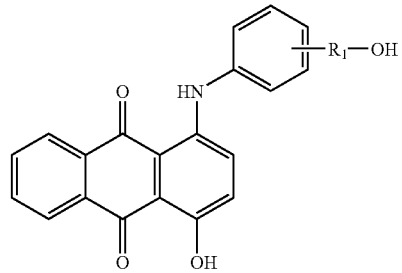

followed by converting the colorant thus prepared to either an ester-substituted colorant by reaction with an esterification compound which is either an anhydride of the formula

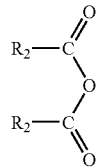

or an acid of the formula $R_2COOH$ in the presence of an optional esterification catalyst or a urethane-substituted colorant by reaction with an isocyanate compound of the formula

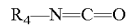
$R_4$—N=C=O and brominating the colorant thus prepared, wherein either conversion to ester or urethane can be performed before bromination or bromination can be performed before conversion to ester or urethane.

73 Claims, No Drawings

U.S. PATENT DOCUMENTS

| | | | |
|---|---|---|---|
| 5,507,864 A | 4/1996 | Jaeger et al. | 106/22 |
| 5,621,022 A | 4/1997 | Jaeger et al. | 523/161 |
| 5,902,841 A | 5/1999 | Jaeger et al. | 523/161 |
| 6,174,937 B1 | 1/2001 | Banning et al. | 523/160 |
| 6,235,094 B1 | 5/2001 | Banning et al. | 106/31.29 |
| 6,395,078 B1 | 5/2002 | Jaeger | 106/31.44 |
| 6,422,695 B1 | 7/2002 | Jaeger | 347/88 |

FOREIGN PATENT DOCUMENTS

| | | |
|---|---|---|
| CA | 2 355 533 | 2/2002 |
| EP | 0 187 352 | 7/1985 |
| EP | 0 206 286 | 12/1986 |
| EP | 0 661 350 A1 | 7/1995 |
| EP | 1 403 327 A1 | 3/2001 |
| EP | 1 182 232 | 2/2002 |
| FR | 1 466 923 | 1/1967 |
| FR | 1 480 010 | 5/1967 |
| FR | 2 116 490 | 7/1972 |
| GB | 652448 | 4/1951 |
| GB | 687 807 | 2/1953 |
| GB | 2 021 138 | 5/1978 |
| WO | WO 94/04619 | 3/1994 |

OTHER PUBLICATIONS

Copending Application U.S. Appl. No. 10/260,376, filed on Sep. 27, 2002, entitled "Phase Change Inks," by Jaeger et al.
English Abstract for German Patent Publication DE 4205636.
English Abstract for German Patent Publication DE 4205713.
English Abstract for Japanese Patent Publication JP 2002129044.
R. Butnaru et al., Researches on Dyeing of Cotton Fabrics with Acid Dyestuffs, Concomitantly with Crease-Resist Treatments, *Cellulose Chem. Technol.*, 29, p. 471 (1995).
English Abstract for JP 63 223064 A Sep. 16, 1988.
English translation of Japanese reference. 63223004 Sep. 16, 1988.
Oriental Chem Ind Co., JP 48 085633. Nov. 13, 1973 Derwent Publications Ltd. Section Ch, Week 197423.
Nippon Kayaku KK, Jp 49 030419, Mar. 18, 1974, Derwent Publications Ltd. Section Ch, Week 197447.
English abstract for JP 63 235371.

\* cited by examiner

METHODS FOR MAKING COLORANT COMPOUNDS

CROSS-REFERENCE IS MADE TO THE FOLLOWING COPENDING APPLICATIONS

Copending application U.S. Ser. No. 10/260,146, filed concurrently herewith, entitled "Colorant Compounds," with the named inventors Jeffery H. Banning and C. Wayne Jaeger, the disclosure of which is totally incorporated herein by reference, discloses compounds of the formula

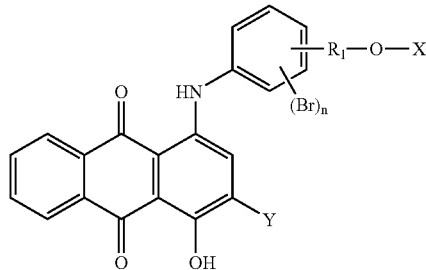

wherein Y is a hydrogen atom or a bromine atom, n is an integer of 0, 1, 2, 3, or 4, $R_1$ is an alkylene group or an arylalkylene group, and X is (a) a hydrogen atom, (b) a group of the formula

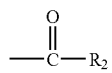

wherein $R_2$ is an alkyl group, an aryl group, an arylalkyl group, or an olkylaryl group (c) an alkyleneoxy, aryleneoxy, arylalkyleneoxy, or alkylaryleneoxy group, or (d) a group of the formula

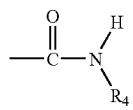

wherein $R_4$ is an alkyl group, an aryl group, on arylalkyl group, or an alkylaryl group.

Copending application U.S. Ser. No. 10/260,376, filed concurrently herewith, entitled "Phase Change Inks," with the named inventors C. Wayne Jaeger and Jeffery H. Banning, the disclosure of which is totally incorporated herein by reference, discloses a phase change ink composition comprising a phase change ink carrier and a colorant compound of the formula

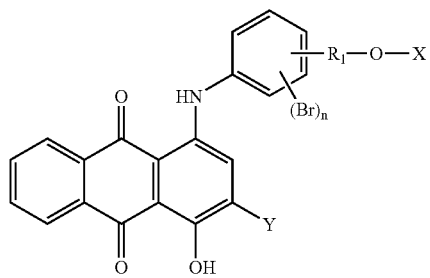

wherein Y is a hydrogen atom or a bromine atom, n is an integer of 0, 1, 2, 3, or 4, $R_1$ is an alkylene group or an arylalkylene group, and X is (a) a hydrogen atom, (b) a group of the formula

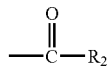

wherein $R_2$ is on alkyl group, an aryl group, an arylalkyl group, or an alkyloryl group, (c) an alkyleneoxy, aryleneoxy, arylalkyleneoxy, or alkylaryleneoxy group, or (d) a group of the formula

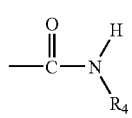

wherein $R_4$ is an alkyl group, an aryl group, an arylalkyl group, or an alkylaryl group.

BACKGROUND OF THE INVENTION

The present invention is directed to methods for preparing colorant compounds. More specifically, the present invention is directed to processes for preparing colorant compounds particularly suitable for use in hot melt or phase change inks. One embodiment of the present invention is directed to a process for preparing a colorant of the formula

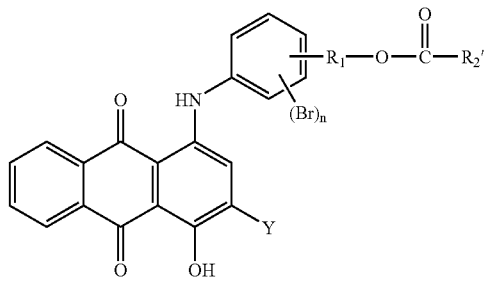

or

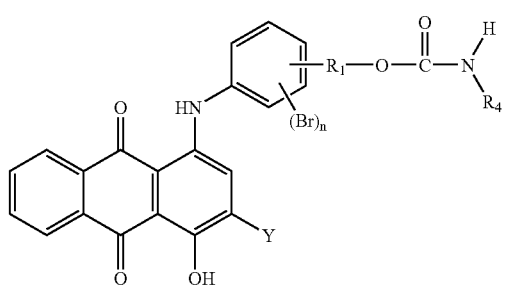

wherein Y is a hydrogen atom or a bromine atom, n is an integer of 0, 1, 2, 3, or 4, $R_1$ is an alkylene group or an arylalkylene group, $R_2$ is an alkyl group, an aryl group, an arylalkyl group, or an alkylaryl group, and $R_4$ is an alkyl group, an aryl group, an arylalkyl group, or an alkylaryl group, can be prepared by a process which comprises (a)

preparing a first reaction mixture by admixing (1) leucoquinizarin and, optionally, quinizarin, (2) an aminobenzene substituted with an alcohol group of the formula —R$_1$—OH, (3) boric acid, and (4) an optional solvent, and heating the first reaction mixture to prepare an alcohol-substituted colorant of the formula

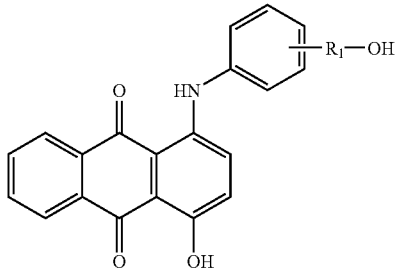

followed by (b) converting the colorant thus prepared to either (i) an ester-substituted colorant by reaction with an esterification compound which is either (A) an anhydride of the formula

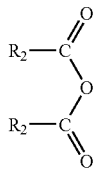

or (B) an acid of the formula R$_2$COOH in the presence of an optional esterification catalyst, or (ii) a urethane-substituted colorant by reaction with an isocyanate compound of the formula

R$_4$—N=C=O and (c) brominating the colorant thus prepared, wherein either conversion to ester or urethane can be performed before bromination or bromination can be performed before conversion to ester or urethane.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking and industrial marking and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 6,395,078 (Jaeger), U.S. Pat. No. 6,422,695 (Jaeger), Canadian Patent Publication 2 355 533 (filed Aug. 20, 2001, published Feb. 23, 2002), European Patent Publication EP 1 182 232 (filed Aug. 17, 2001, published Feb. 27, 2001), Japanese Patent Publication JP 2002129044 (filed Aug. 8, 2001, published May 9, 2002), Brazilian Patent Publication P101035819 (filed Aug. 22, 2001, published Mar. 26, 2002), and Mexican Patent Application 2001008418 (filed Aug. 20, 2001), the disclosures of each of which are totally incorporated herein by reference, disclose a compound having the formula

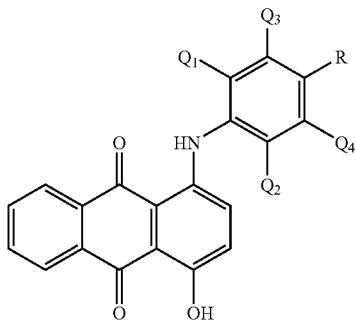

wherein at least one $Q_1$, $Q_2$, $Q_3$, and $Q_4$ is a halogen atom and any of $Q_1$, $Q_2$, $Q_3$ and $Q_4$ which is not a halogen atom is a hydrogen atom; and wherein R comprises at least two carbon atoms. The invention further encompasses inclusion of such compound into phase change ink carrier compositions, as well as printing methods utilizing such compound.

British Patent Publication GB 2 021 138 (Hohmann et al.), the disclosure of which is totally incorporated herein by reference, discloses mixtures of dyestuffs of the formula

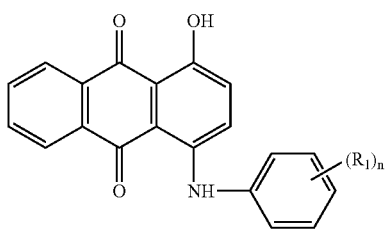

and of the formula

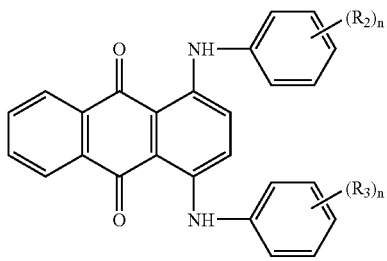

wherein $R_1$, $R_2$, and $R_3$ denote $C_1$–$C_4$ alkyl, $C_1$–$C_4$ alkoxy, or halogen, and n denotes 2 or 3, which are suitable for dyeing polyester fibers by the exhaustion process. Dark blue and navy blue dyeings with good fastness properties are obtained.

U.S. Pat. No. 6,174,937 (Banning et al.), the disclosure of which is totally incorporated herein by reference, discloses a phase change ink comprising a material of the formula

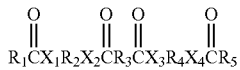

wherein $X_1$, $X_2$, $X_3$ and $X_4$ are segments comprising atoms selected from groups V and VI of the periodic table; wherein at least one $R_1$ and $R_5$ comprises at least 37 carbon units; and wherein $R_2$, $R_3$ and $R_4$ each comprise at least one carbon unit. The invention further encompasses a composition of matter, as well as methods of reducing coefficients of friction of phase change ink formulations.

U.S. Pat. No. 5,507,864 (Jaeger et al.), the disclosure of which is totally incorporated herein by reference, discloses a phase change ink composition that includes a combination of different dye types such as an anthraquinone dye and a xanthene dye, which is most preferably a rhodamine dye. While each dye type is insufficiently soluble with respect to favored carrier compositions to preserve color saturation in reduced ink quantity prints, the dye type combination permits increased dye loading and maintains print quality. In a preferred embodiment of the invention, a favored carrier composition is adjusted to promote the colored form of a preferred rhodamine dye (C.I. Solvent Red 49) and mixed with a preferred anthraquinone dye (C.I. Solvent Red 172) whose concentration is kept below a critical level to prevent post printed blooming. The resulting preferred phase change ink compositions provide a magenta phase change ink with enhanced light fastness and color saturation, as well as good compatibility with preferred existing subtractive primary color phase change inks.

U.S. Pat. No. 5,902,841 (Jaeger et al.), the disclosure of which is totally incorporated herein by reference, discloses a phase change ink composition wherein the ink composition utilizes a colorant in combination with a selected phase change ink carrier composition containing at least one hydroxy-functional fatty amide compound.

R. Butnaru et al., "Researches on Dyeing of Cotton Fabrics with Acid Dyestuffs, Concomitantly with Crease-Resist Treatments," *Cellulose Chem. Technol.*, 29, p. 471 (1995), the disclosure of which is totally incorporated herein by reference, discloses an analysis of the results obtained on dyeing of cotton cellulosic fabrics with acid dyestuffs, on employing crease-resist agents with polyfunctional structure. The conclusion was reached that no chemical or physical bonds occur between dyestuffs and the fiber, the dyestuffs being fixed onto the resin's aminic groups formed as a result of the thermal, crease-resist treatment. Washing resistance of the cellulosic materials thus dyed attained the values obtained as a result of dyeing with direct dyestuffs, specific for these types of fibers.

U.S. Pat. No. 6,235,094 (Banning et al.), the disclosure of which is totally incorporated herein by reference, discloses a compound having the formula

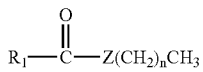

wherein $R_1$, Z and the carbonyl can be comprised by a common ring, wherein $R_1$ comprises a chromophore that absorbs light from the visible wavelength range, and wherein n is an integer that is at least 12. The invention also encompasses a solid phase change ink composition. Such composition includes a phase change ink carrier and a colorant. The colorant comprises a chromophore that absorbs light from the visible wavelength range, and has the formula

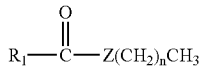

wherein $R_1$, Z and the carbonyl can be comprised by a common ring, wherein n is an integer that is at least 12. Additionally, the invention encompasses a method of forming a colorant. A first compound having the formula

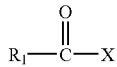

is reacted with a second compound having the formula $Z(CH_2)_nCH_3$, wherein n is an integer that is at least 12, to form a third compound having the formula

wherein the third compound comprises a chromophore that absorbs light from the visible wavelength range.

While known compositions and processes are suitable for their intended purposes, a need remains for improved colorant compounds. In addition, a need remains for colorant compositions particularly suitable for use in phase change inks. Further, a need remains for colorant compounds with a desirable magenta color. Additionally, a need remains for colorant compounds with desirable thermal stability. There is also a need for colorant compounds with good lightfastness. In addition, there is a need for colorant compounds that exhibit desirable solubility characteristics in phase change ink carrier compositions. Further, there is a need for colorant compounds that, when incorporated into phase change inks, exhibit reduced migration within a layer of printed ink. Additionally, there is a need for colorant compounds that, when incorporated into phase change inks, exhibit reduced crystallization within a layer of printed ink. A need also remains for colorant compounds that, when incorporated into phase change inks, enable production of prints that maintain uniform color over long periods of time without unevenness or blotching. In addition, a need remains for colorant compounds that, when incorporated into phase change inks, enable production of prints that retain their original color over long periods of time. Further, a need remains for colorant compounds that, when incorporated into phase change inks, enable production of prints that exhibit reduced sensitivity to image discoloration upon contact with human fingertips. Additionally, a need remains for colorant compounds that can be incorporated into phase change inks in desirably high concentrations. There is also a need for colorant compounds that can be manufactured easily and practically. In addition, there is a need for colorant compounds that can easily be converted to derivative molecules thereof.

SUMMARY OF THE INVENTION

The present invention is directed to a process for preparing a colorant of the formula

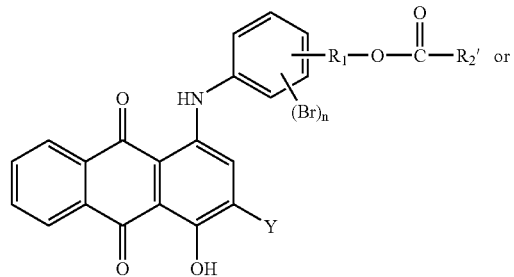

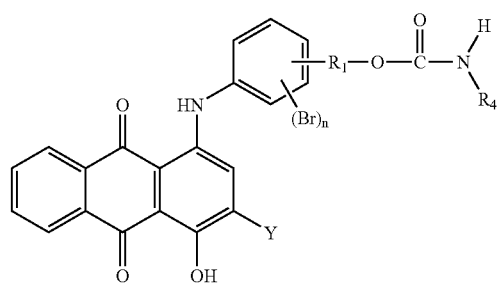

wherein Y is a hydrogen atom or a bromine atom, n is an integer of 0, 1, 2, 3, or 4, $R_1$ is an alkylene group or an arylalkylene group, $R_2$ is an alkyl group, an aryl group, an arylalkyl group, or an alkylaryl group, and $R_4$ is an alkyl group, an aryl group, an arylalkyl group, or an alkylaryl group, can be prepared by a process which comprises (a) preparing a first reaction mixture by admixing (1) leucoquinizarin and, optionally, quinizarin, (2) an aminobenzene substituted with an alcohol group of the formula —$R_1$—OH, (3) boric acid, and (4) an optional solvent, and heating the first reaction mixture to prepare an alcohol-substituted colorant of the formula

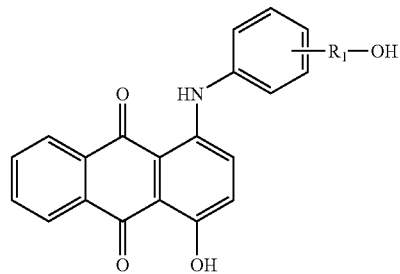

followed by (b) converting the colorant thus prepared to either (i) an ester-substituted colorant by reaction with an esterification compound which is either (A) an anhydride of the formula

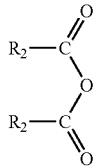

or (B) an acid of the formula $R_2COOH$ in the presence of an optional esterification catalyst, or (ii) a urethane-substituted colorant by reaction with an isocyanate compound of the formula

and (c) brominating the colorant thus prepared, wherein either conversion to ester or urethane can be performed before bromination or bromination can be performed before conversion to ester or urethane.

DETAILED DESCRIPTION OF THE INVENTION

The present invention is directed to processes for preparing colorants of the formula

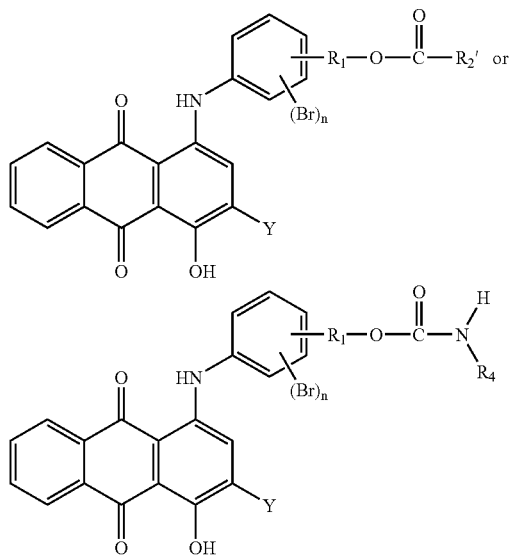

wherein Y is a hydrogen atom or a bromine atom, n is an integer of 0, 1, 2, 3, or 4, $R_1$ is an alkylene group or an arylalkylene group, $R_2$ is an alkyl group, an aryl group, an arylalkyl group, or an alkylaryl group, and $R_4$ is an alkyl group, an aryl group, an arylalkyl group, or an alkylaryl group, can be prepared by a process which comprises (a) preparing a first reaction mixture by admixing (1) leucoquinizarin and, optionally, quinizarin, (2) an aminobenzene substituted with an alcohol group of the formula —$R_1$—OH, (3) boric acid, and (4) an optional solvent, and heating the first reaction mixture to prepare an alcohol-substituted colorant of the formula

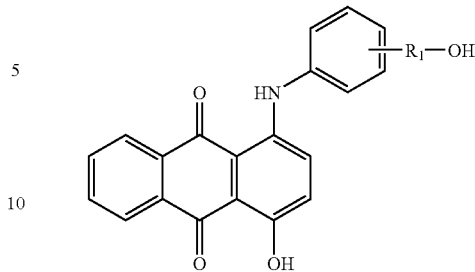

followed by (b) converting the colorant thus prepared to either (i) an ester-substituted colorant by reaction with an esterification compound which is either (A) an anhydride of the formula

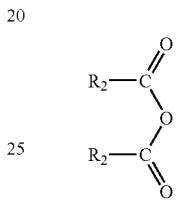

or (B) an acid of the formula $R_2COOH$ in the presence of an optional esterification catalyst, or (ii) a urethane-substituted colorant by reaction with an isocyanate compound of the formula

and (c) brominating the colorant thus prepared, wherein either conversion to ester or urethane can be performed before bromination or bromination can be performed before conversion to ester or urethane.

More specifically, Y is a hydrogen atom or a bromine atom, n is an integer of 0, 1, 2, 3, or 4, $R_1$ is an alkylene group (including linear, branched, saturated, unsaturated, cyclic, and unsubstituted alkylene groups, and wherein hetero atoms, such as oxygen, nitrogen, sulfur, silicon, phosphorus, and the like either may or may not be present in the alkylene group), in one embodiment with at least about 1 carbon atom, and in another embodiment with at least about 2 carbon atoms, and in one embodiment with no more than about 50 carbon atoms, in another embodiment with no more than about 20 carbon atoms, in yet another embodiment with no more than about 6 carbon atoms, and in still another embodiment with no more than about 2 carbon atoms, although the number of carbon atoms can be outside of these ranges, or an arylalkylene group (including unsubstituted and substituted arylalkylene groups, and wherein hetero atoms, such as oxygen, nitrogen, sulfur, silicon, phosphorus, and the like either may or may not be present in either or both of the alkyl portion and the aryl portion of the arylalkylene group), in one embodiment with at least about 6 carbon atoms, and in another embodiment with at least about 7 carbon atoms, and in one embodiment with no more than about 50 carbon atoms, in another embodiment with no more than about 20 carbon atoms, in yet another embodiment with no more than about 7 carbon atoms, although the number of carbon atoms can be outside of these ranges, $R_2$ is an alkyl group (including linear, branched, saturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least about 1 carbon atom, in another embodiment with at least about 2 carbon atom, in another embodiment with at least about 4 carbon atoms, in yet another embodiment with at least about 6 carbon atoms, in still another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in still another embodiment with at least about 38 carbon atoms, in another embodiment with at least about 40 carbon atoms, in yet another embodiment with at least about 42 carbon atoms, in still another embodiment with at least about 44 carbon atoms, in another embodiment with at least about 46 carbon atoms, in yet another embodiment with at least about 48 carbon atoms, and in still another embodiment with at least about 50 carbon atoms, and in one embodiment with no more than about 100 carbon atoms, in another embodiment with no more than about 70 carbon atoms, in yet another embodiment with no more than about 60 carbon atoms, and in still another embodiment with no more than about 50 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in still another embodiment with at least about 38 carbon atoms, in another embodiment with at least about 40 carbon atoms, in yet another embodiment with at least about 42 carbon atoms, in still another embodiment with at least about 44 carbon atoms, in another embodiment with at least about 46 carbon atoms, in yet another embodiment with at least about 48 carbon atoms, and in still another embodiment with at least about 50 carbon atoms, and in one embodiment with no more than about 100 carbon atoms, in another embodiment with no more than about 75 carbon atoms, in yet another embodiment with no more than about 60 carbon atoms, and in still another embodiment with no more than about 50 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, in another embodiment with at least about 7 carbon atoms, in yet another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, in still another embodiment with at least about 42 carbon atoms, in another embodiment with at least about 44 carbon atoms, in yet another embodiment with at least about 46 carbon atoms, in still another embodiment with at least about 48 carbon atoms, and in another embodiment with a t least about 50 carbon atoms, and in one embodiment with no more than about 200 carbon atoms, in another embodiment with no more than about 100 carbon atoms, in yet another embodiment with no more than about 60 carbon atoms, and in still another embodiment with no more than about 50 carbon atoms, although the number of carbon atoms can be outside of these ranges, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, in another embodiment with at least about 7 carbon atoms, in yet another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, in still another embodiment with at least about 42 carbon atoms, in another embodiment with at least about 44 carbon atoms, in yet another embodiment with at least about 46 carbon atoms, in still another embodiment with at least about 48 carbon atoms, and in another embodiment with at least about 50 carbon atoms, and in one embodiment with no more than about 200 carbon atoms, in another embodiment with no more than about 100 carbon atoms, in yet another embodiment with no more than about 60 carbon atoms, and in still another embodiment with no more than about 50 carbon atoms, although the number of carbon atoms can be outside of these ranges, and $R_4$ is an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least about 1 carbon atom, in another embodiment with at least about 2 carbon atoms, in another embodiment with at least about 4 carbon atoms, in yet another embodiment with at least about 6 carbon atoms, in still another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in still another embodiment with at least about 38 carbon atoms, in another embodiment with at least about 40 carbon atoms, in yet another embodiment with at least about 42 carbon atoms, in still another embodiment with at least about 44 carbon atoms, in another embodiment with at least about 46 carbon atoms, in yet another embodiment with at least about 48 carbon atoms, and in still another embodiment with at least about 50 carbon atoms, and in one embodiment with no more than about 100 carbon atoms, in another embodiment with no more than about 70 carbon atoms, in yet another embodiment with no more than about 60 carbon atoms, and in still another embodiment with no more than about 50 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in still another embodiment with at least about 38 carbon atoms, in another embodiment with at least about 40 carbon atoms, in yet another embodiment with at least about 42 carbon atoms, in still another embodiment with at least about 44 carbon atoms, in another embodiment with at least about 46 carbon atoms, in yet another embodiment with at least about 48 carbon atoms, and in still another embodiment with at least about 50 carbon atoms, and in one embodiment with no more than about 100 carbon atoms, in another embodiment with no more than about 75 carbon atoms, in yet another embodiment with no more than about 60 carbon atoms, and in still another embodiment with no more than about 50 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, in another embodiment with at least about 7 carbon atoms, in yet another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, in still another embodiment with at least about 42 carbon atoms, in another embodiment with at least about 44 carbon atoms, in yet another embodiment with at least about 46 carbon atoms, in still another embodiment with at least about 48 carbon atoms, and in another embodiment with at least about 50 carbon atoms, and in one embodiment with no more than about 200 carbon atoms, in another embodiment with no more than about 100 carbon atoms, in yet another embodiment with no more than about 60 carbon atoms, and in still another embodiment with no more than about 50 carbon atoms, although the number of carbon atoms can be outside of these ranges, an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, in another embodiment with at least about 7 carbon atoms, in yet another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, in still another embodiment with at least about 42 carbon atoms, in another embodiment with at least about 44 carbon atoms, in yet another embodiment with at least about 46 carbon atoms, in still another embodiment with at least about 48 carbon atoms, and in another embodiment with a t least about 50 carbon atoms, and in one embodiment with no more than about 200 carbon atoms, in another embodiment with no more than about 100 carbon atoms, in yet another embodiment with no more than about 60 carbon atoms, and in still another embodiment with no more than about 50 carbon atoms, although the number of carbon atoms can be outside of these ranges, wherein the substituents on the substituted alkyl, alkylene, aryl, arylene, arylalkyl, arylalkylene, alkylaryl, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

The above formula encompasses monomeric materials. In addition, the above formula encompasses dimeric materials containing two moieties of the formula

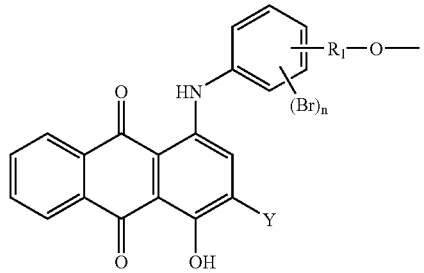

linked by a central X moiety, as follows:

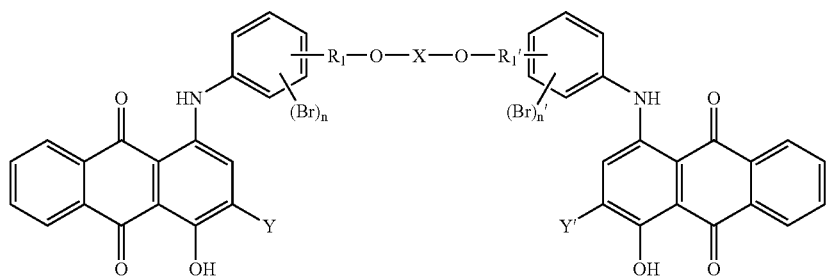

wherein Y and Y' each, independently of the other, is a hydrogen atom or a bromine atom, n and n' each, independently of the other, is an integer of 0, 1, 2, 3, or 4, $R_1$ and $R_1'$ each, independently of the other, is an alkylene group or an arylalkylene group as defined in further detail for the alkylene and arylalkylene $R_1$ groups hereinabove, and X is (a) a group of the formula

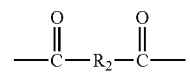

wherein $R_2$ is an alkylene group, an arylene group, an arylalkylene group, or an alkylarylene group as defined in further detail for the alkyl, aryl, arylalkyl, and alkylaryl $R_2$ groups hereinabove, or (b) a group of the formula

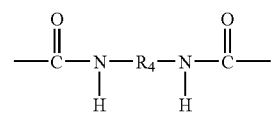

wherein $R_4$ is an alkylene group, an arylene group, an arylalkylene group, or an alkylarylene group as defined in further detail for the alkyl, aryl, arylalkyl, and alkylaryl $R_4$ groups hereinabove. For example, when the colorant material is formed from a diacid starting material of the formula

HOOC—$R_2$—COOH wherein $R_2$ is as defined hereinabove, X is of the formula

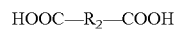

When the colorant material is formed from a diisocyanate starting material of the formula

O=C=N—$R_4$—N=C=O wherein $R_4$ is as defined hereinabove, X is of the formula

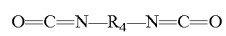

Similarly, the above formula encompasses trimeric, tetrameric, and higher moieties as well as oligomeric materials and polymeric materials, said materials containing three or more moieties of the formula

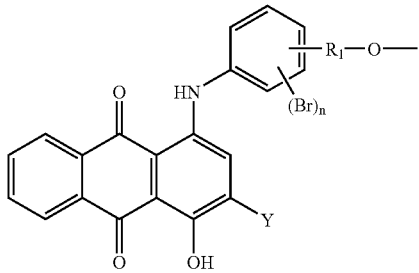

wherein each Y, independently of the others, is a hydrogen atom or a bromine atom, each n, independently of the others, is an integer of 0, 1, 2, 3, or 4, and each $R_1$, independently of the others, is an alkylene group or an arylalkylene group, said moieties being linked by a central atom or group of atoms or bonded to a polymeric chain. These materials can be made by processes analogous to those illustrated herein for the monomeric and dimeric compounds of the present invention.

In one embodiment, colorant compounds of the present invention are prepared by a process for preparing a colorant of the formula

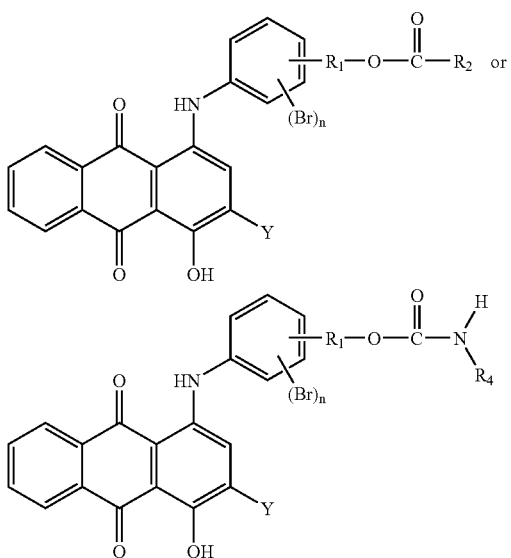

wherein Y is a hydrogen atom or a bromine atom, n is an integer of 0, 1, 2, 3, or 4, $R_1$ is an alkylene group or an arylalkylene group, $R_2$ is an alkyl group, an aryl group, an arylalkyl group, or an alkylaryl group, and $R_4$ is an alkyl group, an aryl group, an arylalkyl group, or an alkylaryl group, can be prepared by a process which comprises (a) preparing a first reaction mixture by admixing (1) leucoquinizarin and, optionally, quinizarin, (2) an aminobenzene substituted with an alcohol group of the formula —$R_1$—OH, (3) boric acid, and (4) an optional solvent, and heating the first reaction mixture to prepare an alcohol-substituted colorant of the formula

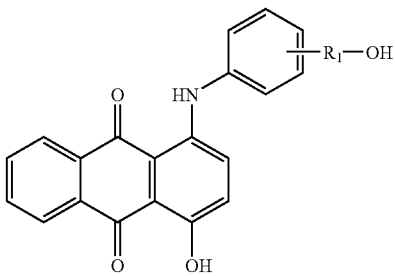

followed by (b) converting the colorant thus prepared to either (i) an ester-substituted colorant by reaction with an esterification compound which is either (A) an anhydride of the formula

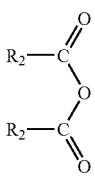

or (B) an acid of the formula $R_2COOH$ in the presence of an optional esterification catalyst, or (ii) a urethane-substituted colorant by reaction with an isocyanate compound of the formula $R_4$—N=C=O and (c) brominating the colorant thus prepared, wherein either conversion to ester or urethane can be performed before bromination or bromination can be performed before conversion to ester or urethane.

In another embodiment, colorant compounds of the present invention are prepared by a process which comprises (a) preparing a first reaction mixture by admixing (1) leucoquinizarin and, optionally, quinizarin, (2) an aminobenzene substituted with an alcohol group of the formula —$R_1$—OH, wherein $R_1$ is an alkylene group or an arylalkylene group, (3) boric acid, and (4) an optional solvent, and heating the first reaction mixture to prepare an alcohol-substituted colorant of the formula

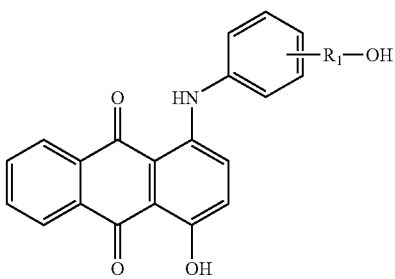

(b) preparing a second reaction mixture by admixing (1) the alcohol-substituted colorant, (2) a solvent, and (3) a first esterification compound which is either (i) an anhydride of the formula

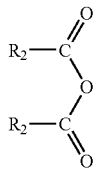

wherein $R_2$ is an alkyl group, an aryl group, an arylalkyl group, or an alkylaryl group, or (ii) an acid of the formula $R_2COOH$ in the presence of an optional esterification catalyst, and heating the second reaction mixture to form a first ester-substituted colorant of the formula

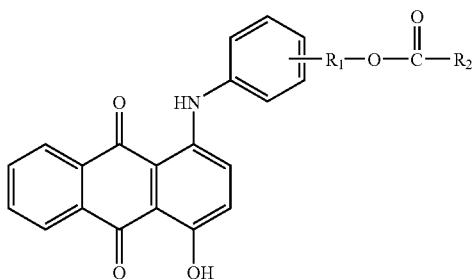

(c) forming a third reaction mixture by admixing (1) the first ester-substituted colorant, (2) bromine, and (3) a solvent followed by quenching the third reaction mixture with water to form a brominated ester-substituted colorant and a salt thereof, of the formulae

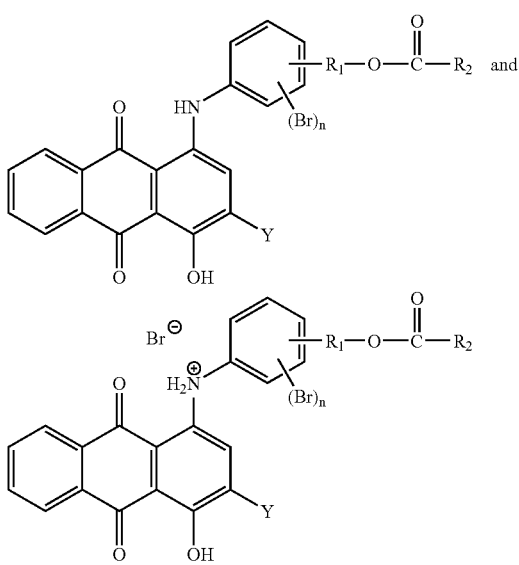

wherein Y is a hydrogen atom or a bromine atom and n is an integer of 1, 2, 3, or 4; (d) preparing a fourth reaction mixture by admixing (1) the brominated ester-substituted colorant and the salt thereof, (2) a base, (3) water, and (4) a solvent and heating the fourth reaction mixture to form a brominated alcohol-substituted colorant of the formula

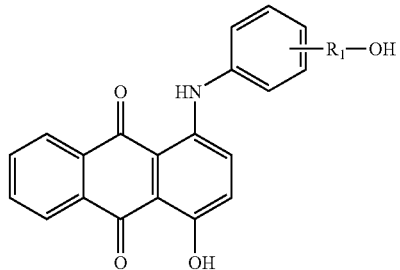

and (e) preparing a fifth reaction mixture by admixing (1) the brominated alcohol-substituted colorant, (2) a second esterification compound which is either (i) an anhydride of the formula

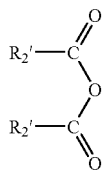

wherein $R_2'$ is an alkyl group, an aryl group, an arylalkyl group, or an alkylaryl group, and wherein $R_2'$ is different from $R_2$, or (ii) an acid of the formula $R_2'COOH$ in the presence of an optional esterification catalyst, and (3) a solvent and heating the fifth reaction mixture to form a second ester-substituted colorant of the formula

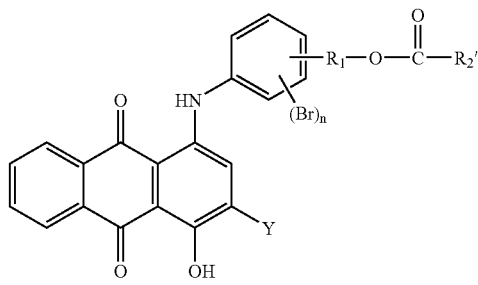

In this embodiment, $R_2'$ has the same definitions as provided hereinabove for $R_2$ except that $R_2'$ is different from $R_2$.

In yet another embodiment, colorant compounds of the present invention are prepared by a process which comprises (a) preparing a first reaction mixture by admixing (1) leucoquinizarin and, optionally, quinizarin, (2) an aminobenzene substituted with an alcohol group of the formula —$R_1$—OH, wherein $R_1$ is an alkylene group or an arylalkylene group, (3) boric acid, and (4) an optional solvent, and heating the first reaction mixture to prepare an alcohol-substituted colorant of the formula

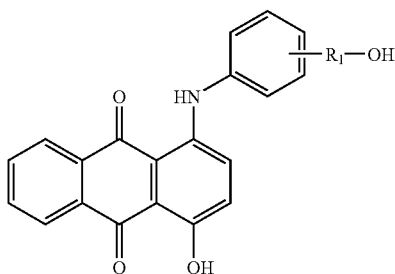

(b) preparing a second reaction mixture by admixing (1) the alcohol-substituted colorant, (2) a carboxylic acid of the formula $R_2COOH$, wherein $R_2$ is an alkyl group, an aryl group, an arylalkyl group, or an alkylaryl group, (3) an optional esterification catalyst, and (4) a solvent and heating the second reaction mixture to form an ester-substituted colorant of the formula

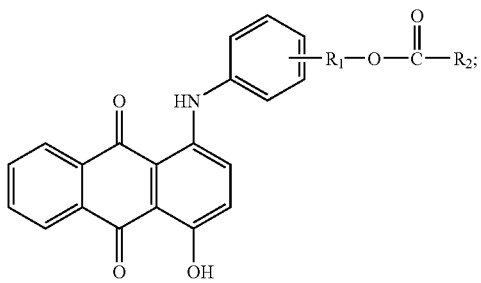

and (c) forming a third reaction mixture by admixing (1) the ester-substituted colorant, (2) bromine, and (3) a solvent followed by quenching the third reaction mixture with water to form a brominated ester-substituted colorant and a salt thereof, of the formulae

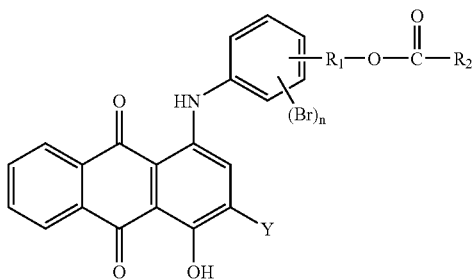

and

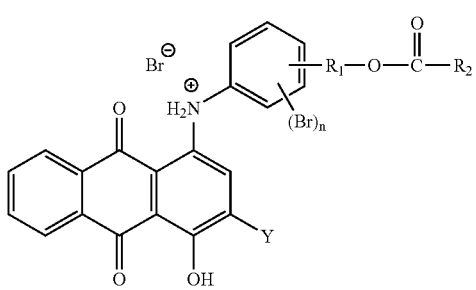

wherein Y is a hydrogen atom or a bromine atom and n is an integer of 1, 2, 3, or 4.

In still another embodiment, colorant compounds of the present invention are prepared by a process which comprises (a) preparing a first reaction mixture by admixing (1) leucoquinizarin and, optionally, quinizarin, (2) an aminobenzene substituted with an alcohol group of the formula —$R_1$—OH, wherein $R_1$ is an alkylene group or an arylalkylene group, (3) boric acid, and (4) an optional solvent, and heating the first reaction mixture to prepare an alcohol-substituted colorant of the formula

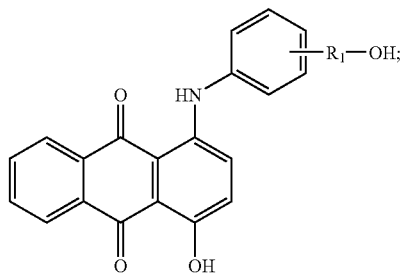

(b) preparing a second reaction mixture by admixing (1) the alcohol-substituted colorant, (2) bromine, and (3) a solvent followed by quenching the second reaction mixture with water to form a brominated alcohol-substituted colorant and a salt thereof, of the formulae

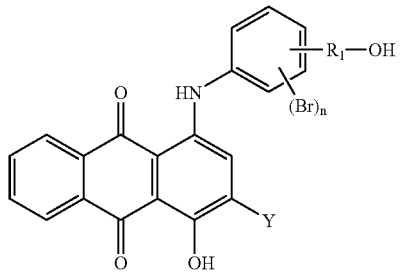

and

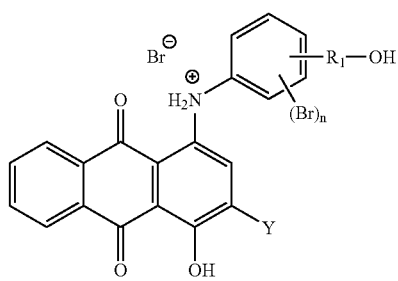

wherein Y is a hydrogen atom or a bromine atom and n is an integer of 0, 1, 2, 3, or 4; and (c) forming a third reaction mixture by admixing (1) the brominated alcohol-substituted colorant, (2) a carboxylic acid of the formula $R_2COOH$, wherein $R_2$ is an alkyl group, an aryl group, an arylalkyl group, or an alkylaryl group, (3) an optional esterification catalyst, and (4) a solvent and heating the third reaction mixture to form a brominated ester-substituted colorant of the formula

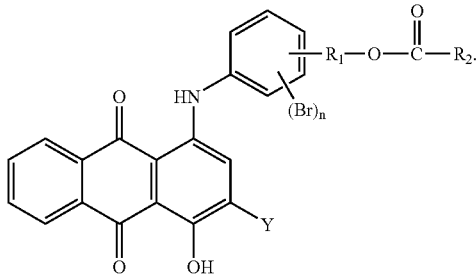

In yet still another embodiment, colorant compounds of the present invention are prepared by a process which comprises (a) preparing a first reaction mixture by admixing (1) leucoquinizarin and, optionally, quinizarin, (2) an aminobenzene substituted with an alcohol group of the formula —$R_1$—OH, wherein $R_1$ is an alkylene group or an arylalkylene group, (3) boric acid, and (4) an optional solvent, and heating the first reaction mixture to prepare an alcohol-substituted colorant of the formula

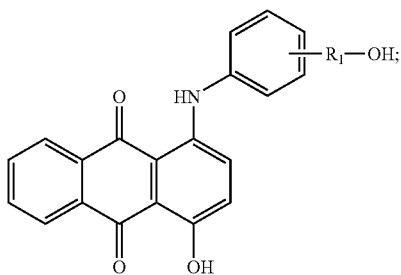

(b) preparing a second reaction mixture by admixing (1) the alcohol-substituted colorant, (2) an isocyanate of the formula

wherein $R_4$ is an alkyl group, an aryl group, an arylalkyl group, or an alkylaryl group, and (3) an optional catalyst and heating the second reaction mixture to form a urethane-substituted colorant of the formula

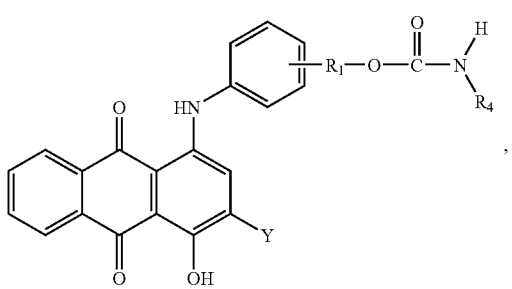

and (c) forming a third reaction mixture by admixing (1) the urethane-substituted colorant, (2) bromine, and (3) a solvent followed by quenching the third reaction mixture with water to form a brominated urethane-substituted colorant and a salt thereof, of the formulae

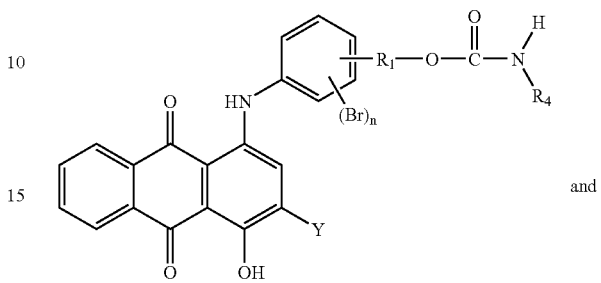

and

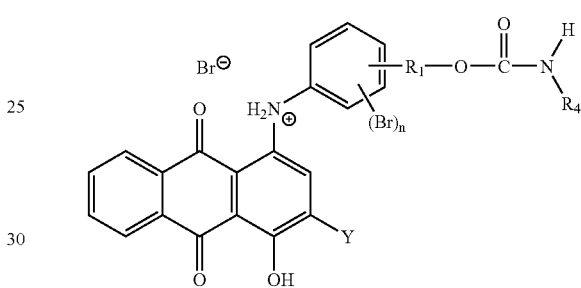

wherein Y is a hydrogen atom or a bromine atom and n is an integer of 1, 2, 3, or 4.

In still yet another embodiment, colorant compounds of the present invention are prepared by a process which comprises (a) preparing a first reaction mixture by admixing (1) leucoquinizarin and, optionally, quinizarin, (2) an aminobenzene substituted with an alcohol group of the formula —$R_1$—OH, wherein $R_1$ is an alkylene group or an arylalkylene group, (3) boric acid, and (4) an optional solvent, and heating the first reaction mixture to prepare an alcohol-substituted colorant of the formula

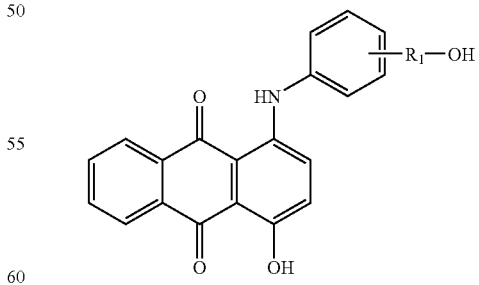

(b) preparing a second reaction mixture by admixing (1) the alcohol-substituted colorant, (2) bromine, and (3) a solvent followed by quenching the second reaction mixture with water to form a brominated alcohol-substituted colorant and a salt thereof, of the formulae

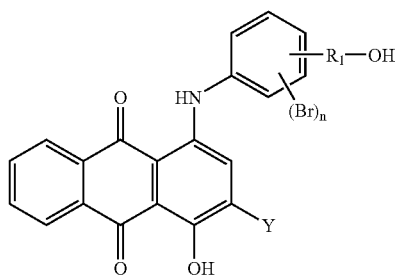

and

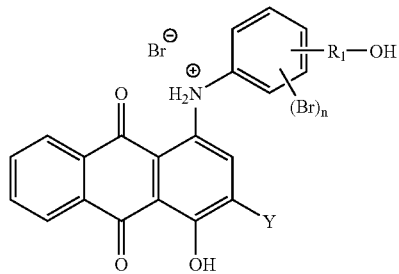

wherein Y is a hydrogen atom or a bromine atom and n is an integer of 0, 1, 2, 3, or 4; and (c) forming a third reaction mixture by admixing (1) the brominated alcohol-substituted colorant, (2) an isocyanate of the formula

R₄—N=C=O wherein R₄ is an alkyl group, an aryl group, an arylalkyl group, or an alkylaryl group, and (3) an optional catalyst and heating the second reaction mixture to form a brominated urethane-substituted colorant and a salt thereof, of the formulae

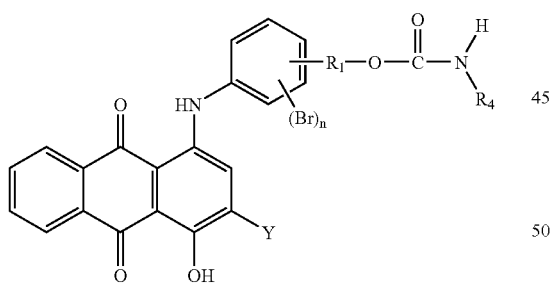

and

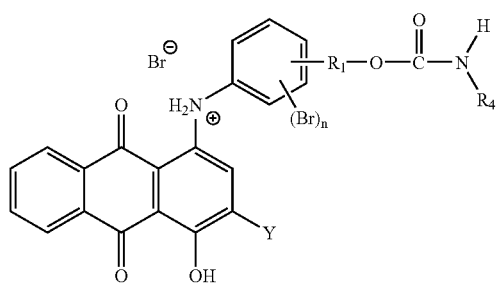

An alcohol-substituted colorant of the present invention of the formula

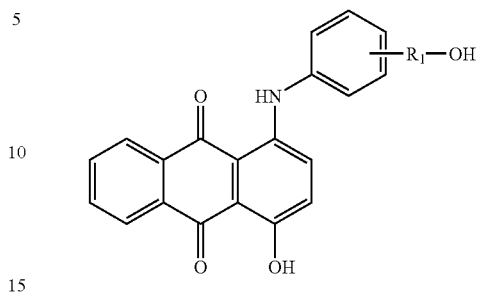

can be prepared by admixing (1) leucoquinizarin and, optionally, quinizarin, (2) an aminobenzene substituted with an alcohol group of the formula —R₁—OH, wherein R₁ is as defined hereinabove, (3) boric acid, and (4) an optional solvent, followed by heating this reaction mixture to reflux temperature as follows (illustrated for an embodiment wherein the aminobenzene is substituted with the alcohol group in the 4- or para-position):

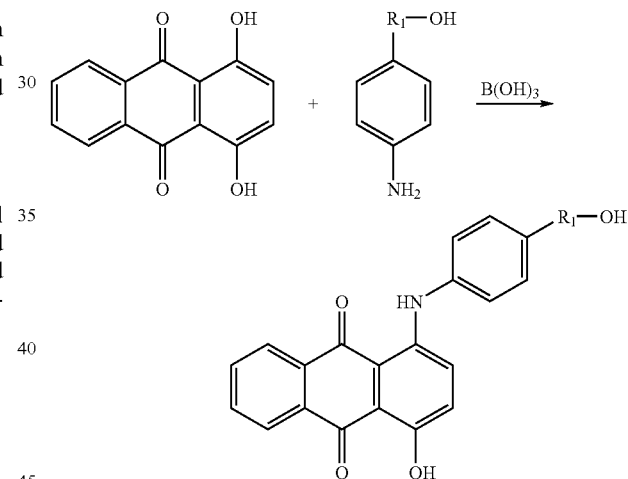

While quinizarin is shown above as the starting material, the presence of leucoquinizarin, which is the reduced form of quinizarin, is needed to condense with the alcohol-substituted amine. The reaction between the amine and the leucoquinizarin further reduces some of the quinizarin present in the reaction mixture to leucoquinizarin, thereby rendering it capable of reacting with more of the amine and furthering the reaction to completion. If desired, the reaction can be carried out solely with leucoquinizarin and with no quinizarin, although for economical purposes such a procedure is often not desirable. In addition, instead of adding leucoquinizarin to a reaction mixture of quinizarin and the alcohol-substituted amine, leucoquinizarin can be generated in situ by preparing a reaction mixture of quinizarin and the alcohol-substituted amine and adding to the reaction mixture a reducing agent, as disclosed in, for example, Waring and Hallas, *The Chemistry and Application of Dyes,* ISBN 0-306-43278-1, Plenum Publishing Co. (New York 1990), the disclosure of which is totally incorporated herein by reference.

The quinizarin and the leucoquinizarin are present in any desired or effective relative amounts, in one embodiment at least about 5 moles of leucoquinizarin per every 95 moles of quinizarin, in another embodiment at least about 2 moles of leucoquinizarin per every 3 moles of quinizarin, and in yet another embodiment at least about 1 mole of leucoquinizarin per every 1 mole of quinizarin, and in one embodiment up to 100 percent leucoquinizarin and no quinizarin, although the relative amounts of quinizarin and leucoquinizarin can be outside of these ranges.

The alcohol-substituted aminobenzene is present in any desired or effective amount, in one embodiment at least about 0.95 mole of alcohol-substituted aminobenzene per every one mole of (quinizarin plus leucoquinizarin), and in another embodiment at least about 1 mole of alcohol-substituted aminobenzene per every one mole of (quinizarin plus leucoquinizarin), and in one embodiment no more than about 1.05 moles of alcohol-substituted aminobenzene per every one mole of (quinizarin plus leucoquinizarin), and in another embodiment no more than about 1 mole of alcohol-substituted aminobenzene per every one mole of (quinizarin plus leucoquinizarin), although the amount of alcohol-substituted aminobenzene can be outside of these ranges.

The boric acid, which functions as a catalyst in the reaction between the alcohol-substituted aminobenzene and the leucoquinizarin, is present in any desired or effective amount, in one embodiment about 1 mole of boric acid per every one mole of (quinizarin plus leucoquinizarin), although the amount of boric acid can be higher or lower than this amount.

When the optional solvent is present, any desired or effective solvent can be used. Examples of suitable solvents include methanol, ethanol, isopropanol, butanol, ethylene glycol monomethyl ether, ethylene glycol dimethyl ether, and the like, as well as mixtures thereof. The reactants are present in the solvent in any desired or effective amount, in one embodiment at least about 25 grams of alcohol-substituted aminobenzene per every one liter of solvent, in another embodiment at least about 50 grams of alcohol-substituted aminobenzene per every one liter of solvent, and in another embodiment at least about 100 grams of alcohol-substituted aminobenzene per every one liter of solvent, and in one embodiment no more than about 500 grams of alcohol-substituted aminobenzene per every one liter of solvent, in another embodiment no more than about 250 grams of alcohol-substituted aminobenzene per every one liter of solvent, and in yet another embodiment no more than about 125 grams of alcohol-substituted aminobenzene per every one liter of solvent, although the amount of solvent can be outside of these ranges.

The reaction mixture containing (1) leucoquinizarin and, optionally, quinizarin, (2) an aminobenzene substituted with an alcohol group of the formula —$R_1$—OH, wherein $R_1$ is as defined hereinabove, (3) boric acid, and (4) an optional solvent is heated to any desirable or effective temperature, typically the reflux temperature of the selected solvent when a solvent is used, in one embodiment at least about 50° C., in another embodiment at least about 60° C., and in yet another embodiment at least about 75° C., and in one embodiment no more than about 150° C., in another embodiment no more than about 120° C., and in yet another embodiment no more than about 80° C., although the temperature can be outside of these ranges.

The reaction mixture containing (1) leucoquinizarin and, optionally, quinizarin, (2) an aminobenzene substituted with an alcohol group of the formula —$R_1$—OH, wherein $R_1$ is as defined hereinabove, (3) boric acid, and (4) an optional solvent is heated for any desirable or effective period of time, in one embodiment at least about 3 hours, and in another embodiment at least about 4 hours, and in one embodiment no more than about 24 hours, although the heating time can be outside of these ranges.

Upon completion of the reaction, the alcohol-substituted colorant according to the present invention is formed as a solid and can be recovered by cooling and filtering the reaction mixture.

The alcohol-substituted colorant according to the present invention can be converted to an ester-substituted colorant according to the present invention of the formula

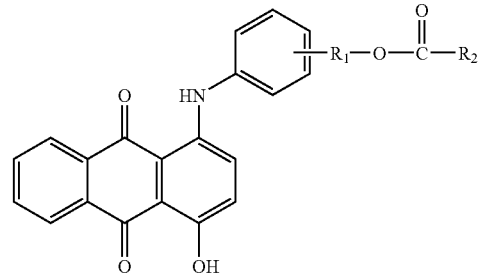

by preparing a reaction mixture by admixing (1) the alcohol-substituted colorant, (2) a solvent, and (3) an esterification compound such as an anhydride of the formula

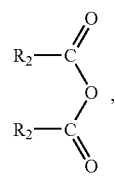

in which reaction mixture upon heating is formed an ester-substituted colorant according to the present invention as follows (illustrated for an embodiment wherein the alcohol-substituted colorant is substituted with the alcohol group in the 4- or para-position):

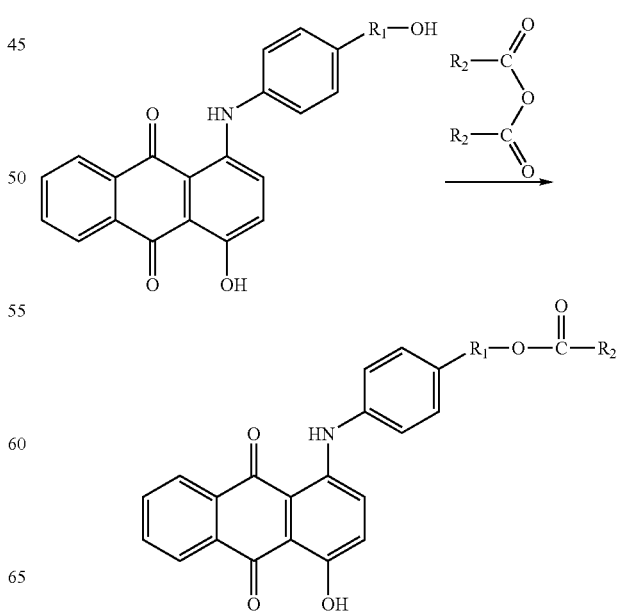

The alcohol-substituted colorant and the anhydride are present in any desired or effective relative amounts, in one embodiment at least about 1 mole of anhydride per every one mole of alcohol-substituted colorant, and in one embodiment no more than about 1.1 moles of anhydride per every one mole of alcohol-substituted colorant, although the amount of anhydride can be outside of these ranges.

Examples of suitable solvents include acetic acid, propionic acid, formic acid, butyric acid, dimethyl formamide, dimethyl sulfoxide, hexamethyl phosphorus triamide (HMPA), tetrahydrofuran, or the like, as well as mixtures thereof. The solvent is present in any desired or effective amount, in one embodiment at least about 25 grams of alcohol-substituted colorant per every one liter of solvent, and in another embodiment at least about 100 grams of alcohol-substituted colorant per every one liter of solvent, and in one embodiment no more than about 200 grams of alcohol-substituted colorant per every one liter of solvent, although the amount of solvent can be outside of these ranges.

The reaction mixture containing the alcohol-substituted colorant, the solvent, and the anhydride is heated to any desirable or effective temperature, in one embodiment at least about 25° C., and in another embodiment at least about 40° C., and in one embodiment no more than about 100° C., and in another embodiment no more than about 60° C., although the temperature can be outside of these ranges.

The reaction mixture containing the alcohol-substituted colorant, the solvent, and the anhydride is heated for any desirable or effective period of time, in one embodiment at least about 2.5 hours, and in another embodiment at least about 3 hours, and in one embodiment no more than about 5 hours, although the heating time can be outside of these ranges. Reaction completion can be determined by thin layer chromatography of the reaction mixture to detect the presence of unreacted reactants.

The ester-substituted colorant can be brominated to form a brominated ester-substituted colorant and its salt of the formulae

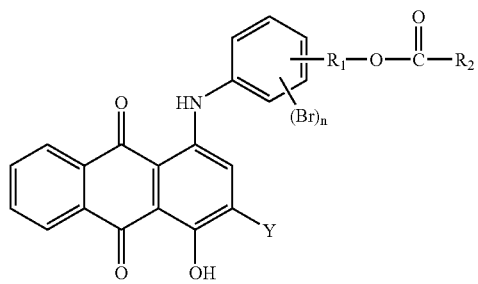

and

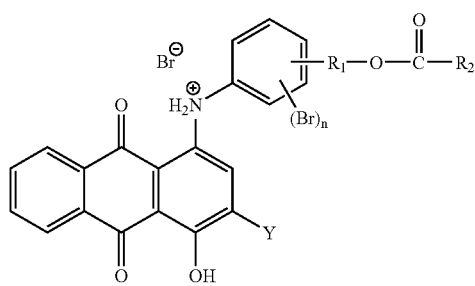

wherein Y is a hydrogen atom or a bromine atom and n is 1, 2, 3, or 4. A reaction mixture is prepared by admixing (1) the ester-substituted colorant, (2) bromine, and (3) a solvent, followed by quenching the reaction mixture with water to form a mixture of a brominated ester-substituted colorant and its salt, as follows (illustrated for an embodiment wherein the ester-substituted colorant is substituted with the ester group in the 4- or para-position and wherein the resulting brominated ester-substituted colorant has Y=hydrogen and 2 bromine atoms in the ortho positions adjacent to the nitrogen atom):

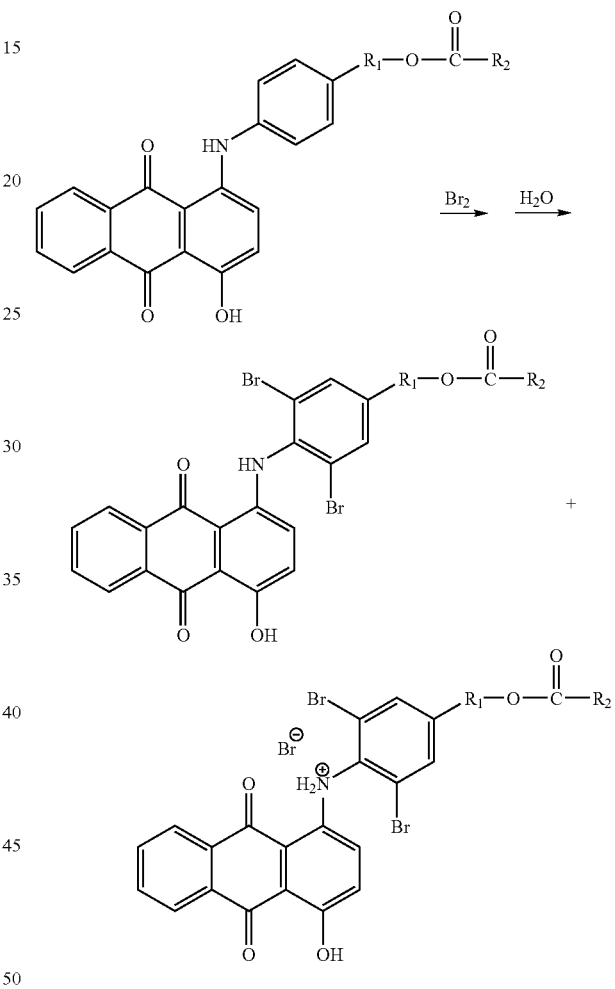

The mixture of products contains both an amine compound and the HBr salt thereof. When it is desired to brominate an alcohol-substituted colorant of the present invention, it can be desirable in some instances to convert the alcohol-substituted colorant to the ester-substituted colorant, followed by bromination of the ester-substituted colorant and subsequent conversion of the brominated ester-substituted colorant to the brominated alcohol-substituted colorant, since the presence of the ester group protects the $R_1$-containing moiety from undergoing reaction with HBr that is generated in the bromination reaction.

Bromine ($Br_2$) can be provided by any desired or effective method, such as by adding elemental bromine, or by generating $Br_2$ in situ in the reaction mixture by the addition of a combination of a bromide salt and a bromate salt, as disclosed in, for example, *Kirk-Othmer Encyclopedia of*

*Chemical Technology*, Vol. 4, 4*th* Edition, ISBN 0-471-52672-X, John Wiley & Sons, Inc. (New York 1992), the disclosure of which is totally incorporated herein by reference, or the like.

The ester-substituted colorant and the bromine are present in any desired or effective relative amounts, in one embodiment at least about 2 moles of $Br_2$ per every one mole of ester-substituted colorant, in another embodiment at least about 2.5 moles of $Br_2$ per every one mole of ester-substituted colorant, and in yet another embodiment at least about 3 moles of $Br_2$ per every one mole of ester-substituted colorant, and in one embodiment no more than about 4 moles of $Br_2$ per every one mole of ester-substituted colorant, in another embodiment no more than about 3.5 moles of $Br_2$ per every one mole of ester-substituted colorant, and in yet another embodiment no more than about 3.25 moles of $Br_2$ per every one mole of ester-substituted colorant, although the amount of bromine can be outside of these ranges. Higher amounts of bromine lead to higher degrees of substitution with bromine atoms. Greater amounts of bromine and/or higher reaction temperatures are selected when it is desired to place a bromine atom in the Y position.

Examples of suitable solvents include acetic acid, propionic acid, formic acid, butyric acid, dimethyl formamide, dimethyl sulfoxide, hexamethyl phosphorus triamide (HMPA), tetrahydrofuran, or the like, as well as mixtures thereof. The solvent is present in any desired or effective amount, in one embodiment at least about 25 grams of ester-substituted colorant per every one liter of solvent, and in another embodiment at least about 100 grams of ester-substituted colorant per every one liter of solvent, and in one embodiment no more than about 200 grams of ester-substituted colorant per every one liter of solvent, although the amount of solvent can be outside of these ranges.

In some instances, the esterification reaction between (1) the alcohol-substituted colorant, (2) a solvent, and (3) an anhydride to form the ester-substituted colorant is carried out immediately prior to the bromination reaction to convert the ester-substituted colorant to the brominated ester-substituted colorant. In this instance, the ester-substituted colorant need not be recovered from its reaction mixture; rather, the bromine can be added directly to this mixture upon completion of the esterification, and no additional solvent need be added.

The reaction mixture containing the ester-substituted colorant, the bromine, and the solvent generally can be initially heated to a temperature of about 30° C. to about 40° C. The reaction of the ester-substituted colorant and the bromine tends to be exothermic, and the reaction mixture is generally maintained at a desirable temperature by controlling the rate of addition of bromine as well as by any desired external source, such as a heating mantle or the like. The reaction mixture containing the ester-substituted colorant, the bromine, and the solvent is maintained any desirable or effective temperature, in one embodiment at least about 25° C., and in another embodiment at least about 50° C., and in one embodiment no more than about 100° C., and in another embodiment no more than about 60° C., although the temperature can be outside of these ranges.

The reaction between the ester-substituted colorant and the bromine is allowed to proceed for any desirable or effective period of time, in one embodiment at least about 5 hours, and in one embodiment no more than about 24 hours, although the reaction time can be outside of these ranges.

Subsequent to completion of the reaction, the reaction mixture containing the ester-substituted colorant, the bromine, and the solvent can be poured into water to quench the reaction. Any desired or effective amount of water can be used, in one embodiment at least about 1.5 times as much water by volume as the volume of the reaction mixture, in another embodiment at least about 2 times as much water by volume as the volume of the reaction mixture, in yet another embodiment at least about 2 times as much water by volume as the volume of the reaction mixture, and in still another embodiment at least about 3 times as much water by volume as the volume of the reaction mixture, although the amount of water can be outside of these ranges.

The mixture of the brominated ester-substituted colorant and its salt can be recovered from the reaction mixture as a solid by filtration, washed, and dried.

The unbrominated alcohol-substituted colorant can also be converted to a brominated alcohol-substituted colorant by this same process, as follows (illustrated for an embodiment wherein the alcohol-substituted colorant is substituted with the ester group in the 4- or para-position and wherein the brominated alcohol-substituted colorant has Y=hydrogen and 2 bromine atoms in the ortho positions adjacent to the nitrogen atom):

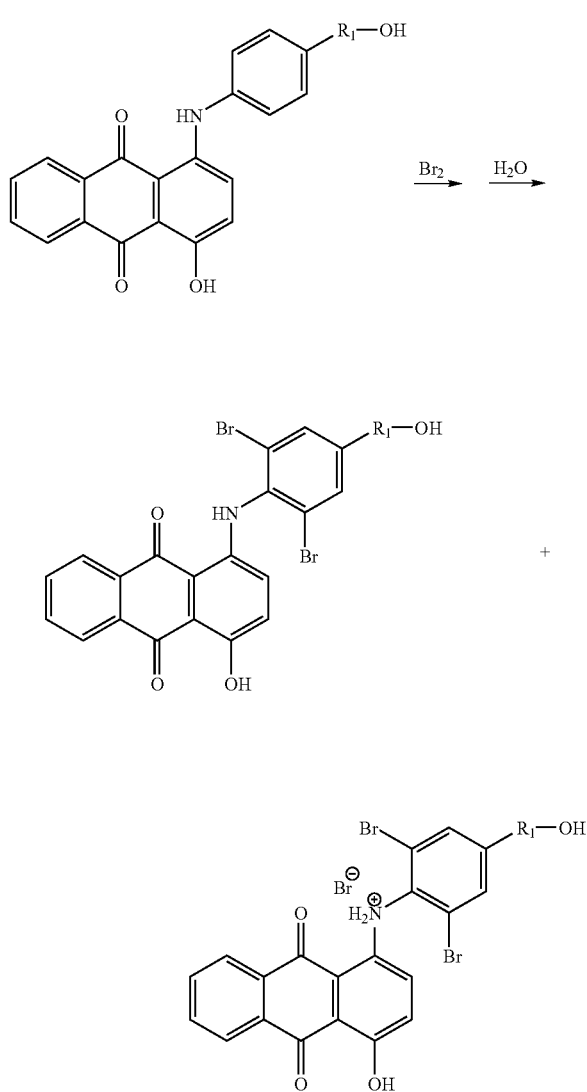

A brominated alcohol-substituted colorant of the present invention of the formula

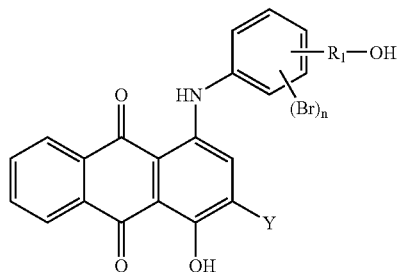

can be prepared by admixing (1) a mixture of the brominated ester-substituted colorant and its salt, (2) a base, (3) water, and (4) a solvent and heating the reaction mixture thus formed to form a brominated alcohol-substituted colorant (and also to convert any of the ammonium salt form of the brominated ester-substituted colorant to the amine form), as follows (illustrated for an embodiment wherein the brominated ester-substituted colorant is substituted with the ester group in the 4- or para-position and wherein the brominated ester-substituted colorant has Y=hydrogen and 2 bromine atoms in the ortho positions adjacent to the nitrogen atom):

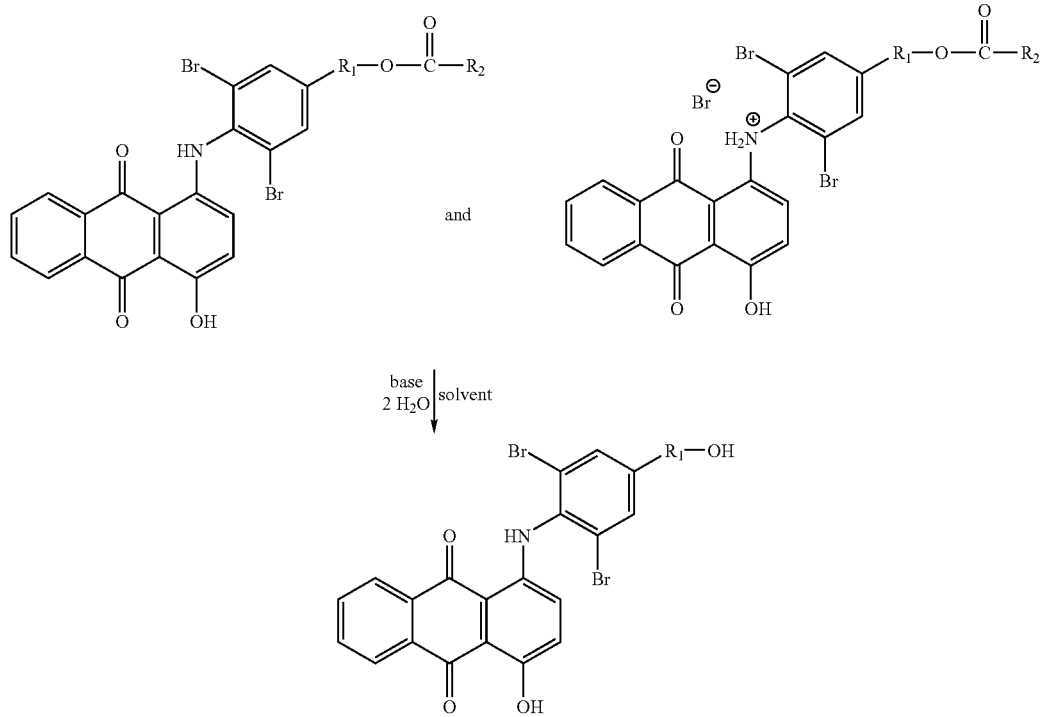

The brominated ester-substituted colorant and its salt are added to a solvent, such as N-methylpyrrolidinone, dimethyl sulfoxide, dimethyl formamide, or the like, as well as mixtures thereof, in any desired or effective amount, in one embodiment about 1 gram of brominated ester-substituted colorant plus salt thereof per every 4 grams of solvent, although the amount of solvent can be higher or lower than this value.

Any desired or effective base can be used. Examples of suitable bases include sodium hydroxide, potassium hydroxide, and the like, as well as mixtures thereof. The base is present in any desired or effective amount, in one embodiment at least about 1 mole of base per mole of (brominated ester-substituted colorant plus salt thereof), in another embodiment at least about 1.5 moles of base per mole of (brominated ester-substituted colorant plus salt thereof), and in yet another embodiment at least about 2 moles of base per mole of (brominated ester-substituted colorant plus salt thereof), and in one embodiment no more than about 5 moles of base per mole of (brominated ester-substituted colorant plus salt thereof), and in another embodiment no more than about 3 moles of base per mole of (brominated ester-substituted colorant plus salt thereof), although the amount of base can be outside of these ranges.

The water is present in any desired or effective amount. The amount of water added can depend on the solvent used. Addition of too much water can cause precipitation of the ester before it is hydrolyzed. Hydrolysis can be accomplished with as little as a mole of water for every mole of ester. Some water is generated in situ by the neutralization of the HBr salt by the base. In one embodiment, the water is added with the base, as a (for example) 50 percent aqueous solution of the base; for example, when the base is NaOH, every mole of NaOH comes with 2.2 moles of water, so that the addition of 1 mole of base is accompanied by the addition of 2.2 moles of water, the addition of 1.5 moles of base is accompanied by the addition of 3.3 moles of water, the addition of 3 moles of base is accompanied by the addition of 6.6 moles of water, the addition of 5 moles of base is accompanied by the addition of 11.1 moles of water, and the like.

The reaction mixture containing the mixture of the brominated ester-substituted colorant and its salt, the base, the water, and the solvent is heated to any desirable or effective temperature, in one embodiment at least about 50° C., and in another embodiment at least about 60° C., and in one embodiment no more than about 70° C., and in another embodiment no more than about 60° C., although the temperature can be outside of these ranges.

The reaction mixture containing the mixture of the brominated ester-substituted colorant and its salt, the base, the water, and the solvent is heated for any desirable or effective period of time, in one embodiment at least about 45 minutes, and in one embodiment no more than about 90 minutes, although the heating time can be outside of these ranges.

Subsequent to completion of the reaction, the reaction mixture can be quenched by pouring it into water or by pouring water into the reaction mixture. Any desired or effective amount of water can be used, in one embodiment at least about 3 times as much water by volume as the volume of the reaction mixture, in another embodiment at least about 5 times as much water by volume as the volume of the reaction mixture, in yet another embodiment at least about 10 times as much water by volume as the volume of the reaction mixture, and in still another embodiment at least about 20 times as much water by volume as the volume of the reaction mixture, although the amount of water can be outside of these ranges.

The pH of the quenched reaction mixture can then be adjusted by addition of an acid, such as acetic acid, hydrochloric acid, hydrobromic acid, sulfuric acid, or the like, as well as mixtures thereof, until the desired pH is reached, in one embodiment at least about 5, and in another embodiment at least about 7, and in one embodiment no more than about 8, although the pH can be outside of these ranges.

The brominated alcohol-substituted colorant can be recovered from the quenched reaction mixture as a solid by filtration, followed by washing and drying.

The brominated alcohol-substituted colorant can be converted to a brominated ester-substituted colorant of the formula

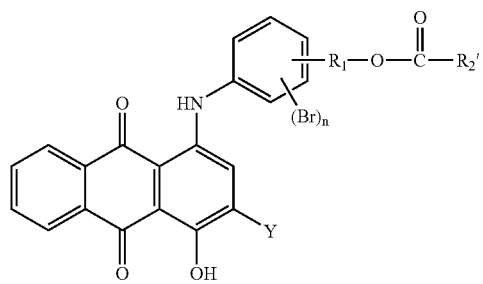

wherein $R_2'$ is different from $R_2$ by admixing (1) the brominated alcohol-substituted colorant, (2) an esterification compound such as a carboxylic acid of the formula $R_2'COOH$, wherein $R_2'$ is as defined hereinabove, (3) a solvent, and (4) an optional esterification catalyst and heating the reaction mixture, as follows (illustrated for an embodiment wherein the brominated alcohol-substituted colorant is substituted with the ester group in the 4- or para-position and wherein the brominated ester-substituted colorant has Y=hydrogen and 2 bromine atoms in the ortho positions adjacent to the nitrogen atom):

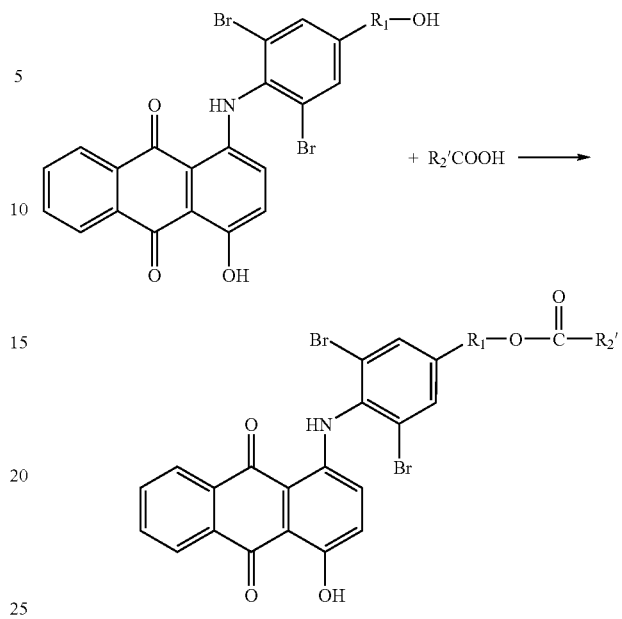

The brominated alcohol-substituted colorant and the carboxylic acid are present in any desired or effective relative amounts, in one embodiment at least about 0.9 mole of carboxylic acid per every one mole of brominated alcohol-substituted colorant, in another embodiment at least about 0.95 mole of carboxylic acid per mole of brominated alcohol-substituted colorant, and in yet another embodiment at least about 1 mole of carboxylic acid per mole of brominated alcohol-substituted colorant, and in one embodiment no more than about 2 moles of carboxylic acid per mole of brominated alcohol-substituted colorant, in another embodiment no more than about 1.05 moles of carboxylic acid per mole of brominated alcohol-substituted colorant, and in yet another embodiment no more than about 1 mole of carboxylic acid per mole of brominated alcohol-substituted colorant, although the relative amounts of carboxylic acid and brominated alcohol-substituted colorant can be outside of these ranges.

When the optional esterification catalyst is present, any desired or effective esterification catalyst can be used, such as para-toluene sulfonic acid, dibutyl tin dilaurate, or the like, as well as mixtures thereof. The esterification catalyst is present in any desired or effective amount, in one embodiment at least about 0.05 mole of esterification catalyst per every one mole of brominated alcohol-substituted colorant, and in one embodiment no more than about 0.5 mole of esterification catalyst per mole of brominated alcohol-substituted colorant, although the amount of esterification catalyst can be outside of these ranges.

Any desired or effective solvent can be used. Examples of suitable solvents include xylene, toluene, benzene, chlorobenzene, nitrobenzene, dichlorobenzene, and the like, as well as mixtures thereof. The reactants are present in the solvent in any desired or effective amount, in one embodiment at least about 25 grams of brominated alcohol-substituted colorant per every one liter of solvent, in another embodiment at least about 50 grams of brominated alcohol-substituted colorant per every one liter of solvent, and in yet another embodiment at least about 100 grams of brominated alcohol-substituted colorant per every one liter of solvent, and in one embodiment no more than about 200 grams of brominated alcohol-substituted colorant per every one liter of solvent, in another embodiment no more than about 150 grams of brominated alcohol-substituted colorant per every one liter of solvent, and in yet another embodiment no more than about 100 grams of brominated alcohol-substituted colorant per every one liter of solvent, although the amount of solvent can be outside of these ranges.

The reaction mixture containing the brominated alcohol-substituted colorant, the carboxylic acid, the solvent, and the optional esterification catalyst is heated to any desirable or effective temperature, typically the reflux temperature of the selected solvent, in one embodiment at least about 100° C., and in one embodiment no more than about 130° C., although the temperature can be outside of these ranges.

The reaction mixture containing the brominated alcohol-substituted colorant, the carboxylic acid, the solvent, and the optional esterification catalyst is heated for any desirable or effective period of time, in one embodiment at least about 2 hours, in another embodiment at least about 24 hours, and in one embodiment no more than about 72 hours, and in another embodiment no more than about 48 hours, although the heating time can be outside of these ranges.

The colorant of the formula

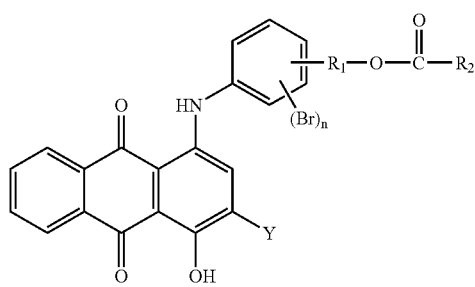

can be recovered from the reaction mixture as a solid by filtration, followed by washing and drying. If desired, purification can be carried out by filtration, redissolution in the solvent, heating, cooling, precipitating the colorant from the solution, filtering, washing the colorant with a solvent such as methanol, ethanol, or the like, and repeating this cycle until thin layer chromatography of the collected solid indicates that there is no detectable unreacted reactant present in the solid.

The unbrominated alcohol-substituted colorant can also be converted to an unbrominated ester-substituted colorant by this same process, as follows (illustrated for an embodiment wherein the alcohol-substituted colorant is substituted with the ester group in the 4- or para-position):

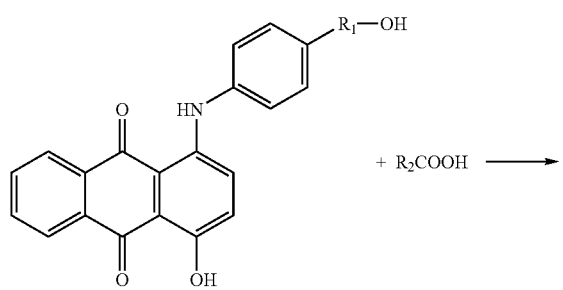

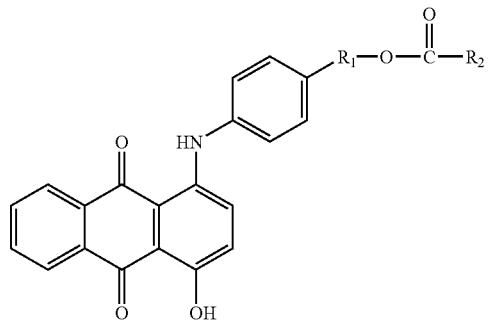

wherein Y is a hydrogen atom or a bromine atom, n is an integer of 0, 1, 2, 3, or 4, $R_1$ is an alkylene group or an arylalkylene group, and $R_2$ is an alkyl group, an aryl group, an arylalkyl group, or an alkylaryl group can be prepared by a process which comprises preparing a first reaction mixture by admixing (1) leucoquinizarin and, optionally, quinizarin, (2) an aminobenzene substituted with an alcohol group of the formula —$R_1$—OH, (3) boric acid, and (4) an optional solvent, and heating the first reaction mixture by admixing (1) leucoquinizarin and, optionally, quinizarin, (2) an aminobenzene substituted with an alcohol group of the formula —$R_1$—OH, (3) boric acid, and (4) an optional solvent, and heating the first reaction mixture to prepare an alcohol-substituted colorant of the formula

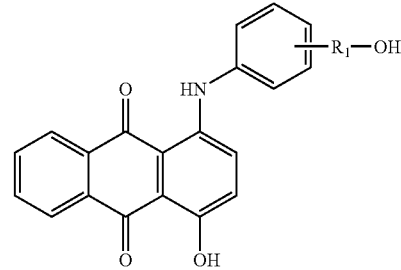

followed by brominating and esterifying the alcohol-substituted colorant thus prepared, wherein either esterification can take place before bromination or bromination can take place before esterification.

In one specific embodiment, brominated ester-substituted colorants according to the present invention of the formula

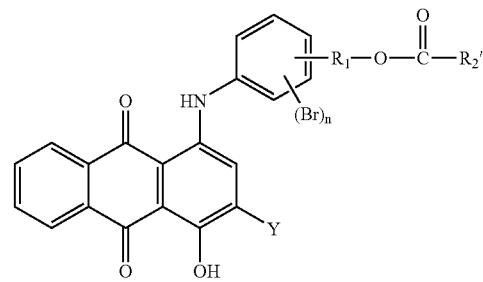

can be prepared by a process which comprises (a) preparing a first reaction mixture by admixing (1) leucoquinizarin and, optionally, quinizarin, (2) an aminobenzene substituted with an alcohol group of the formula —$R_1$—OH, wherein $R_1$ is an alkylene group or an arylalkylene group, (3) boric acid, and (4) an optional solvent, and heating the first reaction mixture to prepare an alcohol-substituted colorant of the formula

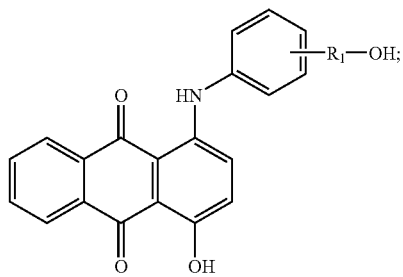

(b) preparing a second reaction mixture by admixing (1) the alcohol-substituted colorant, (2) a solvent, and (3) an anhydride of the formula

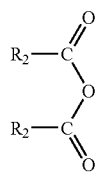

wherein $R_2$ is an alkyl group, an aryl group, an arylalkyl group, or an alkylaryl group and heating the second reaction mixture to form a first ester-substituted colorant of the formula

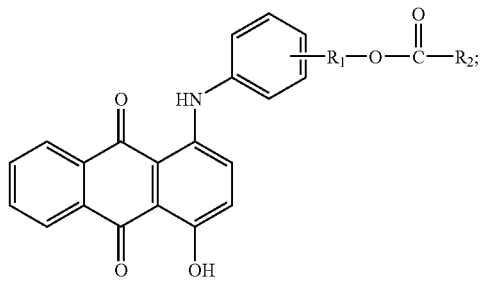

(c) forming a third reaction mixture by admixing (1) the first ester-substituted colorant, (2) bromine, and (3) a solvent followed by quenching the third reaction mixture with water to form a brominated ester-substituted colorant and a salt thereof, of the formulae

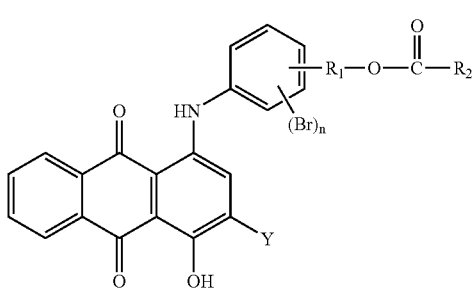

and

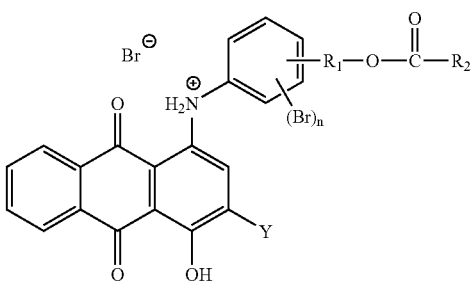

wherein Y is a hydrogen atom or a bromine atom and n is an integer of 1, 2, 3, or 4; (d) preparing a fourth reaction mixture by admixing (1) the brominated ester-substituted colorant and the salt thereof, (2) a base, (3) water, and (4) a solvent and heating the fourth reaction mixture to form a brominated alcohol-substituted colorant of the formula

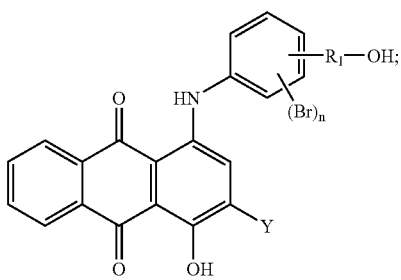

and (e) preparing a fifth reaction mixture by admixing (1) the brominated alcohol-substituted colorant, (2) a carboxylic acid of the formula $R_2'$COOH, wherein $R_2'$ is an alkyl group, an aryl group, an arylalkyl group, or an alkylaryl group, and wherein $R_2'$ is different from $R_2$, (3) an optional esterification catalyst, and (4) a solvent and heating the fifth reaction mixture to form a second ester-substituted colorant of the formula

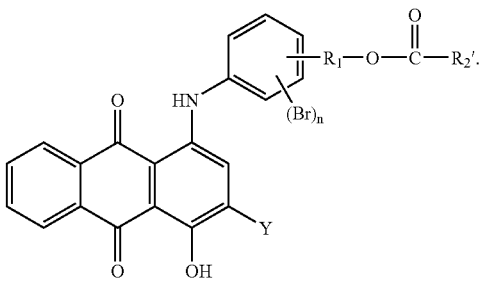

This process is particularly suitable for preparation of colorants wherein $R_2$ has 4 or fewer carbon atoms and wherein $R_2'$ has more than 4 carbon atoms.

Brominated ester-substituted colorants according to the present invention of the formula

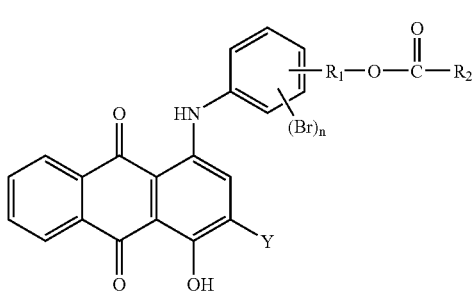

can also be prepared by a process which comprises (a) preparing a first reaction mixture by admixing (1) leucoquinizarin and, optionally, quinizarin, (2) an aminobenzene substituted with an alcohol group of the formula —$R_1$—OH, wherein $R_1$ is an alkylene group or an arylalkylene group, (3) boric acid, and (4) an optional solvent, and heating the first reaction mixture to prepare an alcohol-substituted colorant of the formula

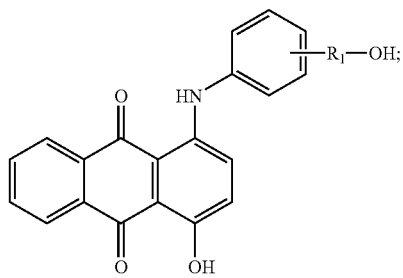

(b) preparing a second reaction mixture by admixing (1) the alcohol-substituted colorant, (2) a carboxylic acid of the formula $R_2$COOH, wherein $R_2$ is an alkyl group, an aryl group, an arylalkyl group, or an alkylaryl group, (3) an optional esterification catalyst, and (4) a solvent and heating the second reaction mixture to form an ester-substituted colorant of the formula

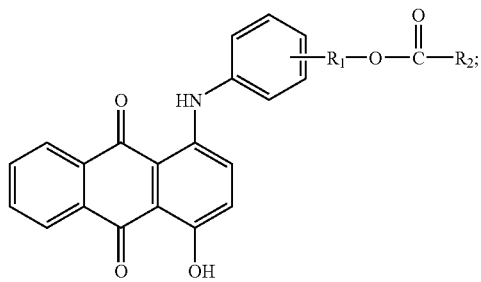

and (c) forming a third reaction mixture by admixing (1) the ester-substituted colorant, (2) bromine, and (3) a solvent followed by quenching the third reaction mixture with water to form a brominated ester-substituted colorant and a salt thereof, of the formulae

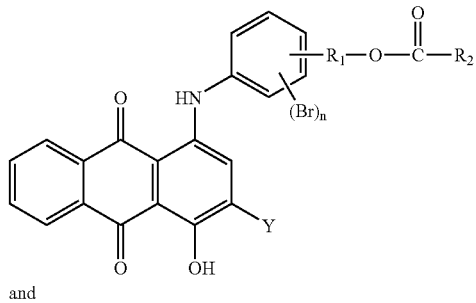

and

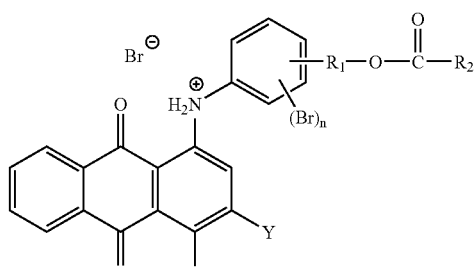

wherein Y is a hydrogen atom or a bromine atom and n is an integer of 1, 2, 3, or 4.

Brominated ester-substituted colorants according to the present invention of the formula

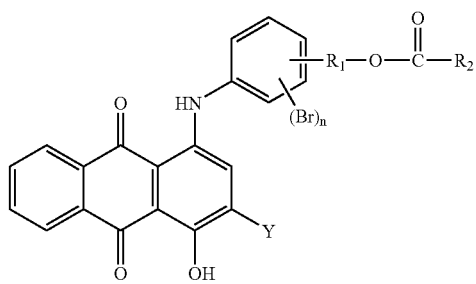

can also be prepared by a process which comprises (a) preparing a first reaction mixture by admixing (1) leucoquinizarin and, optionally, quinizarin, (2) an aminobenzene substituted with an alcohol group of the formula —$R_1$—OH, wherein $R_1$ is an alkylene group or an arylalkylene group, (3) boric acid, and (4) an optional solvent, and heating the first reaction mixture to prepare an alcohol-substituted colorant of the formula

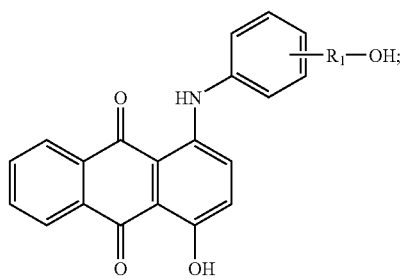

(b) preparing a second reaction mixture by admixing (1) the alcohol-substituted colorant, (2) bromine, and (3) a solvent followed by quenching the second reaction mixture with water to form a brominated alcohol-substituted colorant and a salt thereof, of the formulae

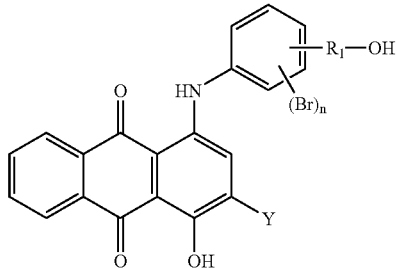

and

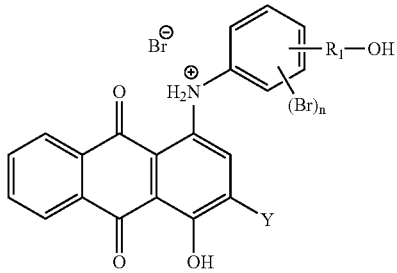

wherein Y is a hydrogen atom or a bromine atom and n is an integer of 0, 1, 2, 3, or 4; and (c) forming a third reaction mixture by admixing (1) the brominated alcohol-substituted colorant, (2) a carboxylic acid of the formula $R_2COOH$, wherein $R_2$ is an alkyl group, an aryl group, an arylalkyl group, or an alkylaryl group, (3) an optional esterification catalyst, and (4) a solvent and heating the third reaction mixture to form a brominated ester-substituted colorant of the formula

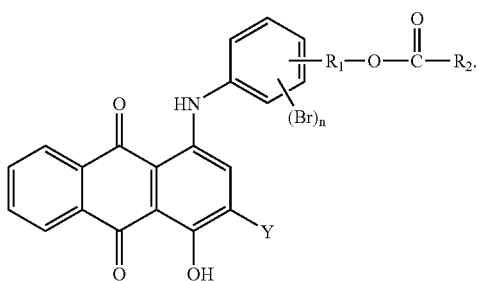

One disadvantage of running the bromination on the unprotected alcohol is that from about 10 to about 20 percent of the alcohol can be converted by the evolved HBr to the alkylbromide derivative; this derivative generally is not believed to be convertd to the desired ester in the next step of the synthesis and generally is removed by recrystallization. Nevertheless, in some embodiments, bromination of the unprotected alcohol can also be desirable.

Urethane-substituted colorants according to the present invention of the formula

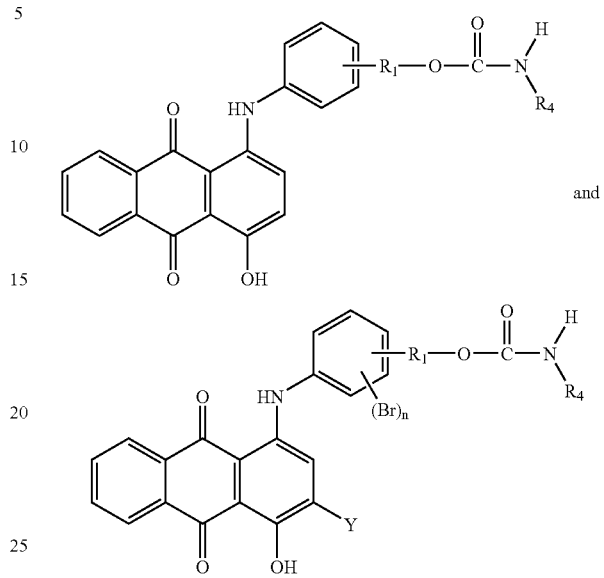

can be prepared by any desired or effective method. One specific method entails the reaction of either an alcohol-substituted colorant according to the present invention of the formula

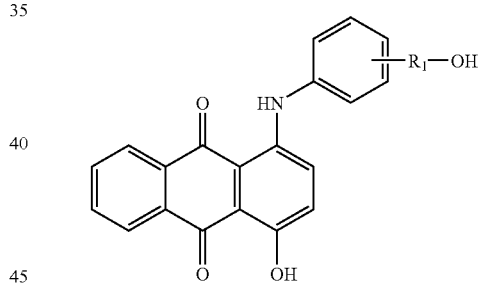

or a brominated alcohol-substituted colorant according to the present invention of the formula

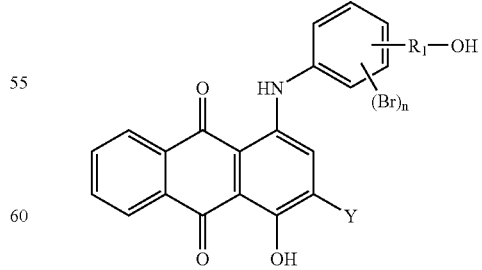

with an isocyanate. Isocyanates react with alcohols to form urethanes. For example, a monoisocyanate reacts with an alcohol to form a urethane as follows:

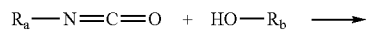

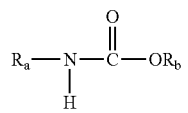

wherein $R_a$ and $R_b$ each, independently of the other, is an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from about 5 to about 100 carbon atoms, although the number of carbon atoms can be outside of this range, an aryl group (including unsubstituted and substituted aryl groups, and wherein hetero atoms, such as oxygen, nitrogen, sulfur, silicon, phosphorus, and the like either may or may not be present in the aryl group), typically with from about 5 to about 20 carbon atoms, although the number of carbon atoms can be outside of this range, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), typically with from about 6 to about 50 carbon atoms, although the number of carbon atoms can be outside of this range, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), typically with from about 6 to about 50 carbon atoms, although the number of carbon atoms can be outside of this range, and wherein the substituents on the substituted alkyl, alkylene, aryl, arylene, arylalkyl, arylalkylene, alkylaryl, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring. Diisocyanates react similarly; for example, isophorone diisocyanate reacts with two moles of alcohol to form a diurethane as follows:

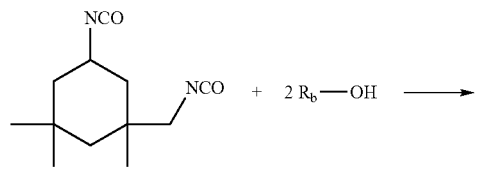

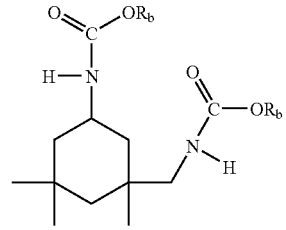

Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include octadecylisocyanate; hexadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like, as well as mixtures thereof. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI); hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Any suitable reaction condition for making urethane compounds by condensing alcohol's with isocyanates can be used to prepare urethane-substituted colorants according to the present invention. Typically (although not necessarily), the reaction is carried out at elevated temperatures (for example, from about 60 to about 160° C.) in the presence of an optional urethane reaction catalyst, such as dibutyl tindilaurate, bismuth tris-neodecanoate, cobalt benzoate, lithium acetate, stannous octoate, triethylamine, or the like. In a specific embodiment, the reaction conditions are conducted in an inert atmosphere, such as argon or nitrogen gas or other suitable gases, to prevent oxidizing or yellowing of the reaction products and to prevent undesirable side reactions. The reaction can employ an inert solvent, such as toluene or the like, or can be performed neat (i.e., without a solvent). The mole ratio of reactants is adjusted so that the isocyanate functionalities are completely consumed in the reaction with a slight molar excess of alcohol-substituted colorant typically remaining. The reactants can be added together in any order and/or added to the reaction as physical mixtures. If desired, reaction conditions and the order of the addition of reactants can be controlled for several reasons, such as to provide a controlled exothermic reaction, to tailor the distribution of molecules in the antioxidant-containing material, or the like. When doing these adjustments, the different reactivities to isocyanates of alcohols versus amines can be employed, as well as the different reactivities of the two separate isocyanate groups on IPDI. See, for example, J. H. Saunders and K. C. Frisch's "Polyurethanes Part I, Chemistry" published by Interscience of New York, N.Y. in 1962 and Olin Chemicals' LUXATE® IM isophorone diisocyanate technical product information sheet, which provide further explanation of this chemistry.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Part A

In a glass reaction flask were combined 73 grams of sublimed quinizarin (obtained from Aceto Corp., Lake Success, N.Y.), 49 grams of leucoquinizarin (obtained from Aceto Corp.), 66 grams of 4-aminobenzene ethanol (obtained from Aceto Corp.), 31 grams of boric acid (obtained from Aldrich Chemical Co., Milwaukee, Wis.), and 780 grams of methanol (obtained from J T Baker, Phillipsburg, N.J.). The materials were mixed and heated until the solvent refluxed at about 66° C.

After about 16 hours of reflux the reaction was complete, having generated an alcohol-substituted colorant of the formula

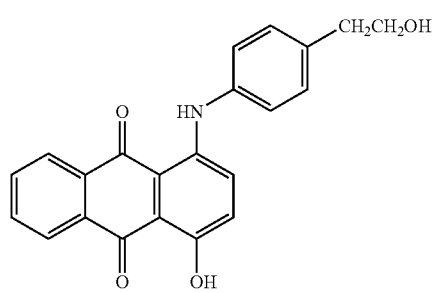

The reaction mixture was cooled and filtered. The product filter cake was dried in air at ambient temperature.

The spectral strength of the alcohol-substituted colorant was determined using a spectrophotographic procedure based on the measurement of the colorant in solution by dissolving the colorant in toluene and measuring the absorbance using a Perkin Elmer Lambda 2S UV/VIS spectrophotometer. The spectral strength of the alcohol-substituted colorant was measured as about 21,000 mL Absorbance Units per gram at absorption $\lambda_{max}$, indicating a purity of about 80 percent.

Part B-1

In a glass reaction flask were combined 8 grams of the alcohol-substituted colorant prepared in Part A of this Example, 68 grams of glacial acetic acid (obtained from J T Baker), 13 grams of propionic acid (obtained from Aldrich Chemical Co.), and 2.3 grams of acetic anhydride (obtained from Aldrich Chemical Co.). The materials were mixed and heated to a reflux temperature of about 121° C. After about 4 hours of reflux, the reaction was complete and the reaction mixture contained an ethyl acetate-substituted colorant of the formula

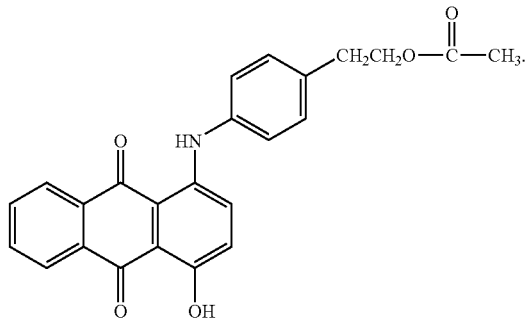

Part B-2

In a glass reaction flask were combined 12 grams of the alcohol-substituted colorant prepared in Part A of this Example, 10.2 grams of dimer diisocyanate (obtained from Cognis; these materials are also described in, for example, *Kirk-Othmer Encyclopedia of Chemical Technology* 1979, volume 7, 3$^{rd}$ edition, p. 768–782, John Wiley and Sons, Inc., the disclosure of which is totally incorporated herein by reference), and 1 drop of FASCAT 4202 catalyst (obtained from Atofina). The materials were mixed and heated to a temperature of about 120° C. After about 1 hour of heating, the reaction mixture became very thick, so the temperature was raised to about 150° C. and stirred for 4 hours. IR analysis showed that the reaction was complete (no isocyanate peak) and the reaction mixture contained a dimer-diurethane-substituted colorant of the formula

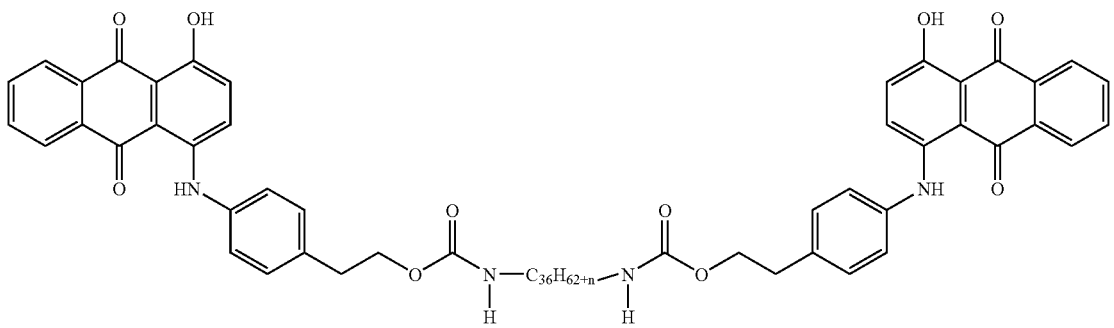

wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formula

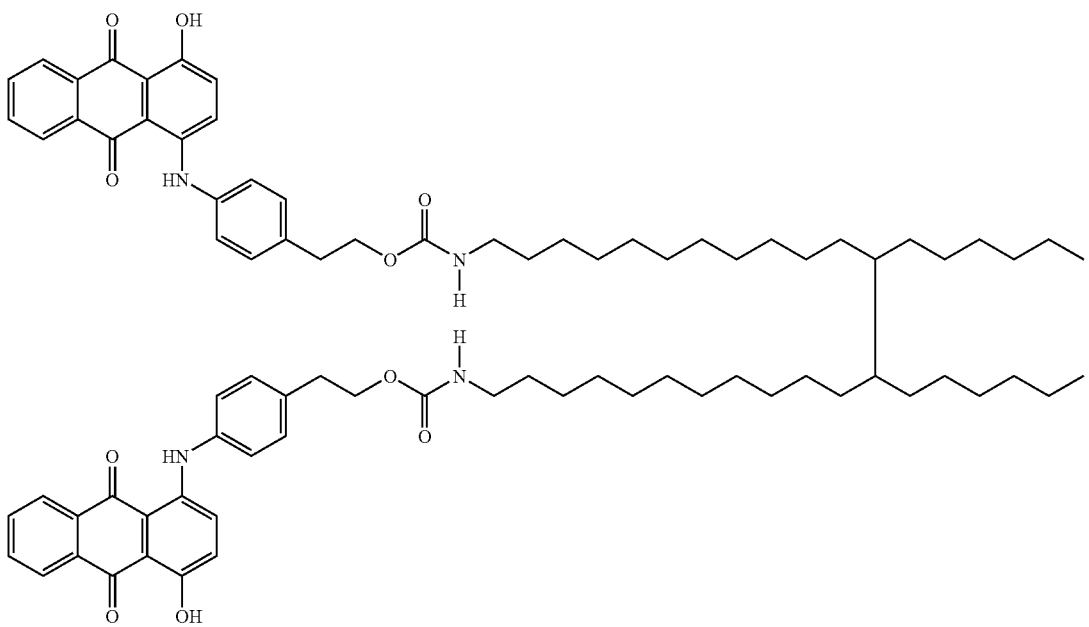

Part B-3

In a glass reaction flask fitted with a Dean-Stark trap were combined 5 grams of the alcohol-substituted colorant prepared in Part A of this Example, 60 grams of xylenes (obtained from Aldrich Chemical Co.), 8.4 grams of the Guerbet acid 2-hexadecyl-1-eicosanoic acid (ISOCARB 36, obtained from Condea Vista, Austin, Tex.), and 0.25 grams of p-toluene sulfonic acid (obtained from Boliden Intertrade). The materials were mixed and heated to a reflux in an oil bath at 150° C. After about 19 hours of reflux, the reaction was complete and the reaction mixture contained an ISOCARB-36-ester substituted colorant of the formula

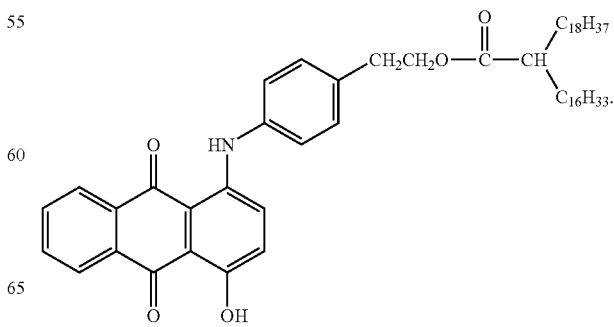

Part B-4

In a glass reaction flask fitted with a Dean-Stark trap were combined 15 grams of the alcohol-substituted colorant prepared in Part A of this Example, 200 grams of xylenes (obtained from Aldrich Chemical Co.), 14.3 grams dimer acid hydrogenated (known as PRIPOL 1006, obtained from Unichema International; these materials are also described in, for example, *Kirk-Othmer Encyclopedia of Chemical Technology* 1979, volume 7, 3$^{rd}$ edition, p. 768–782, John Wiley and Sons, Inc., the disclosure of which is totally incorporated herein by reference), and 0.5 grams of p-toluene sulfonic acid (obtained from Boliden Intertrade). The materials were mixed and heated to a reflux in an oil bath at 150° C. After about 19 hours of reflux, the reaction was complete and the reaction mixture contained a dimer acid di-substituted colorant of the formula

Part B-5

In a glass reaction flask were combined 3.0 grams of the alcohol-substituted colorant prepared in Part A of this Example and 6.4 grams of hydroabietyl alcohol (obtained as Abitol E from Hercules Inc., Wilmington Del.). The mixture was heated to a temperature of about 140° C. until it was homogeneous. 1 drop of FASCAT 4202 catalyst (obtained from Atofina) and 3.2 grams of isophorone diisocyanate (DESMODUR I, obtained from Bayer Corp., Pittsburgh, Pa.) were then added and the materials were mixed and heated to a temperature of about 140° C. After about 5 hours of heating, IR analysis showed that the reaction was complete (no isocyanate peak) and the reaction mixture contained a diurethane-substituted colorant of the formula

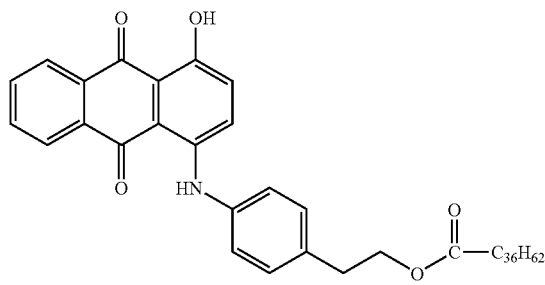
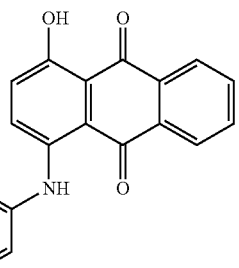

wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formula

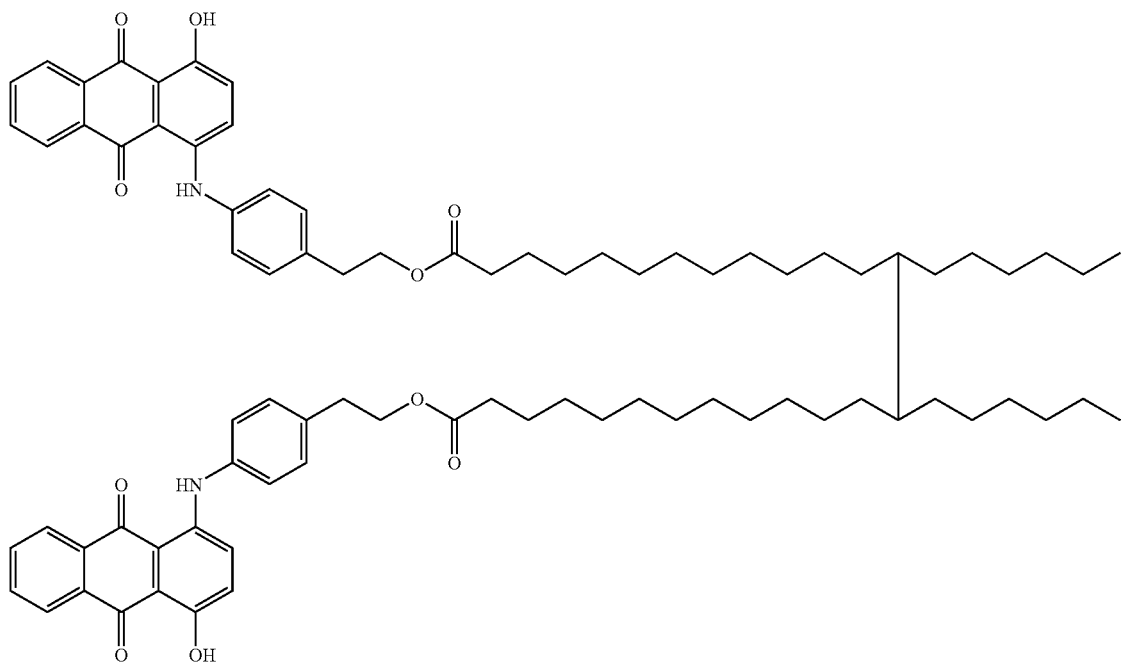

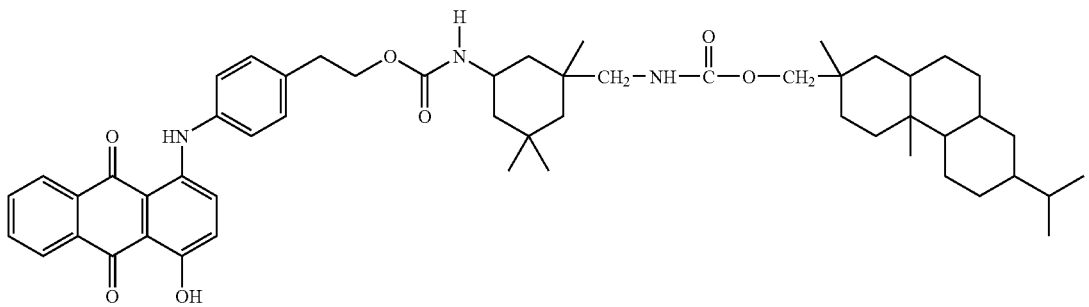

Part C-1

About 91 grams of the reaction mixture containing the ethyl acetate-substituted colorant from Part B-1 of this Example was charged into a glass reaction flask. The mixture was cooled to a minimum of 30° C. While mixing, about 9 grams of bromine (obtained from Aldrich Chemical Co.) was added to the mixture at a rate such that the temperature remained below about 40° C. The mixture was then heated to about 40° C. After about 24 hours of mixing the reaction was complete.

The reaction mixture was then quenched into 234 grams of deionized water and allowed to cool to room temperature. The reaction mixture was then filtered. The filter cake was reslurried and filtered twice in deionized water to remove most of the residual acetic acid. The filter cake was then dried in a 60° C. oven. This filter cake contained a mixture of brominated ethyl acetate-substituted colorants of the formulae

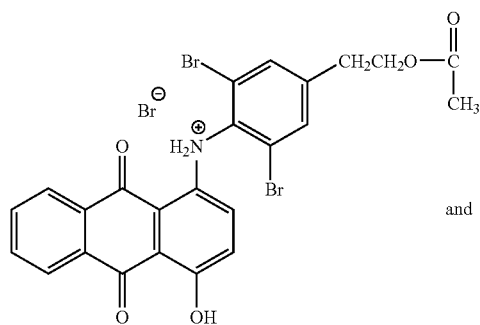

and

-continued

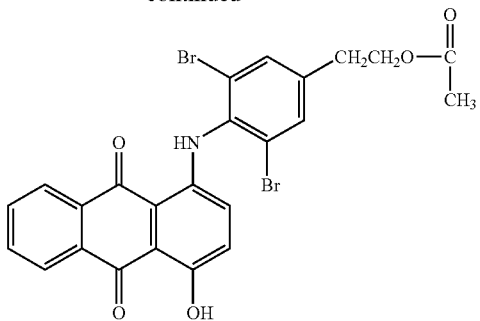

The spectral strength of the brominated ethyl acetate-substituted colorant was determined using a spectrophotographic procedure based on the measurement of the colorant in solution by dissolving the colorant in toluene and measuring the absorbance using a Perkin Elmer Lambda 2S UV/VIS spectrophotometer. The spectral strength of the brominated ethyl acetate-substituted colorant was measured as about 15,000 mL Absorbance Units per gram at absorption $\lambda_{max}$. This spectral strength indicated a purity of about 60 percent.

Part C-2

The process of Part C-1 of this Example is repeated except that the colorant from Part B-1 of this Example is replaced with the colorant from Part B-2 of this Example. It is believed that a colorant of the formulae

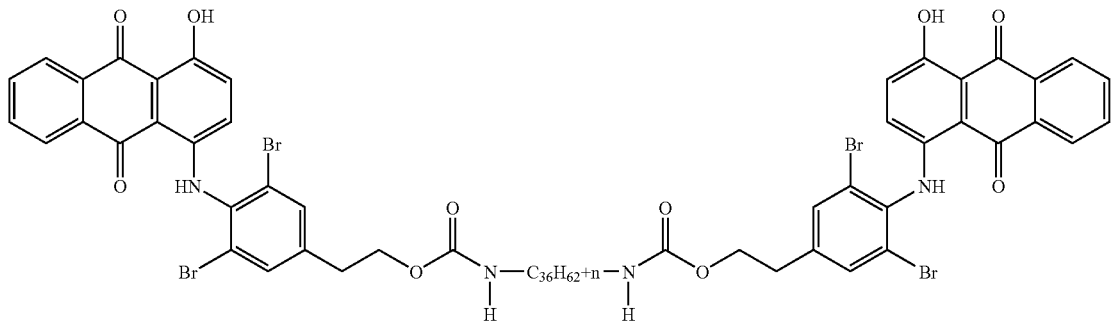

and

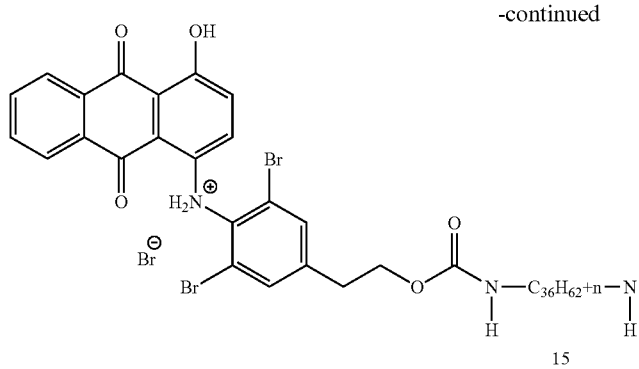
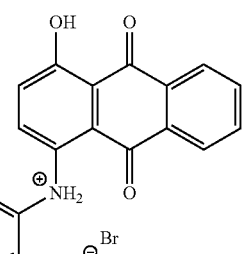
wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formulae
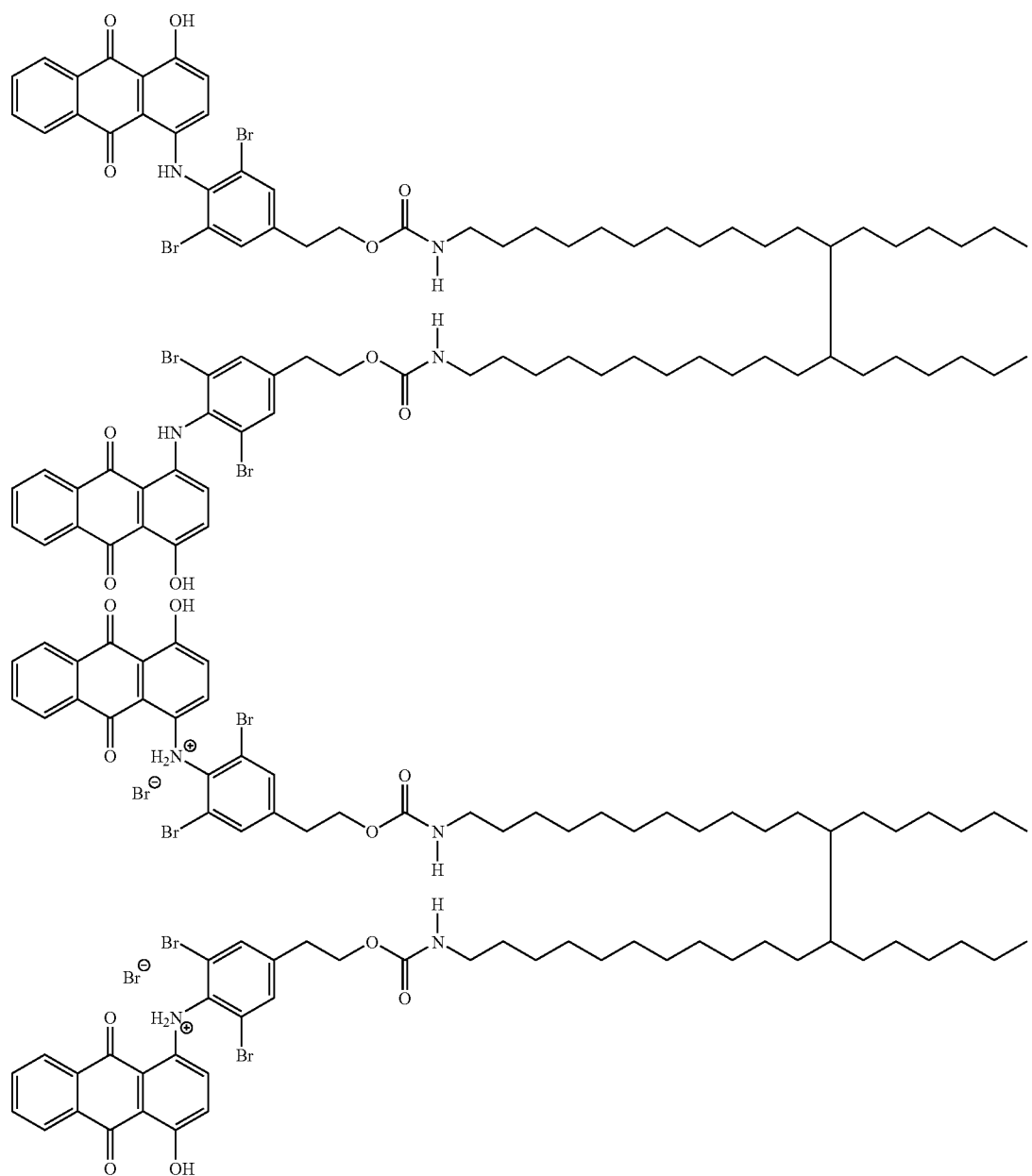
will be obtained.

Part C-3

The process of Part C-1 of this Example is repeated except that the colorant from Part B-1 of this Example is replaced with the colorant from Part B-3 of this Example. It is believed that a colorant of the formulae

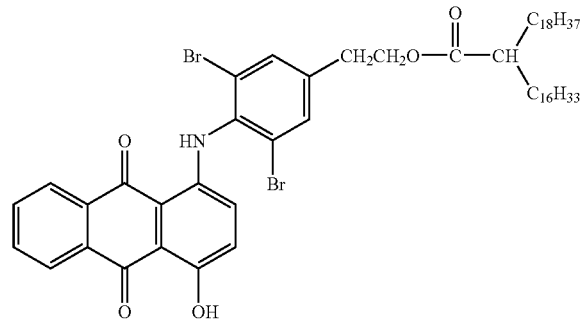

and

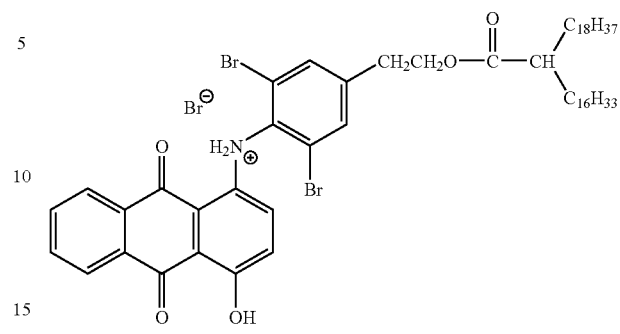

will be obtained.

Part C-4

The process of Part C-1 of this Example is repeated except that the colorant from Part B-1 of this Example is replaced with the colorant from Part B-4 of this Example. It is believed that a colorant of the formulae

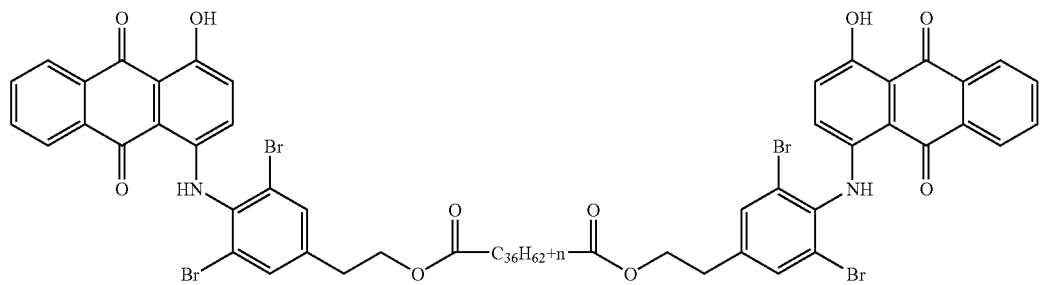

and

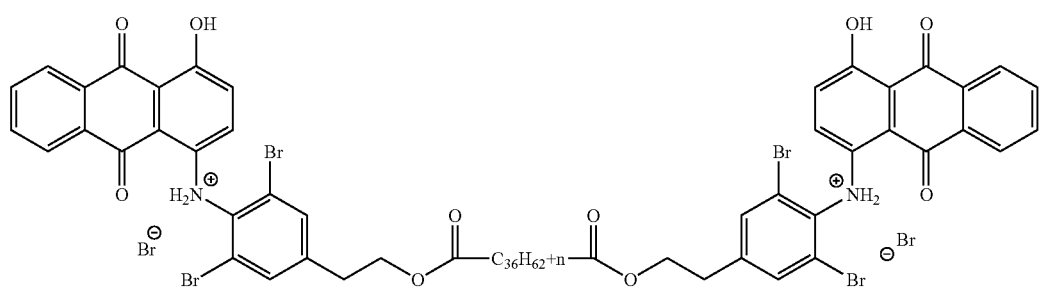

wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formula
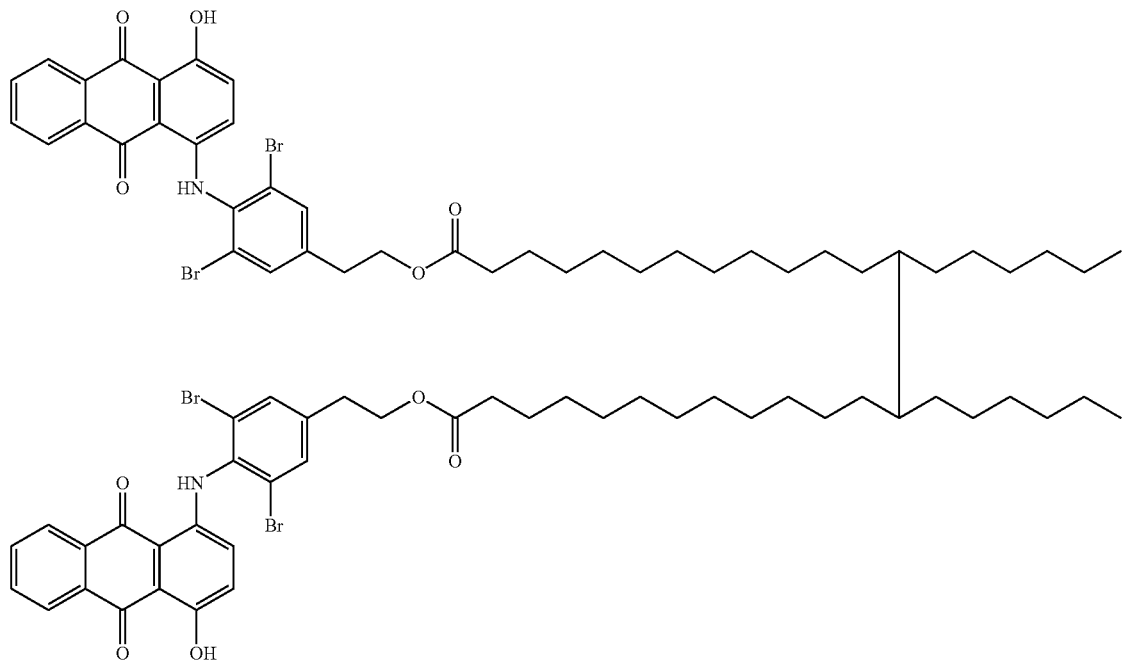
and
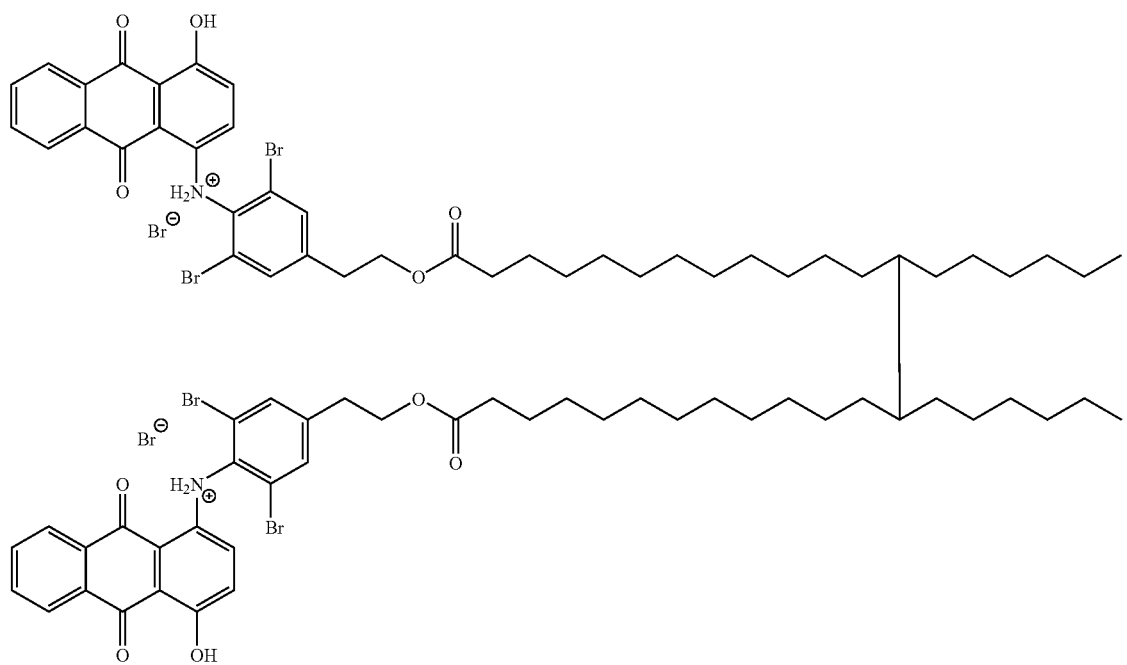
will be obtained.

Part C-5

The process of Part C-1 of this Example is repeated except that the colorant from Part B-1 of this Example is replaced with the colorant from Part B-5 of this Example. It is believed that a colorant of the formulae

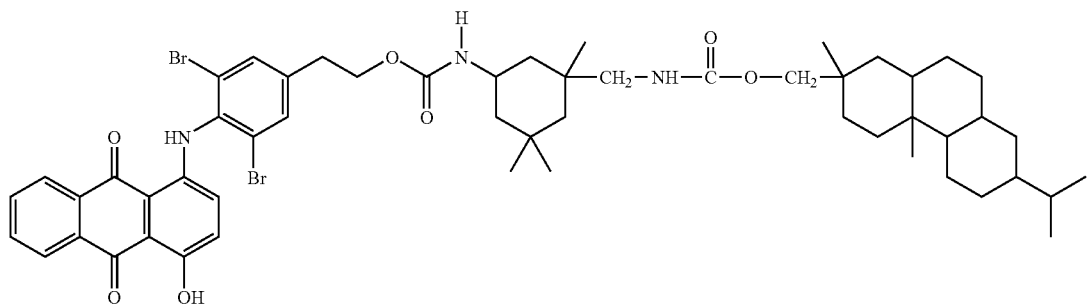

and

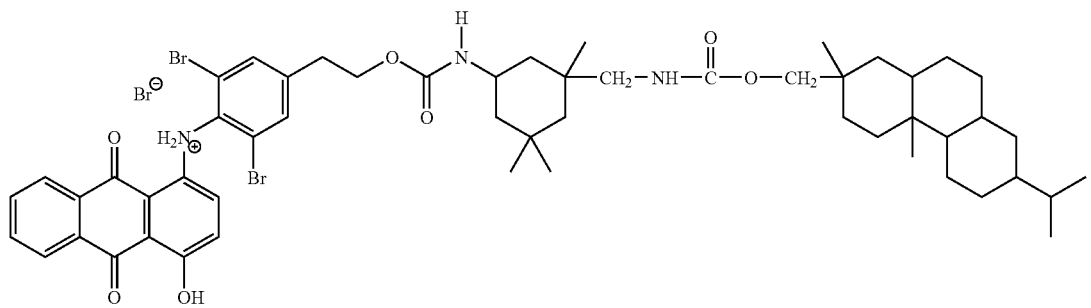

will be obtained.

Part D

In a glass reaction flask were combined 18 grams of the mixture of the brominated ethyl acetate-substituted colorant and its salt prepared in Part C-1 of this Example, 72 grams of N-methyl-2-pyrrolidone (obtained from Aldrich Chemical Co.), 4 grams of sodium hydroxide (obtained from Aldrich Chemical Co.), and 4 grams of deionized water. The materials were mixed and heated to about 60° C. After about 3 hours the reaction was complete.

The reaction mixture was then quenched into 234 grams of deionized water and allowed to cool to room temperature. Glacial acetic acid was added until the solution reached a pH of between 6 and 7. The reaction mixture was then filtered. The filter cake was reslurried and filtered twice in deionized water to remove most of the residual N-methyl-2-pyrrolidone. The filter cake was then dried in a 60° C. oven. This filter cake contained a brominated alcohol-substituted colorant of the formula

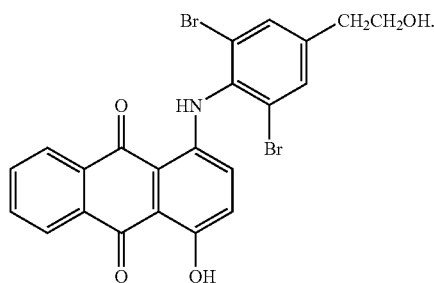

The spectral strength of the brominated alcohol-substituted colorant was determined using a spectrophotographic procedure based on the measurement of the colorant in solution by dissolving the colorant in an equal mixture of toluene and tetrahydrofuran and measuring the absorbance using a Perkin Elmer Lambda 2S UV/VIS spectrophotometer. The spectral strength of the brominated alcohol-substituted colorant was measured as about 16,000 mL Absorbance Units per gram at absorption $\lambda_{max}$. This spectral strength indicated a purity of about 60 percent.

Part E

In a glass reaction flask were combined 16 grams of the brominated alcohol-substituted colorant prepared in Part D of this Example, 31 grams of UNICID® 700 (a material containing carboxylic acid of the formula $R_2COOH$ wherein $R_2$ is a linear alkyl group having an average of about 50 carbon atoms, also containing other unfunctionalized wax materials in an amount of up to about 25 percent by weight; obtained from Baker Petrolite, Sugarland, Tex.), 152 grams of xylene (obtained from Tarr, Inc., Portland, Oreg.), and 0.6 grams of para-toluenesulfonic acid (obtained from Capital Resin Corp., Columbus, Ohio). The materials were mixed and heated to a reflux temperature of about 143° C. After about 7 hours, the reaction was complete.

The reaction mixture was then cooled to 40° C. and filtered. The filter cake was reslurried and filtered two more times in methanol to remove residual xylene. The filter cake was then dried in air at ambient temperature. This filter cake contained a colorant of the formula

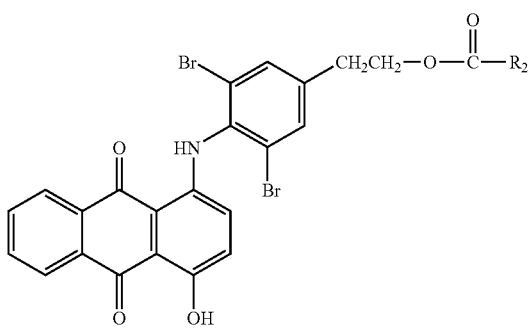

wherein R₂ is a linear alkyl group having an average of about 50 carbon atoms.

The spectral strength of the colorant was determined using a spectrophotographic procedure based on the measurement of the colorant in solution by dissolving the colorant in an equal mixture of toluene and tetrahydrofuran and measuring the absorbance using a Perkin Elmer Lambda 2S UV/VIS spectrophotometer. The spectral strength of the colorant was measured as about 5,000 mL Absorbance Units per gram at absorption $\lambda_{max}$. This spectral strength indicated a purity of about 40 percent.

Part F

Compounds of the formulae shown in Parts C-1 through C-5 of this Example are prepared by reversing steps B and C of this Example. More specifically, the alcohol-substituted colorant prepared in Part A of this Example is first subjected to bromination as described in Parts C-1 through C-5 of this Example, and the resulting brominated alcohol-substituted colorants are then subjected to esterification as described in Parts C-1 through C-5 of this Example.

EXAMPLE II

Part A

In a glass reaction flask are combined 73 grams of sublimed quinizarin (available from Aceto Corp., Lake Success, N.Y.), 49 grams of leucoquinizarin (available from Aceto Corp.), 66 grams of 3-aminobenzene ethanol (available from Frinton Labs, Vineland, N.J.), 31 grams of boric acid (available from Aldrich Chemical Co., Milwaukee, Wis.), and 780 grams of methanol (available from J T Baker, Phillipsburg, N.J.). The materials are mixed and heated until the solvent refluxes at about 66° C. After about 16 hours of reflux, it is believed that the reaction will be complete, having generated an alcohol-substituted colorant of the formula

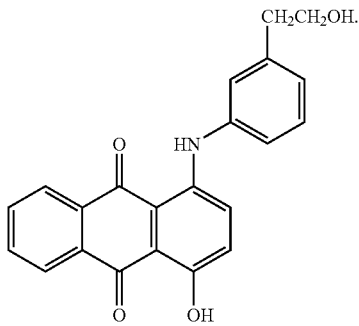

The reaction mixture is cooled and filtered. The product filter cake is dried in air at ambient temperature. The spectral strength of the alcohol-substituted colorant is determined using a spectrophotographic procedure based on the measurement of the colorant in solution by dissolving the colorant in toluene and measuring the absorbance using a Perkin Elmer Lambda 2S UV/VIS spectrophotometer. The spectral strength of the alcohol-substituted colorant is believed to be measured as about 21,000 mL Absorbance Units per gram at absorption $\lambda_{max}$.

Part B-1

In a glass reaction flask are combined 8 grams of the alcohol-substituted colorant prepared in Part A of this Example, 68 grams of glacial acetic acid (available from J T Baker), 13 grams of propionic acid (available from Aldrich Chemical Co.), and 2.3 grams of acetic anhydride (available from Aldrich Chemical Co.). The materials are mixed and heated to a reflux temperature of about 121° C. After about 4 hours of reflux, the reaction is complete and the reaction mixture contains an ethyl acetate-substituted colorant of the formula

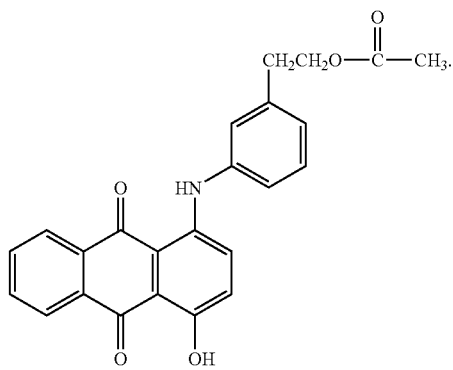

Part B-2

In a glass reaction flask are combined 12 grams of the alcohol-substituted colorant prepared in Part A of this Example, 10.2 grams of dimer diisocyanate (available from Cognis; these materials are also described in, for example, *Kirk-Othmer Encyclopedia of Chemical Technology* 1979, volume 7, 3$^{rd}$ edition, p. 768–782, John Wiley and Sons, Inc., the disclosure of which is totally incorporated herein by reference), and 1 drop of FASCAT 4202 catalyst (available from Atofina). The materials are mixed and heated to a temperature of about 120° C. After about 1 hour of heating, the reaction mixture becomes very thick, so the temperature is raised to about 150° C. and stirred for 4 hours. It is believed that IR analysis will show that the reaction is complete (no isocyanate peak), and that the reaction mixture will contain a dimer-diurethane-substituted colorant of the formula

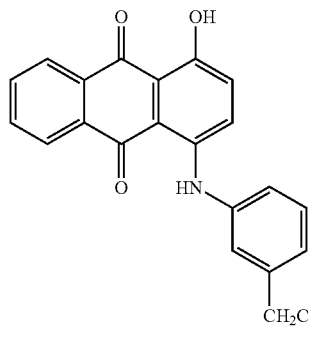
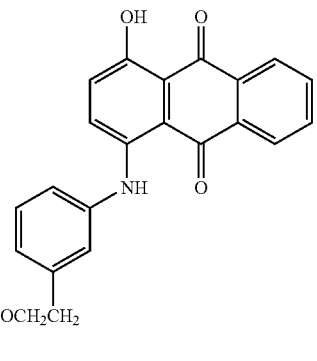

wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formula

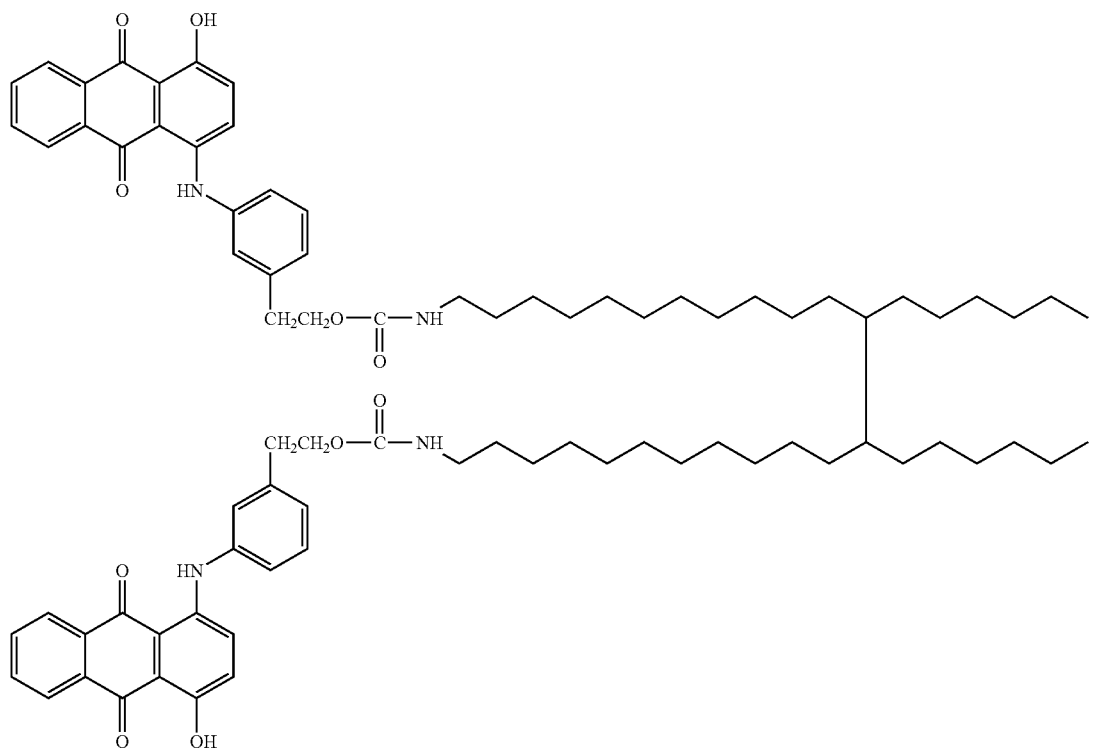

Part B-3

In a glass reaction flask fitted with a Dean-Stark trap are combined 5 grams of the alcohol-substituted colorant prepared in Part A of this Example, 60 grams of xylenes (available from Aldrich Chemical Co.), 8.4 grams of the Guerbet acid 2-hexadecyl-1-eicosanoic acid (ISOCARB 36, available from Condea Vista, Austin, Tex.), and 0.25 grams of p-toluene sulfonic acid (available from Boliden Intertrade). The materials are mixed and heated to a reflux in an oil bath at 150° C. After about 19 hours of reflux, it is believed that the reaction will be complete and that the reaction mixture will contain an ISOCARB-36-ester substituted colorant of the formula Part B-4

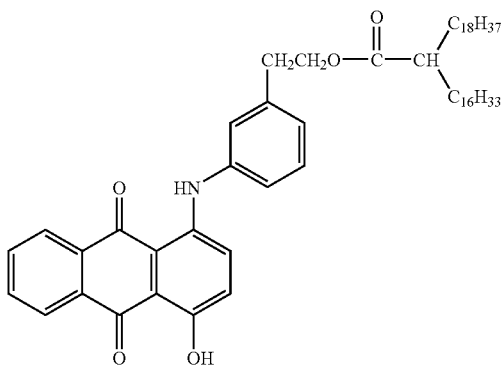

In a glass reaction flask fitted with a Dean-Stark trap are combined 15 grams of the alcohol-substituted colorant prepared in Part A of this Example, 200 grams of xylenes (available from Aldrich Chemical Co.), 14.3 grams of dimer acid hydrogenated (known as PRIPOL 1006, available from Unichema International; these materials are also described in, for example, *Kirk-Othmer Encyclopedia of Chemical Technology* 1979, volume 7, 3$^{rd}$ edition, p. 768–782, John Wiley and Sons, Inc., the disclosure of which is totally incorporated herein by reference), and 0.5 grams of p-toluene sulfonic acid (available from Boliden Intertrade). The materials are mixed and heated to a reflux in an oil bath at 150° C. After about 19 hours of reflux, it is believed that the reaction will be complete and that the reaction mixture will contain a dimer acid di-ester substituted colorant of the formula

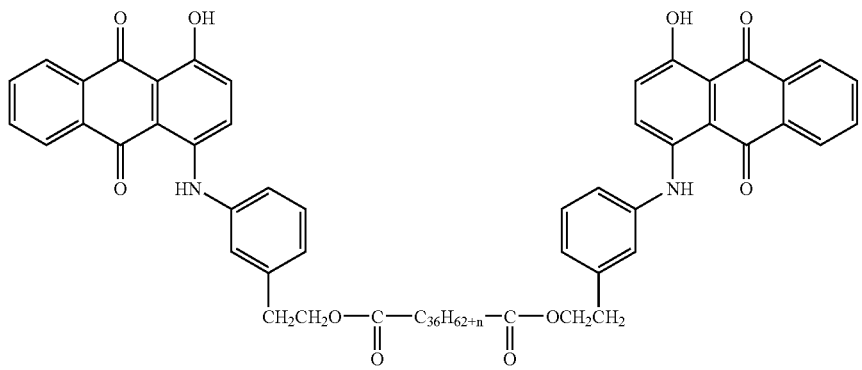

wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formula

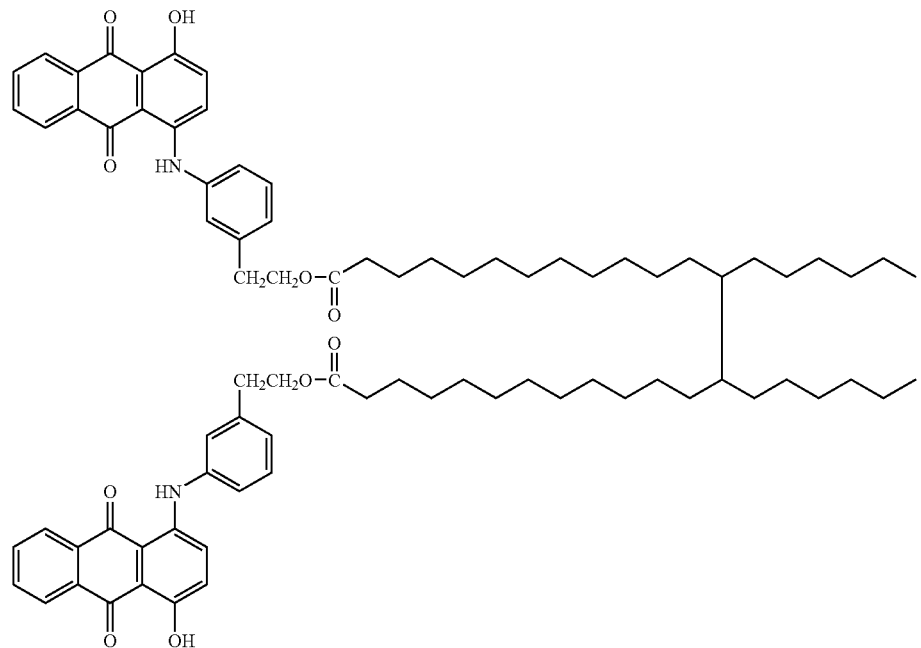

Part B-5

In a glass reaction flask are combined 3.0 grams of the alcohol-substituted colorant prepared in Part A of this Example and 6.4 grams of hydroabietyl alcohol (available as Abitol E from Hercules Inc., Wilmington, Del.) and the mixture is heated to a temperature of about 140° C. until it is homogeneous. 1 drop of FASCAT 4202 catalyst (available from Atofina) and 3.2 grams of isophorone diisocyanate (available as DESMODUR I from Bayer Corp., Pittsburgh, Pa.) are then added and the materials are mixed and heated to a temperature of about 140° C. After about 5 hours of heating, it is believed that IR analysis will show that the reaction is complete (no isocyanate peak) and that the reaction mixture will contain a diurethane-substituted colorant of the formula

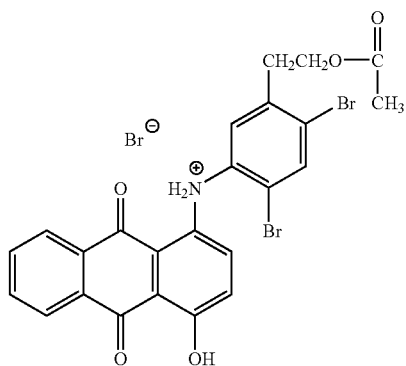

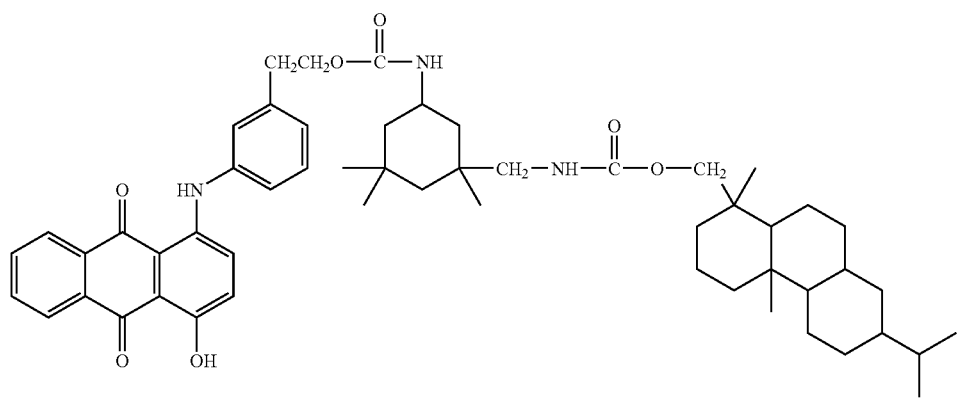

Part C-1

About 91 grams of the reaction mixture containing the ethyl acetate-substituted colorant from Part B-1 of this Example is charged into a glass reaction flask. The mixture is cooled to a minimum of 30° C. While mixing, about 9 grams of bromine (available from Aldrich Chemical Co.) is added to the mixture at a rate such that the temperature remains below about 40° C. The mixture is then heated to about 40° C. After about 24 hours of mixing, the reaction is complete. The reaction mixture is then quenched into 234 grams of deionized water, allowed to cool to room temperature, and filtered. The filter cake is reslurried and filtered twice in deionized water to remove most of the residual acetic acid. The filter cake is then dried in a 60° C. oven. It is believed that this filter cake will contain a mixture of brominated ethyl acetate-substituted colorants of the formulae and -continued

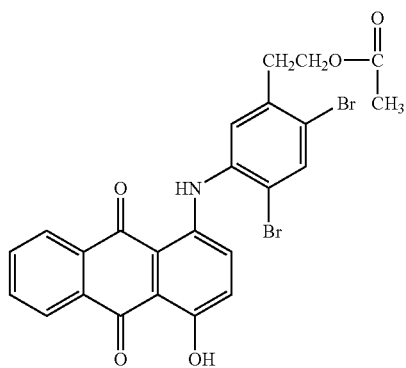

The spectral strength of the brominated ethyl acetate-substituted colorant is determined using a spectrophotographic procedure based on the measurement of the colorant in solution by dissolving the colorant in toluene and measuring the absorbance using a Perkin Elmer Lambda 2S UV/VIS spectrophotometer. It is believed that the spectral strength of the alcohol-substituted colorant will be measured as about 21,000 mL Absorbance Units per gram at absorption $\lambda_{max}$.

Part C-2

The process of Part C-1 of this Example is repeated except that the colorant from Part B-1 of this Example is replaced with the colorant from Part B-2 of this Example. It is believed that a colorant of the formulae

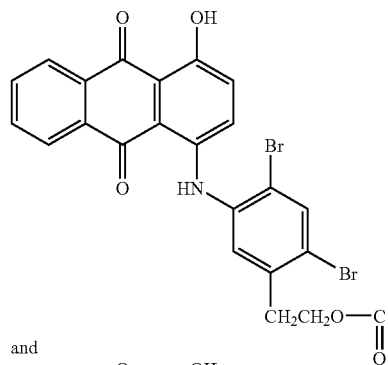
and
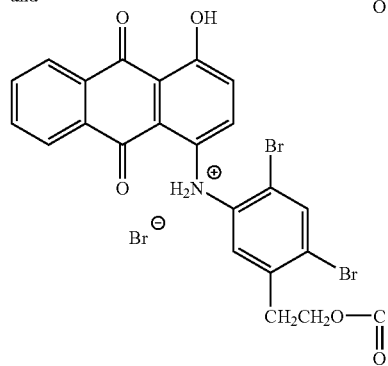
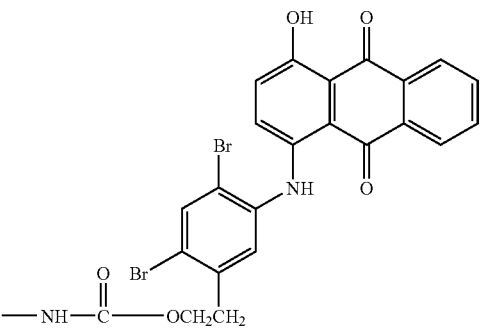
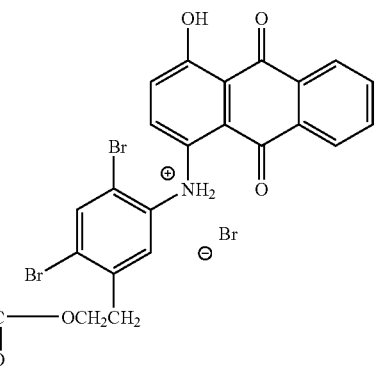

wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formulae

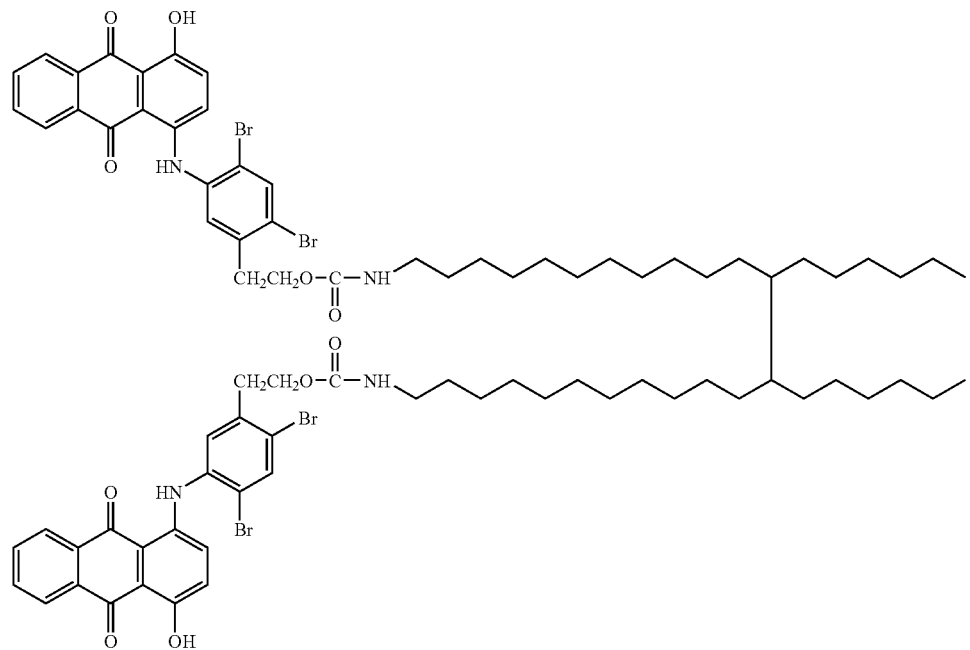

and

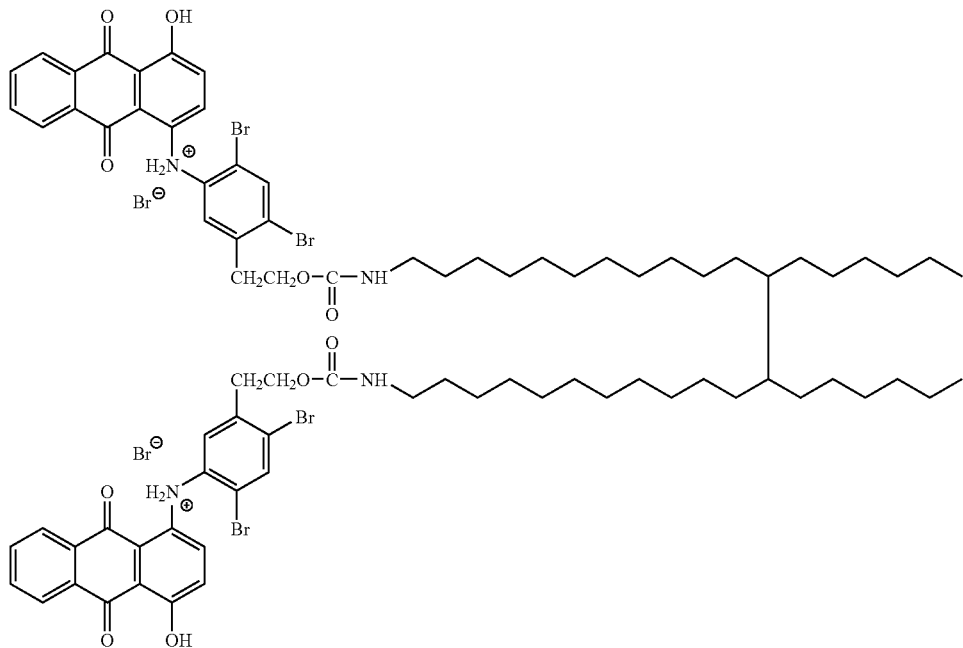

will be obtained.

Part C-3

The process of Part C-1 of this Example is repeated except that the colorant from Part B-1 of this Example is replaced with the colorant from Part B-3 of this Example. It is believed that a colorant of the formulae

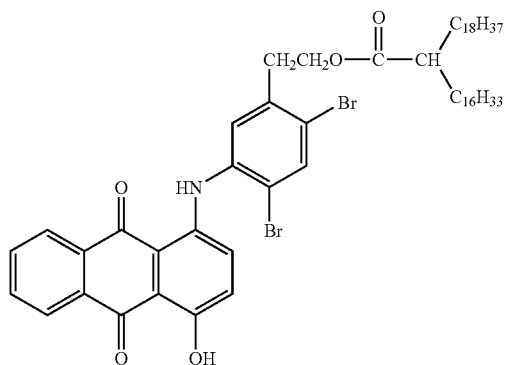

and

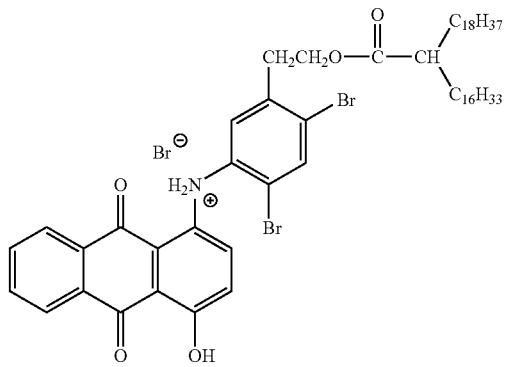

will be obtained.

Part C-4

The process of Part C-1 of this Example is repeated except that the colorant from Part B-1 of this Example is replaced with the colorant from Part B-4 of this Example. It is believed that a colorant of the formulae

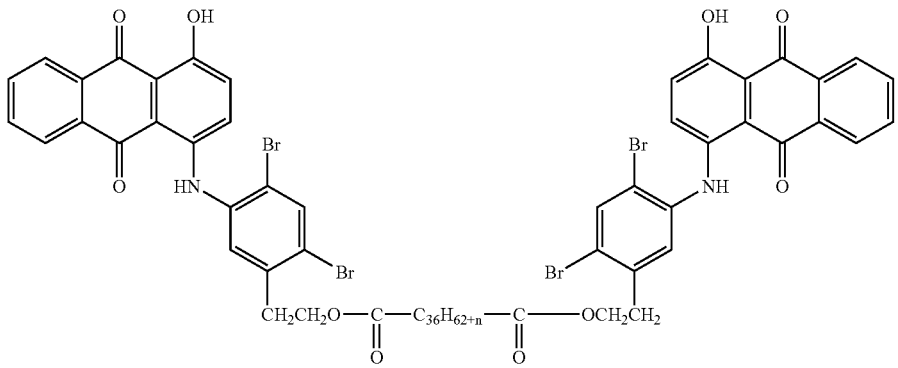
and
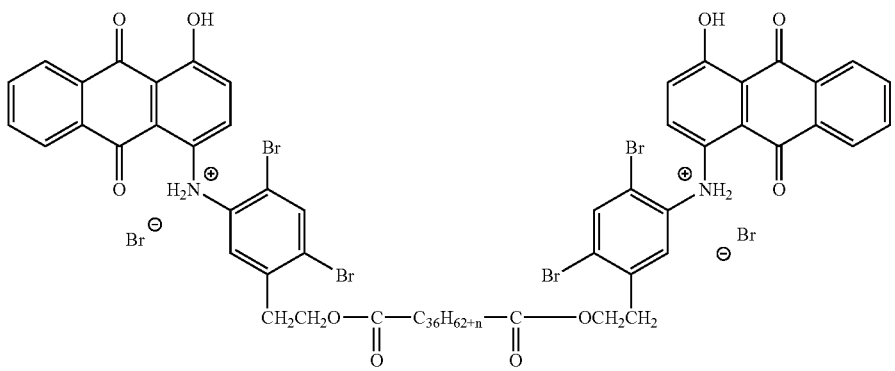
wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formula
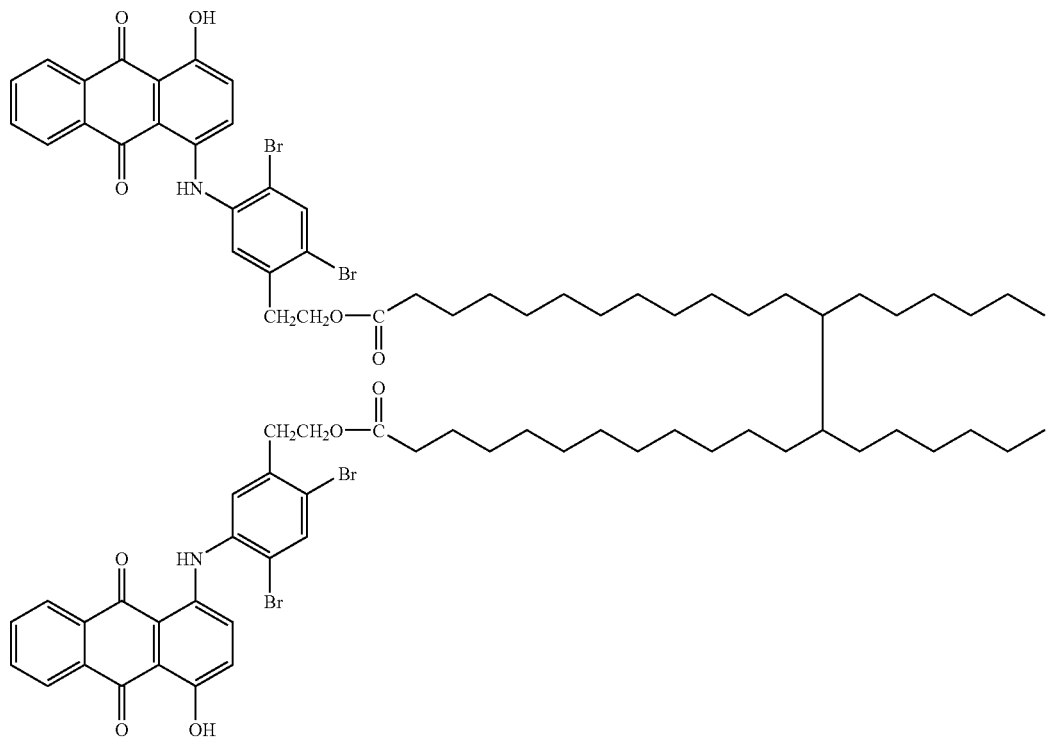
and

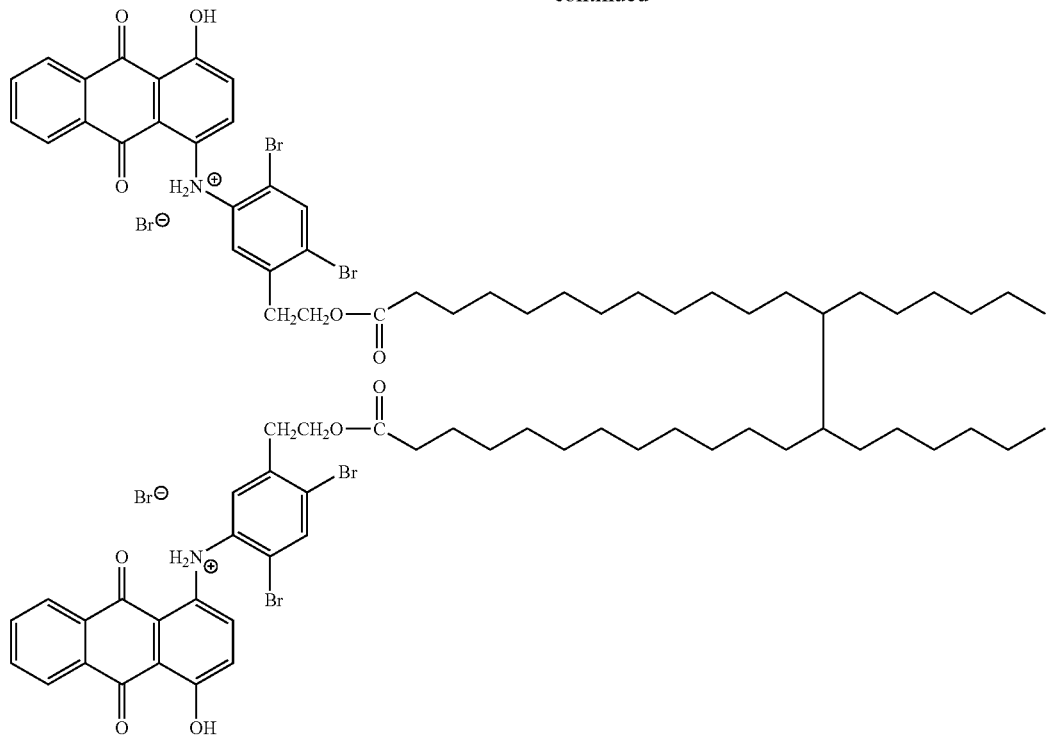
will be obtained.
Part C-5
The process of Part C-1 of this Example is repeated except that the colorant from Part B-1 of this Example is replaced with the colorant from Part B-5 of this Example. It is believed that a colorant of the formulae
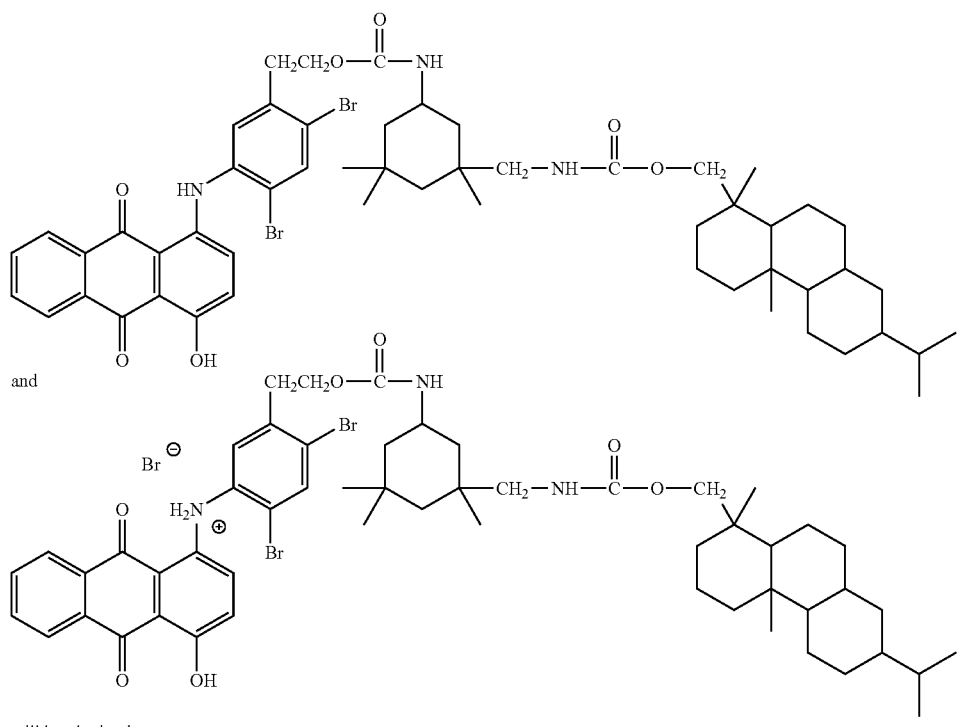
will be obtained.

Part D

In a glass reaction flask are combined 18 grams of the mixture of the brominated ethyl acetate-substituted colorant and its salt prepared in Part C-1 of this Example, 72 grams of N-methyl-2-pyrrolidone (available from Aldrich Chemical Co.), 4 grams of sodium hydroxide (available from Aldrich Chemical Co.), and 4 grams of deionized water. The material is mixed and heated to about 60° C. After about 3 hours the reaction is complete. The reaction mixture is then quenched into 234 grams of deionized water and allowed to cool to room temperature. Glacial acetic acid is added until the solution reaches a pH of between 6 and 7. The reaction mixture is then filtered. The filter cake is reslurried and filtered twice in deionized water to remove most of the residual N-methyl-2-pyrrolidone. The filter cake is then dried in a 60° C. oven. It is believed that this filter cake will contain a brominated alcohol-substituted colorant of the formula

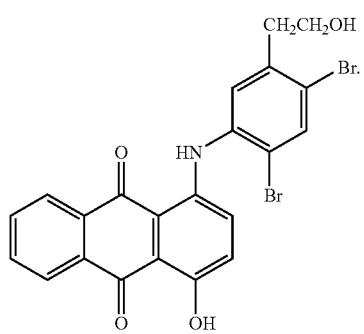

The spectral strength of the brominated alcohol-substituted colorant can be determined using a spectrophotographic procedure based on the measurement of the colorant in solution by dissolving the colorant in an equal mixture of toluene and tetrahydrofuran and measuring the absorbance using a Perkin Elmer Lambda 2S UV/VIS spectrophotometer. It is believed that the spectral strength of the brominated alcohol-substituted colorant will be measured as about 16,000 mL Absorbance Units per gram at absorption $\lambda_{max}$, which would indicate a purity of about 60 percent.

Part E

In a glass reaction flask are combined 16 grams of the brominated alcohol-substituted colorant prepared in Part D of this Example, 31 grams of UNICID® 700 (a material containing carboxylic acids of the formula $R_2COOH$ wherein $R_2$ is a linear alkyl group having an average of about 50 carbon atoms, also containing other unfunctionalized wax materials in an amount of up to about 25 percent by weight; available from Baker Petrolite, Sugarland, Tex.), 152 grams of xylene (available from Tarr, Inc., Portland, Oreg.), and 0.6 grams of para-toluenesulfonic acid (available from Capital Resin Corp., Columbus, Ohio). The materials are mixed and heated to a reflux temperature of about 143° C. After about 7 hours, the reaction is complete. The reaction mixture is then cooled to 40° C. and filtered. The filter cake is reslurried and filtered two more times in methanol to remove residual xylene. The filter cake is then dried in air at ambient temperature. It is believed that this filter cake will contain a colorant of the formula

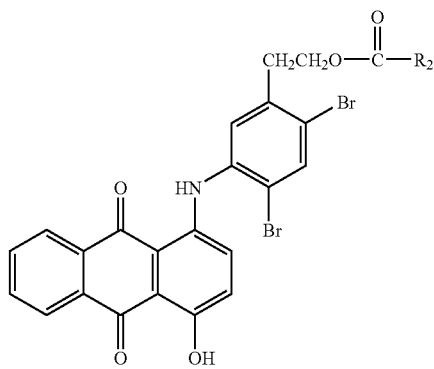

wherein $R_2$ is a linear alkyl group having an average of about 50 carbon atoms.

The spectral strength of the colorant can be determined using a spectrophotographic procedure based on the measurement of the colorant in solution by dissolving the colorant in an equal mixture of toluene and tetrahydrofuran and measuring the absorbance using a Perkin Elmer Lambda 2S UV/VIS spectrophotometer. It is believed that the spectral strength of the colorant will be measured as about 5,000 mL Absorbance Units per gram at absorption λmax, which would indicate a purity of about 40 percent.

Part F

Compounds of the formulae shown in Parts C-1 through C-5 of this Example are prepared by reversing steps B and C of this Example. More specifically, the alcohol-substituted colorant prepared in Part A of this Example is first subjected to bromination as described in Parts C-1 through C-5 of this Example, and the resulting brominated alcohol-substituted colorants are then subjected to esterification as described in Parts C-1 through C-5 of this Example.

EXAMPLE III

Part A

In a glass reaction flask are combined 73 grams of sublimed quinizarin (available from Aceto Corp., Lake Success, N.Y.), 49 grams of leucoquinizarin (available from Aceto Corp.), 95.8 grams of 4-(4-hydroxybenzyl)aniline (which can be prepared as outlined in scheme 3 of de Groot et al., *J. Org. Chemistry* 2001, 66(26), p 8815–8830, the disclosure of which is totally incorporated herein by reference), 31 grams of boric acid (available from Aldrich Chemical Co., Milwaukee, Wis.), and 780 grams of isopropyl alcohol (available from J T Baker, Phillipsburg, N.J.).

The materials are mixed and heated until the solvent refluxes at about 75° C. After about 16 hours of reflux it is believed that the reaction will be complete, having generated an alcohol-substituted colorant of the formula it is believed that the reaction mixture will contain an ethyl acetate-substituted colorant of the formula

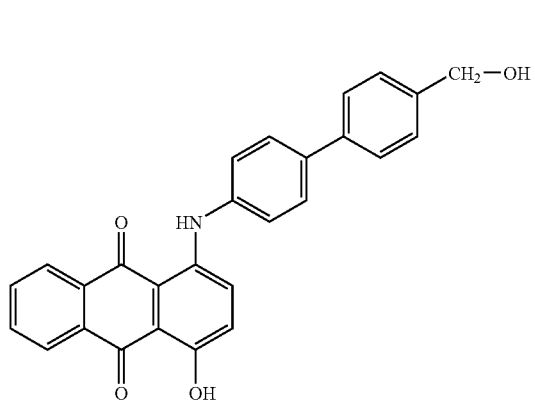

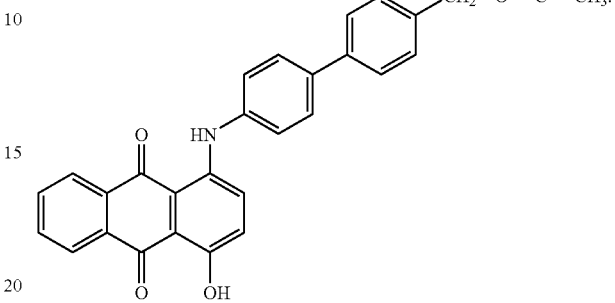

Part B-2

The reaction mixture is cooled and filtered. The product filter cake is dried in air at ambient temperature. The spectral strength of the alcohol-substituted colorant can be determined using a spectrophotographic procedure based on the measurement of the colorant in solution by dissolving the colorant in toluene and measuring the absorbance using a Perkin Elmer Lambda 2S UV/VIS spectrophotometer.

In a glass reaction flask are combined 14.1 grams of the alcohol-substituted colorant prepared in Part A of this Example, 10.2 grams of dimer diisocyanate (available from Cognis; these materials are also described in, for example, Kirk-Othmer Encyclopedia of Chemical Technology 1979, volume 7, 3$^{rd}$ edition, p. 768–782, John Wiley and Sons, Inc., the disclosure of which is totally incorporated herein by reference), and 1 drop of FASCAT 4202 catalyst (available from Atofina). The materials are mixed and heated to a temperature of about 150° C. and stirred for 4 hours. It is believed that IR analysis will show that the reaction is complete (no isocyanate peak) and that the reaction mixture will contain a dimer-diurethane-substituted colorant of the formula Part B-1

In a glass reaction flask are combined 9.4 grams of the alcohol-substituted colorant prepared in Part A of this Example, 68 grams of glacial acetic acid (available from J T Baker), 13 grams of propionic acid (available from Aldrich Chemical Co.), and 2.3 grams of acetic anhydride (available from Aldrich Chemical Co.). The materials are mixed and heated to a reflux temperature of about 121° C. After about 4 hours of reflux, the reaction is complete and

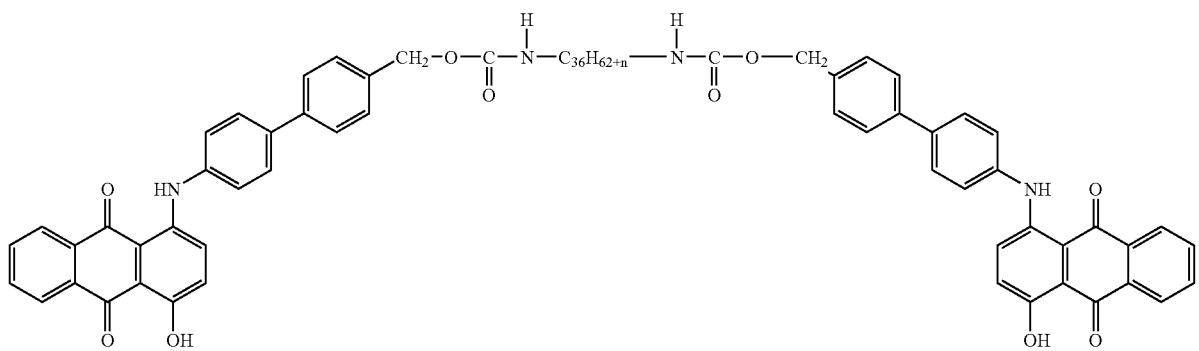

wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formula

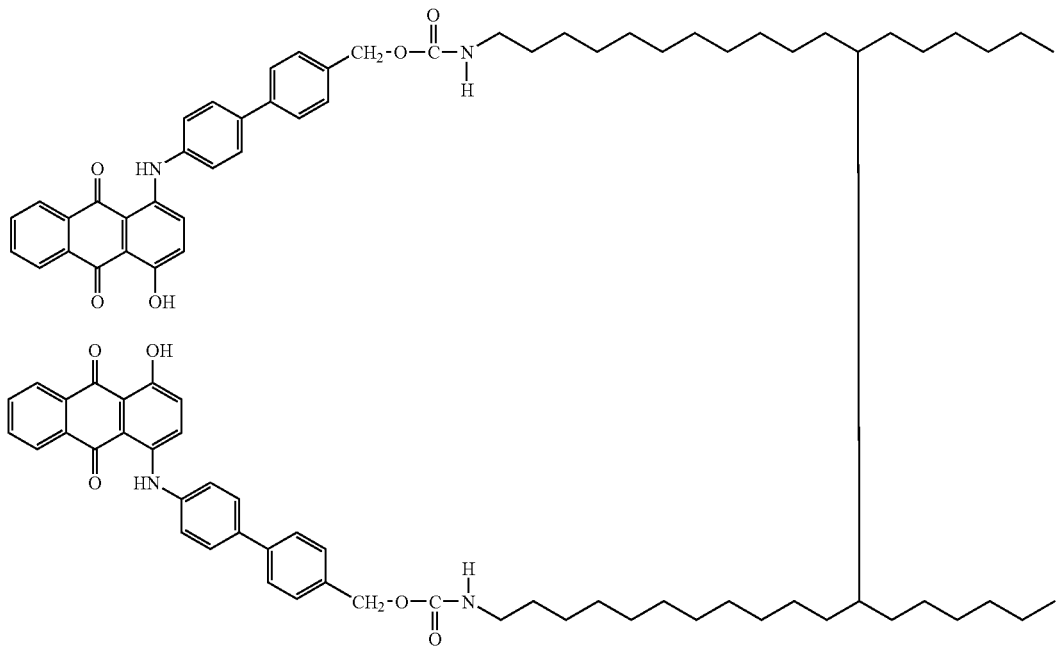

Part B-3

In a glass reaction flask fitted with a Dean-Stark trap are combined 5.9 grams of the alcohol-substituted colorant prepared in Part A of this Example, 60 grams of xylenes (available from Aldrich Chemical Co.), 8.4 grams of the Guerbet acid 2-hexadecyl-1-eicosanoic acid (ISOCARB 36, available from Condea Vista, Austin, Tex.), and 0.25 grams of p-toluene sulfonic acid (available from Boliden Intertrade). The materials are mixed and heated to reflux in an oil bath at 150° C. After about 19 hours of reflux, the reaction is complete and it is believed that the reaction mixture will contain an ISOCARB-36-substituted colorant of the formula

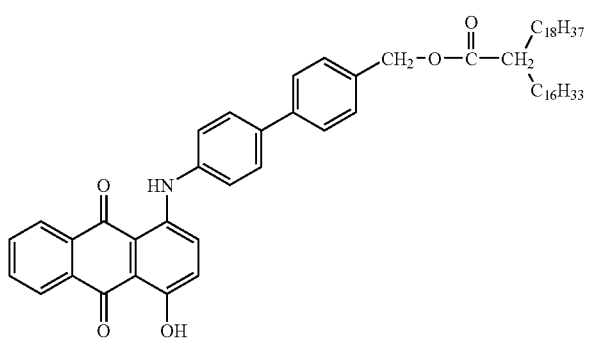

Part B-4

In a glass reaction flask fitted with a Dean-Stark trap are combined 17.6 grams of the alcohol-substituted colorant prepared in Part A of this Example, 200 grams of xylenes (available from Aldrich Chemical Co.), 14.3 grams of dimer acid hydrogenated (known as PRIPOL 1006, available from Unichema International; these materials are also described in, for example, *Kirk-Othmer Encyclopedia of Chemical Technology* 1979, volume 7, 3$^{rd}$ edition, p. 768–782, John Wiley and Sons, Inc., the disclosure of which is totally incorporated herein by reference), and 0.5 grams of p-toluene sulfonic acid (available from Boliden Intertrade). The material is mixed and heated to reflux in an oil bath at 150° C. After about 19 hours of reflux, it is believed that the reaction will be complete and that the reaction mixture will contain a dimer acid di-ester substituted colorant of the formula

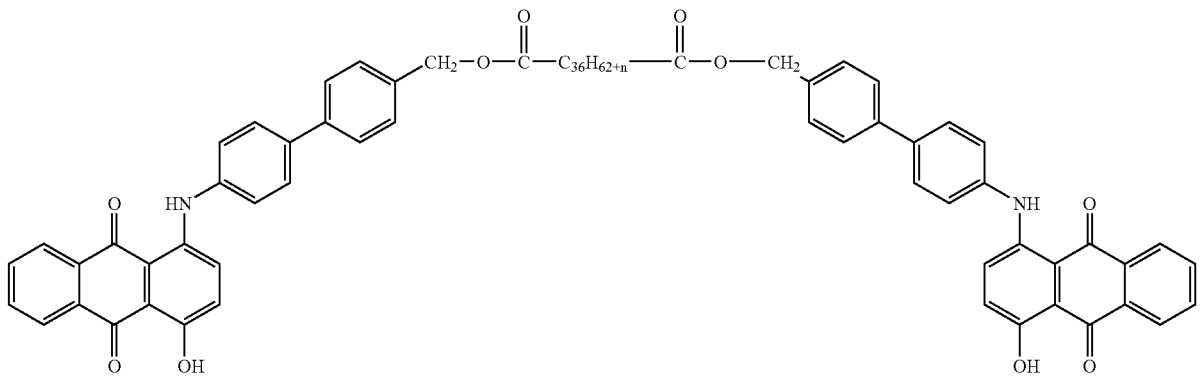

wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formula

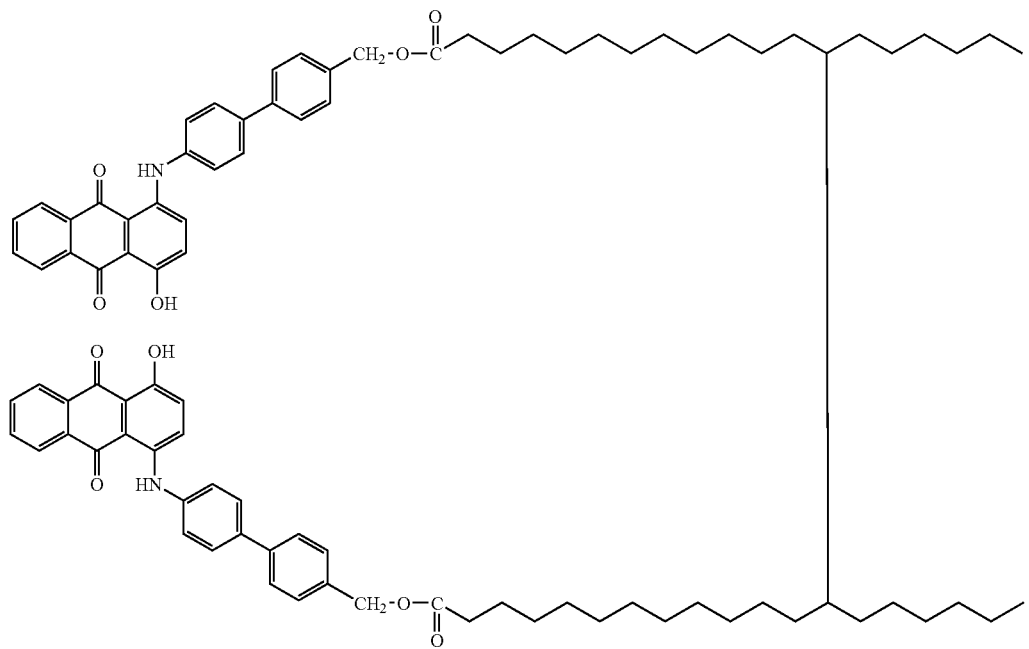

Part B-5

In a glass reaction flask are combined 3.5 grams of the alcohol-substituted colorant prepared in Part A of this Example and 6.4 grams of hydroabietyl alcohol (available as Abitol E from Hercules Inc. of Wilmington Del.) and the mixture is heated to a temperature of about 140° C. until it is homogeneous. 1 drop of FASCAT 4202 catalyst (available from Atofina) and 3.2 grams of isophorone diisocyanate (available as DESMODUR I from Bayer Corp., Pittsburgh, Pa.) are added. The materials are mixed and heated to a temperature of about 140° C. After about 5 hours of heating it is believed that IR analysis will show that the reaction is complete (no isocyanate peak) and that the reaction mixture will contain a diurethane-substituted colorant of the formula

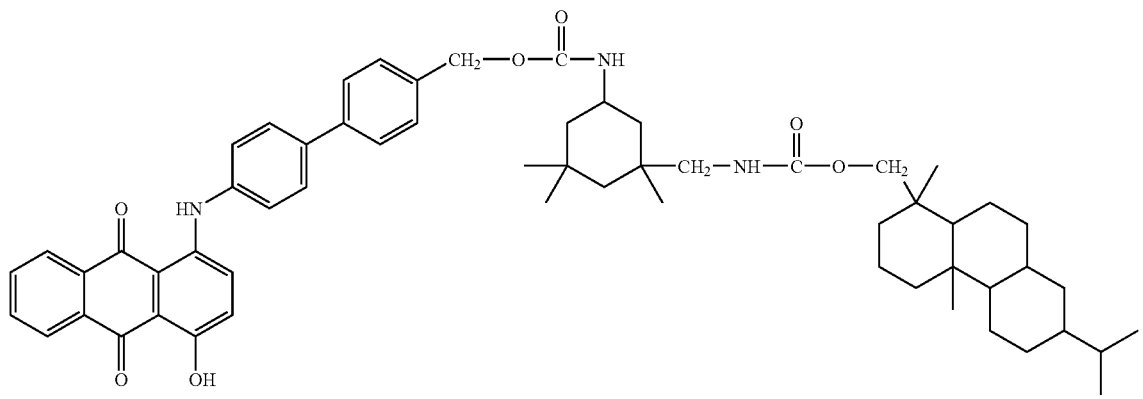

Part C-1

About 107 grams of the reaction mixture containing the ethyl acetate-substituted colorant from Part B-1 of this Example is charged into a glass reaction flask. The mixture is cooled to a minimum of 30° C. While mixing, about 9 grams of bromine (available from Aldrich Chemical Co.) is added to the mixture at a rate such that the temperature remaines below about 40° C. The mixture is then heated to about 40° C. After about 24 hours of mixing the reaction is complete. The reaction mixture is then quenched into 234 grams of deionized water and allowed to cool to room temperature. The reaction mixture is then filtered and the filter cake is reslurried and filtered twice in deionized water to remove most of the residual acetic acid. The filter cake is then dried in a 60° C. oven. It is believed that this filter cake will contain a mixture of brominated ethyl acetate-substituted colorants of the formulae

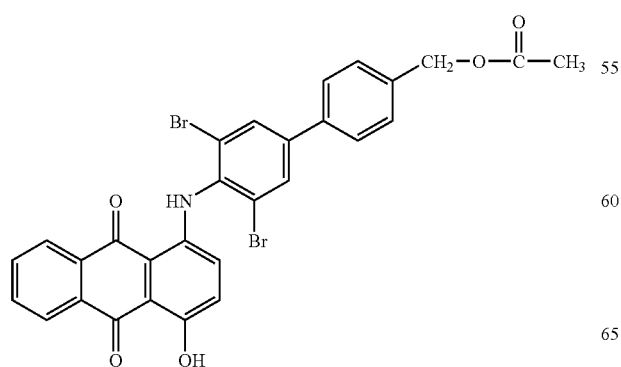

and

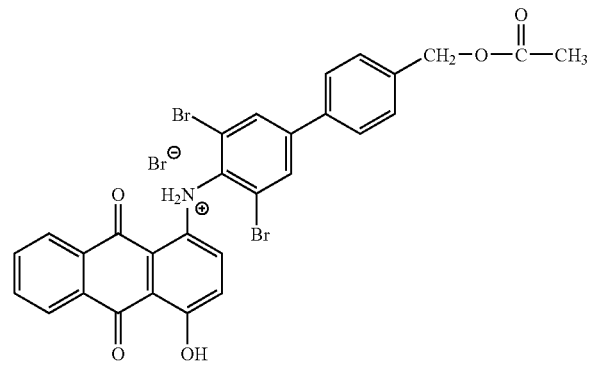

The spectral strength of the brominated ethyl acetate-substituted colorant can be determined using a spectrophotographic procedure based on the measurement of the colorant in solution by dissolving the colorant in toluene and measuring the absorbance using a Perkin Elmer Lambda 2S UV/VIS spectrophotometer.

Part C-2

The process of Part C-1 of this Example is repeated except that the colorant from Part B-1 of this Example is replaced with the colorant from Part B-2 of this Example. It is believed that a colorant of the formulae

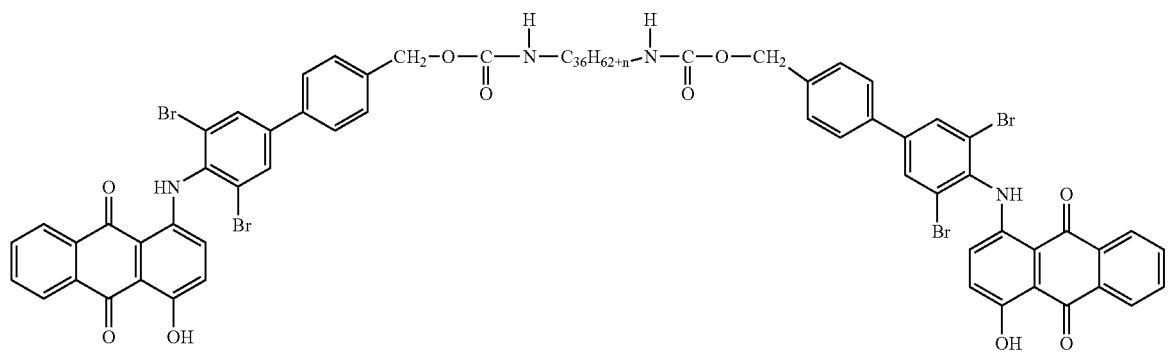
and
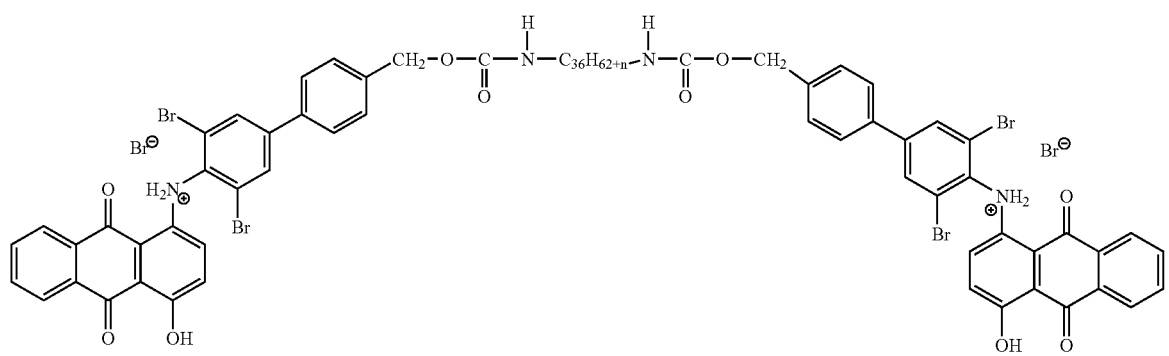
wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formulae
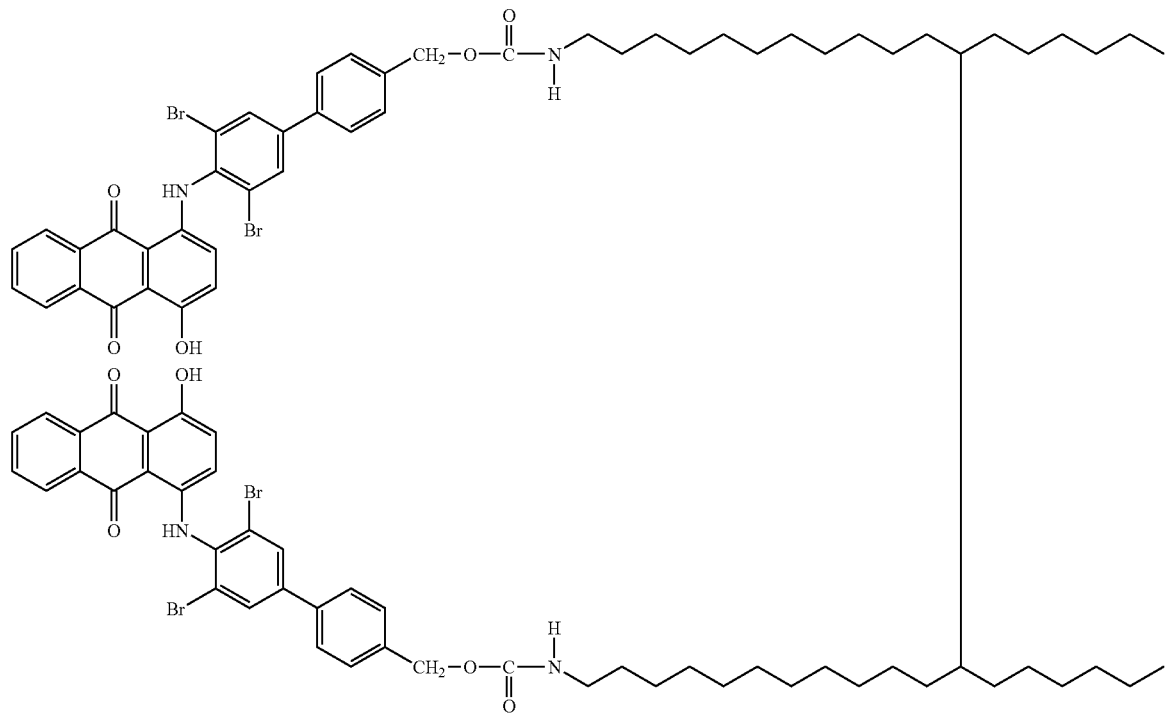
and -continued

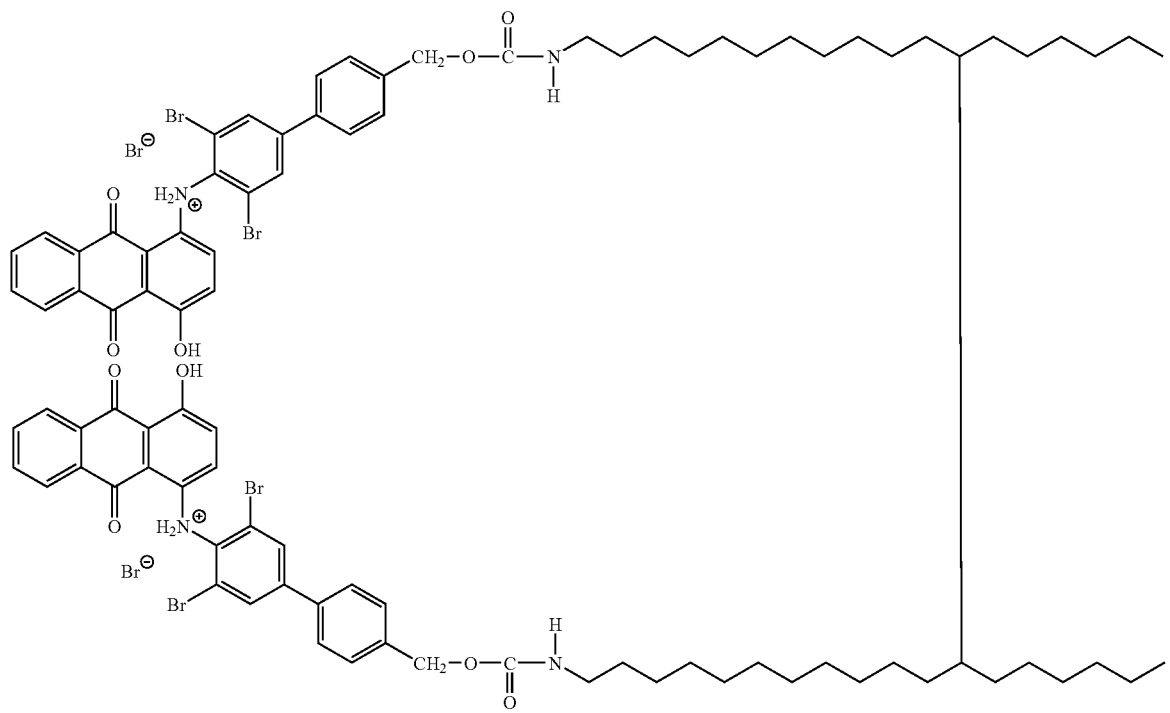

will be obtained.

Part C-3

The process of Part C-1 of this Example is repeated except that the colorant from Part B-1 of this Example is replaced with the colorant from Part B-3 of this Example. It is believed that a colorant of the formulae

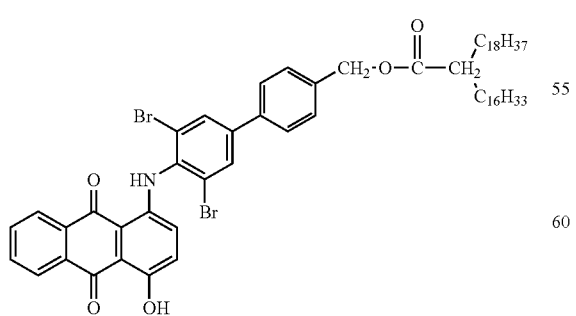

and

-continued

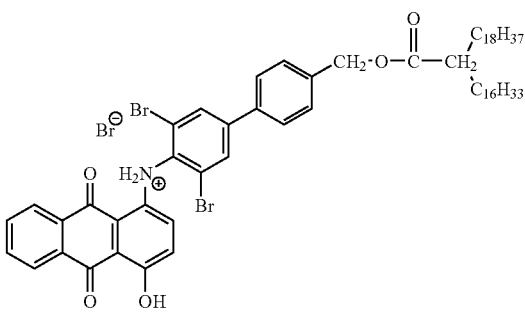

will be obtained.

Part C-4

The process of Part C-1 of this Example is repeated except that the colorant from Part B-1 of this Example is replaced with the colorant from Part B-4 of this Example. It is believed that a colorant of the formulae

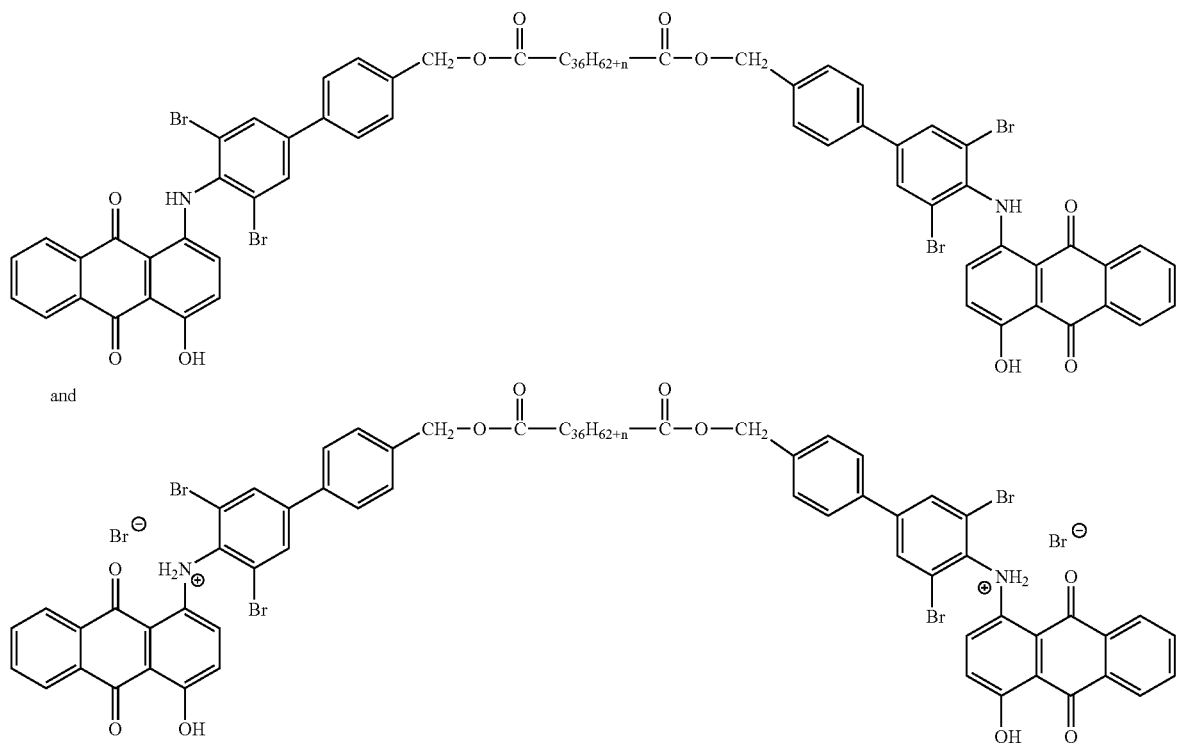
wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formulae
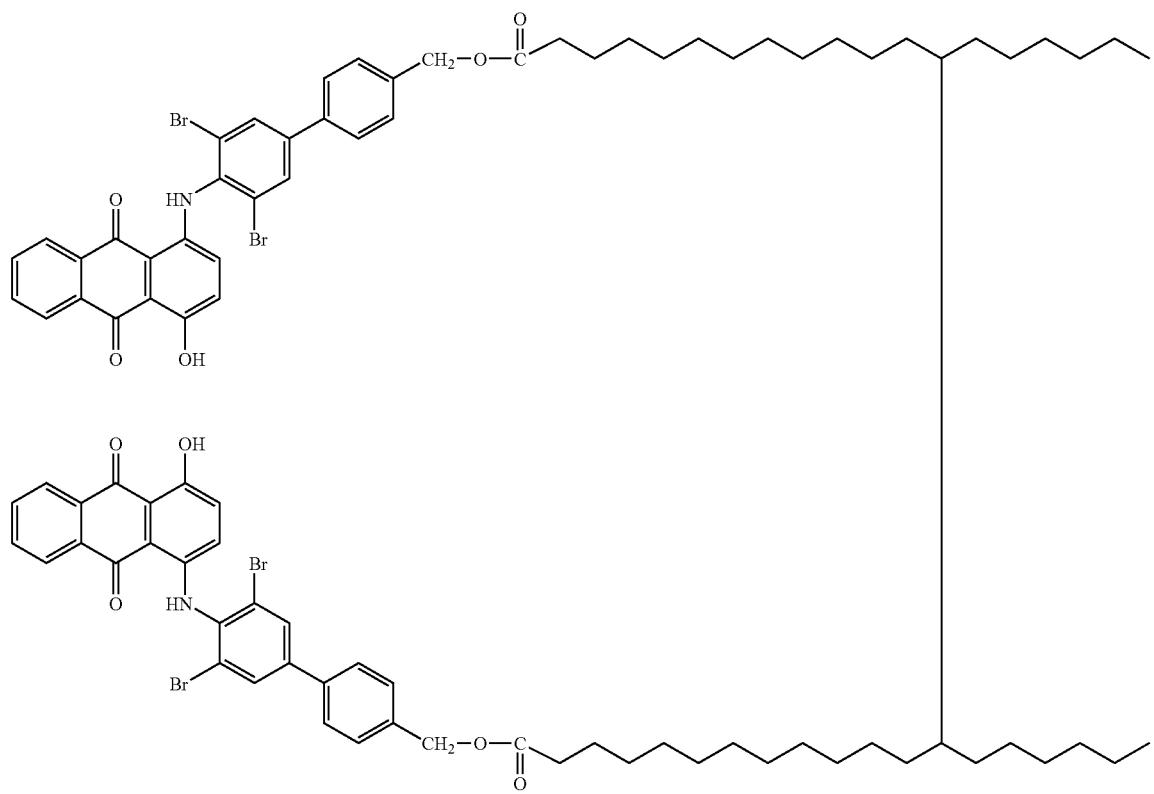
and

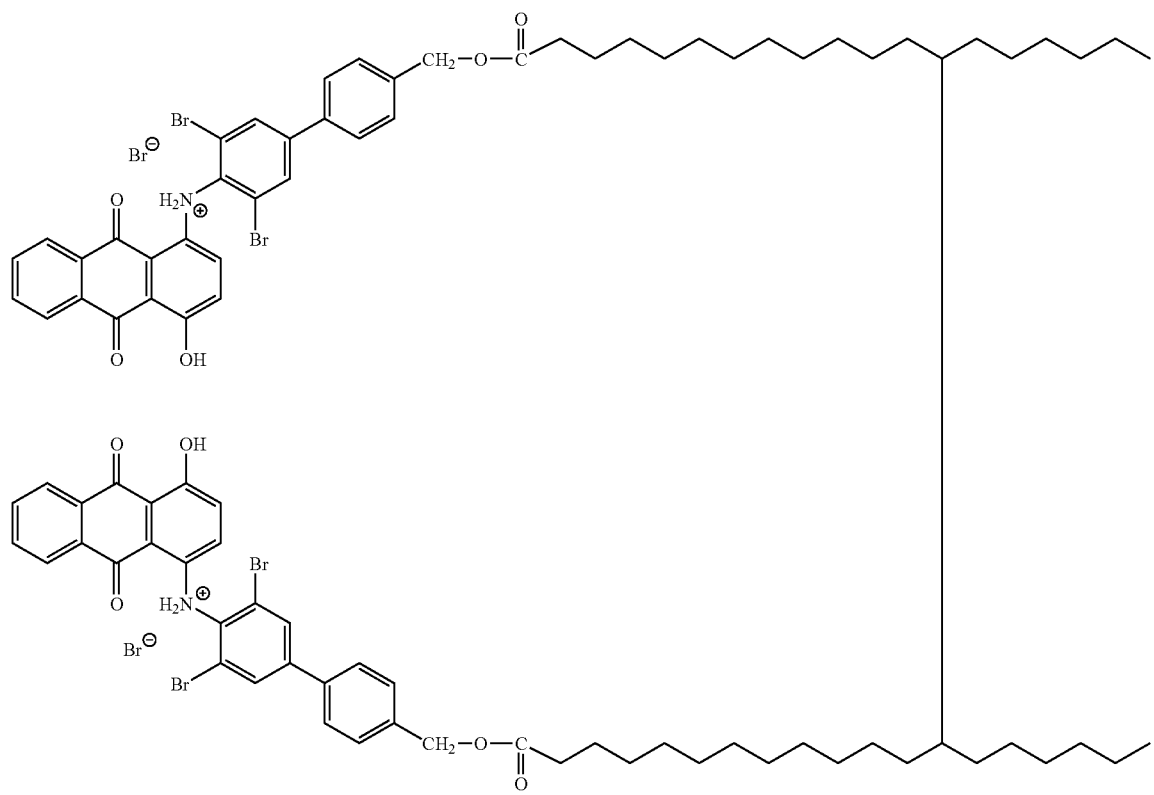
will be obtained.
Part C-5
The process of Part C-1 of this Example is repeated except that the colorant from Part B-1 of this Example is replaced with the colorant from Part B-5 of this Example. It is believed that a colorant of the formulae
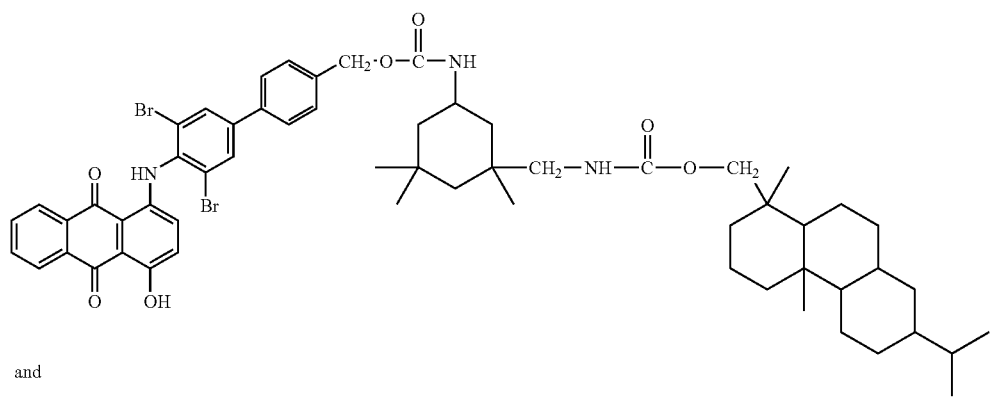
and

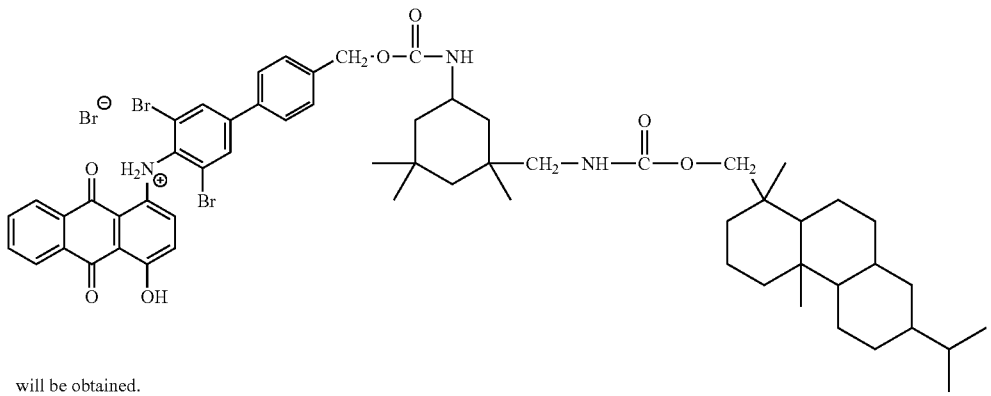

will be obtained.

Part D

In a glass reaction flask are combined 18 grams of the mixture of the brominated ethyl acetate-substituted colorant and its salt prepared in Part C-1 of this Example, 72 grams of N-methyl-2-pyrrolidone (available from Aldrich Chemical Co.), 4 grams of sodium hydroxide (available from Aldrich Chemical Co.), and 4 grams of deionized water. The material is mixed and heated to about 60° C. After about 3 hours the reaction is complete. The reaction mixture is then quenched into 234 grams of deionized water and allowed to cool to room temperature. Glacial acetic acid is added until the solution reaches a pH of between 6 and 7. The reaction mixture is then filtered and the filter cake is reslurried and filtered twice in deionized water to remove most of the residual N-methyl-2-pyrrolidone. The filter cake is then dried in a 60° C. oven. It is believed that this filter cake will contain a brominated alcohol-substituted colorant of the formula

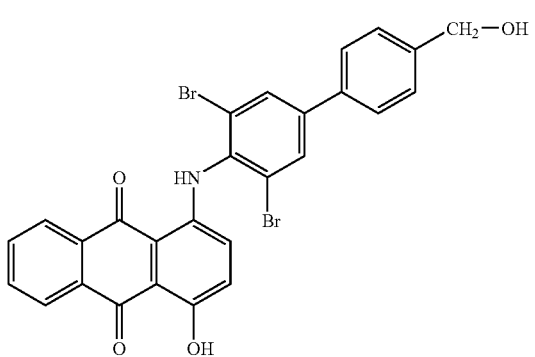

The spectral strength of the brominated alcohol-substituted colorant can be determined using a spectrophotographic procedure based on the measurement of the colorant in solution by dissolving the colorant in an equal mixture of toluene and tetrahydrofuran and measuring the absorbance using a Perkin Elmer Lambda 2S UV/VIS spectrophotometer.

Part E

In a glass reaction flask are combined 18.8 grams of the brominated alcohol-substituted colorant prepared in Part D of this Example, 31 grams of UNICID® 700 (a material containing carboxylic acids of the formula $R_2COOH$ wherein $R_2$ is a linear alkyl group having an average of about 50 carbon atoms, also containing other unfunctionalized wax materials in an amount of up to about 25 percent by weight; obtained from Baker Petrolite, Sugarland, Tex.), 152 grams of xylene (obtained from Tarr, Inc., Portland, Oreg.), and 0.6 grams of para-toluenesulfonic acid (obtained from Capital Resin Corp., Columbus, Ohio). The materials are mixed and heated to a reflux temperature of about 143° C. After about 7 hours, the reaction is complete. The reaction mixture is then cooled to 40° C. and filtered and the filter cake is reslurried and filtered two more times in methanol to remove residual xylene. The filter cake is then dried in air at ambient temperature. It is believed that this filter cake will contain a colorant of the formula

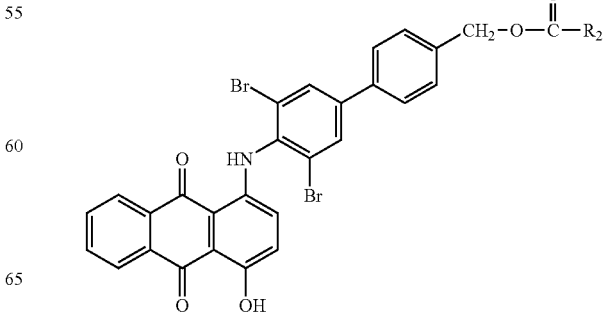

wherein R₂ is a linear alkyl group having an average of about 50 carbon atoms.

Part F

Compounds of the formulae shown in Parts C-1 through C-5 of this Example are prepared by reversing steps B and C of this Example. More specifically, the alcohol-substituted colorant prepared in Part A of this Example is first subjected to bromination as described in Parts C-1 through C-5 of this Example, and the resulting brominated alcohol-substituted colorants are then subjected to esterification as described in Parts C-1 through C-5 of this Example.

EXAMPLE IV

Part A

In a 500 milliliter round bottom flask equipped with magnetic stirrer were combined 24.6 grams of 3-(1-hydroxyethyl) aniline, of the formula

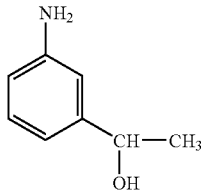

(obtained from Aldrich Chemical Co., Milwaukee, Wis.), 17.4 grams of leucoquinizarin (obtained from Aceto Corp., Lake Success, N.Y.), 25.9 grams of quinizarin (obtained from Aceto Corp.), 10.9 grams of boric acid (obtained from Aldrich Chemical Co.), and 275.5 grams of methanol. The flask was placed under stirring and a condenser in a hot oil bath at about 120° C. for 19 hours. Thereafter the reaction mixture was poured hot into a 1 liter beaker and allowed to cool in a refrigerator. Thereafter, precipitated solids were collected by vacuum filtration, rinsing, and washing with cold methanol. The collected solids were dried overnight in a vacuum oven at about 50° C. to yield 58.5 grams of the product, believed to be of the formula

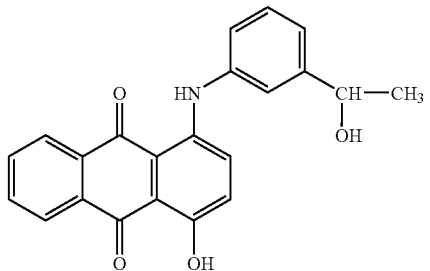

Part B

In a glass reaction flask are combined 12 grams of the alcohol-substituted colorant prepared as described in Part A of this Example, 10.2 grams of dimer diisocyanate (available from Cognis), and 1 drop of FASCAT 4202 catalyst (available from Atofina). The materials are mixed and heated to a temperature of about 120° C. After about 1 hour of heating, the reaction mixture becomes very thick, so the temperature is raised to about 150° C. and the reaction mixture stirred for 4 hours. It is believed that at this point IR analysis will show that the reaction is complete (no isocyanate peak) and that the reaction mixture will contain a dimer-diurethane-substituted colorant of the formula

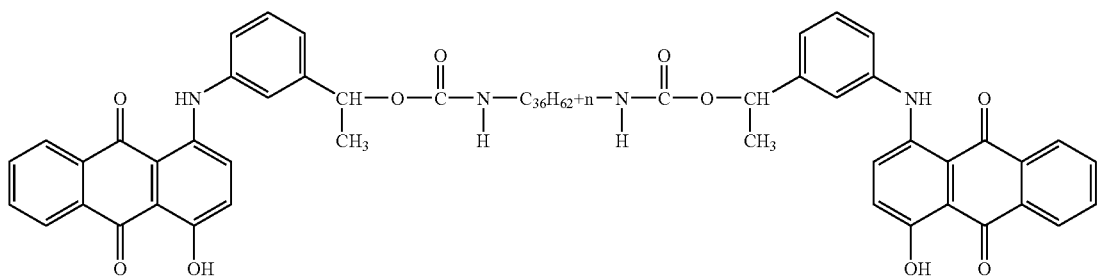

wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formula

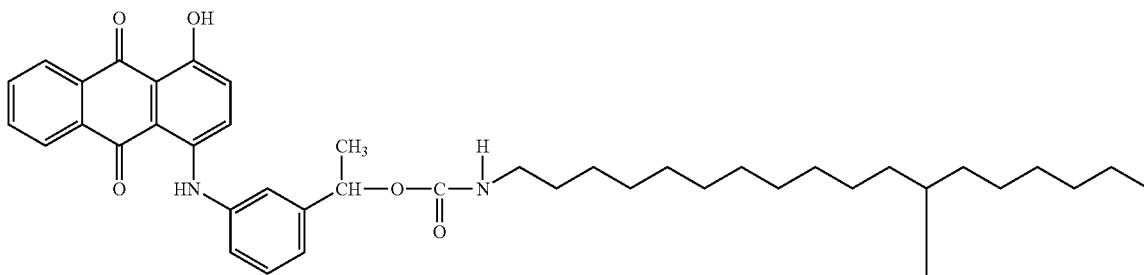

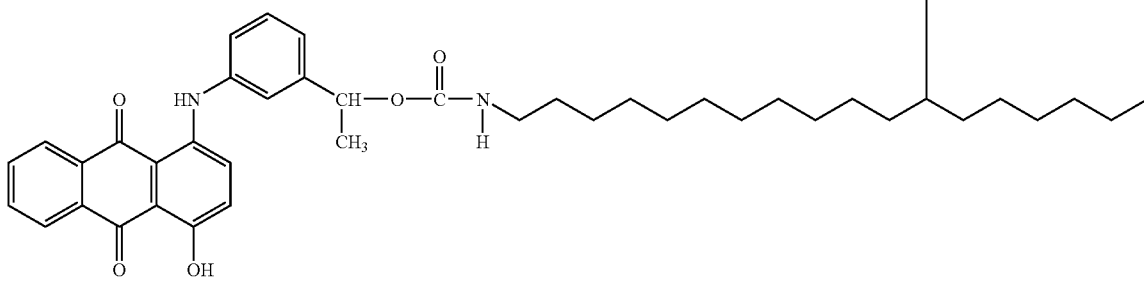

Part C

In a glass reaction flask are combined the dimer diurethane-substituted colorant prepared as described in Part B of this Example, 68 grams of glacial acetic acid (available from J T Baker), and 13 grams of propionic acid (available from Aldrich Chemical Co). The mixture is cooled to a minimum of 30° C. While mixing, about 6.1 grams of bromine (available from Aldrich Chemical Co.) are added to the mixture at a rate such that the temperature remains below about 40° C. The mixture is then heated to about 40° C. After about 24 hours of mixing the reaction is complete. The reaction mixture is then quenched into about 250 grams of deionized water, allowed to cool to room temperature, and filtered. The product is reslurried and filtered twice in deionized water to remove most of the residual acetic acid. The product is then dried in a 60° C. oven. It is believed that this product will contain a mixture of brominated ethyl acetate-substituted colorants of the formulae

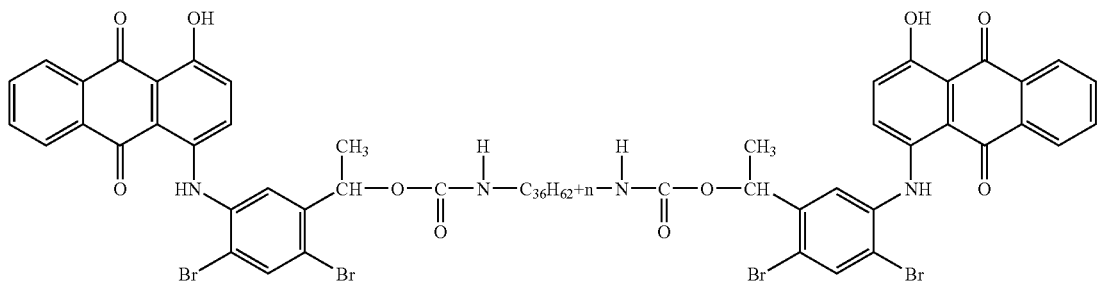

and

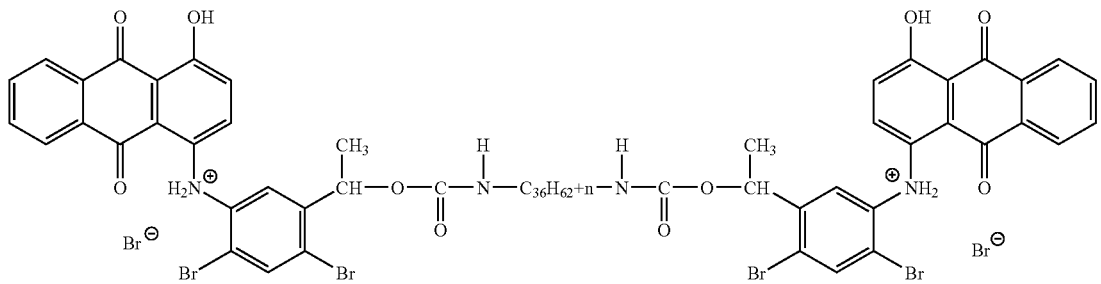

wherein $C_{36}H_{62+n}$ is a branched alkylene group which may include unsaturations and cyclic groups, wherein n is an integer of 0, 1, 2, 3, 4, 5, 6, 7, 8, 9, or 10, one isomer of which is believed to be of the formulae

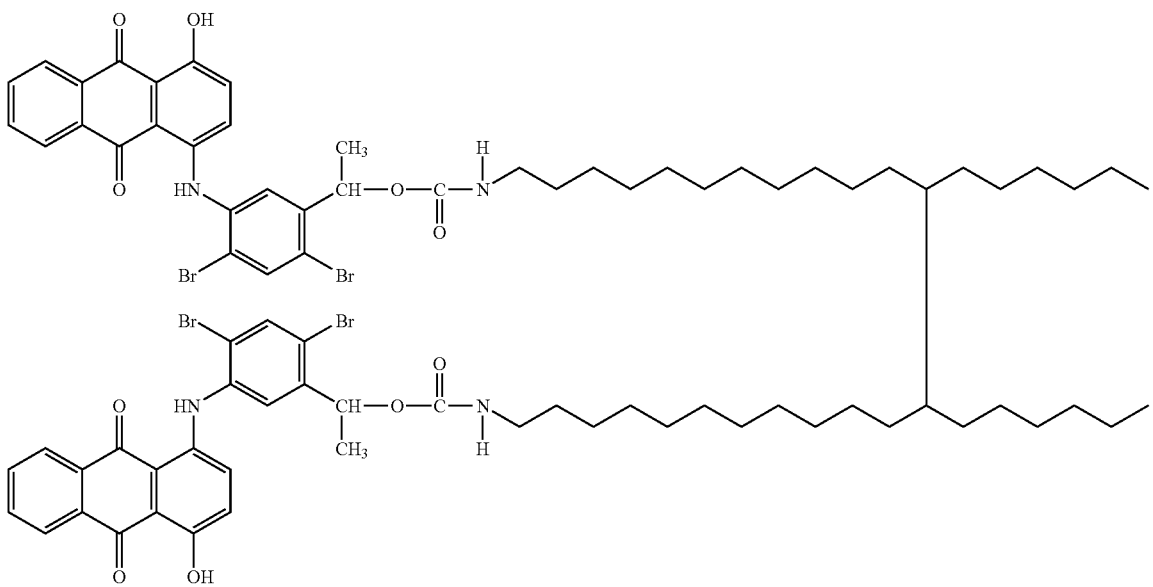

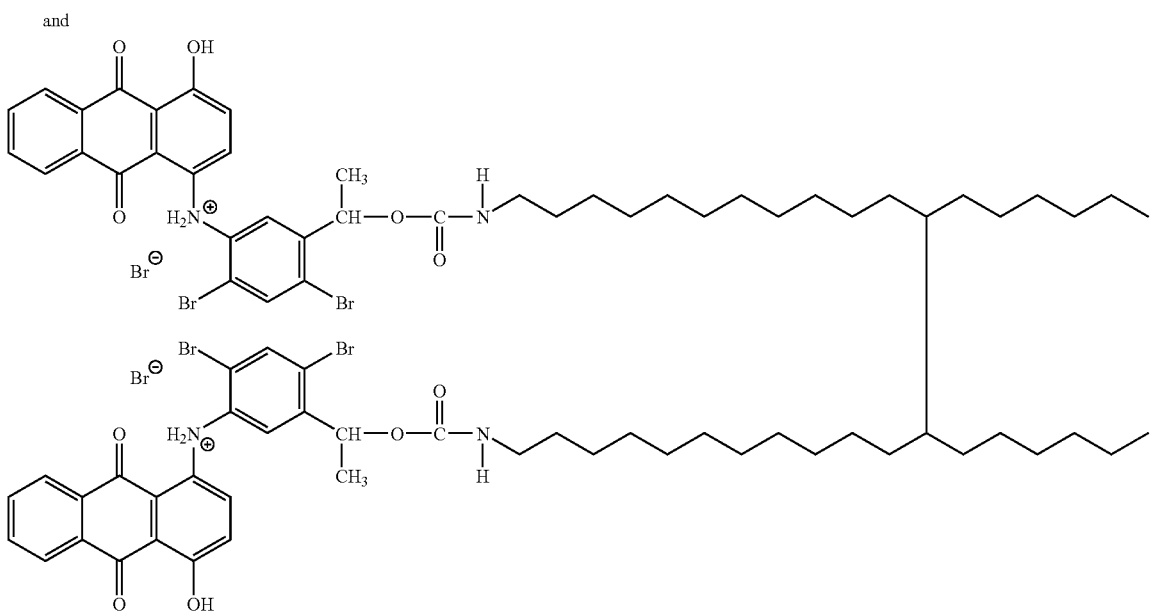

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A process which comprises (a) preparing a first reaction mixture by admixing (1) leucoquinizarin and, optionally, quinizarin, (2) an aminobenzene substituted with an alcohol group of the formula —$R_1$—OH, wherein $R_1$ is an alkylene group or an arylalkylene group, (3) boric acid, and (4) an optional solvent, and heating the first reaction mixture to prepare an alcohol-substituted colorant of the formula

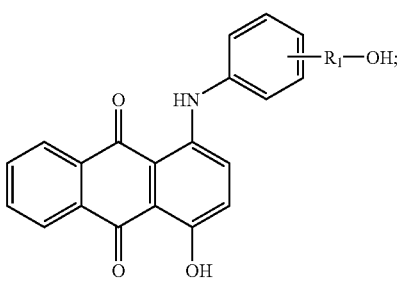

(b) preparing a second reaction mixture by admixing (1) the alcohol-substituted colorant, (2) a solvent, and (3) a first esterification compound which is either (i) an anhydride of the formula

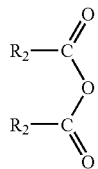

wherein $R_2$ is an alkyl group, an aryl group, an arylalkyl group, or an alkylaryl group, or (ii) an acid of the formula $R_2COOH$ optional in the presence of an esterification catalyst, and heating the second reaction mixture to form a first ester-substituted colorant of the formula

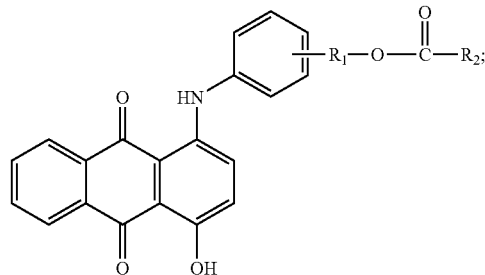

(c) forming a third reaction mixture by admixing (1) the first ester-substituted colorant, (2) bromine, and (3) a solvent followed by quenching the third reaction mixture with water to form a brominated ester-substituted colorant and a salt thereof, of the formulae

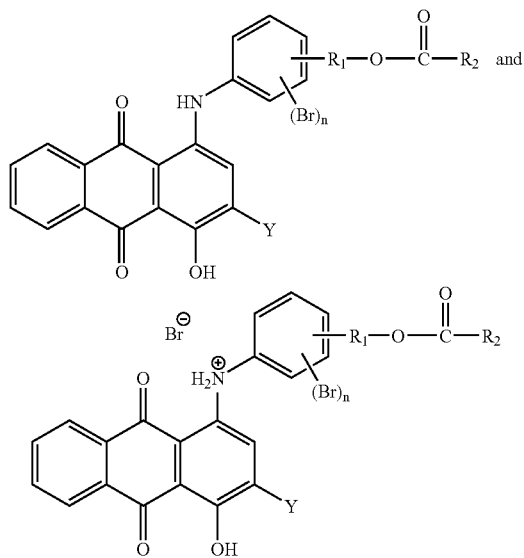

wherein Y is a hydrogen atom or a bromine atom and n is an integer of 1, 2, 3, or 4; (d) preparing a fourth reaction mixture by admixing (1) the brominated ester-substituted colorant and the salt thereof, (2) a base, (3) water, and (4) a solvent and heating the fourth reaction mixture to form a brominated alcohol-substituted colorant of the formula

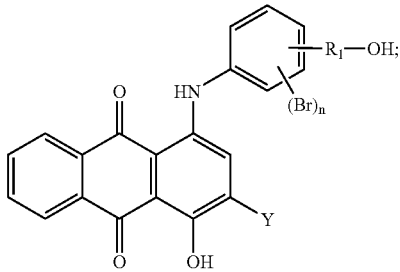

and (e) preparing a fifth reaction mixture by admixing (1) the brominated alcohol-substituted colorant, (2) a second esterification compound which is either (i) an anhydride of the formula

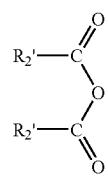

wherein $R_2'$ is an alkyl group, an aryl group, an arylalkyl group, or an alkylaryl group, and wherein $R_2'$ is different from $R_2$, or (ii) an acid of the formula $R_2'COOH$ optional in the presence of an esterification catalyst, and (3) a solvent and heating the fifth reaction mixture to form a second ester-substituted colorant of the formula

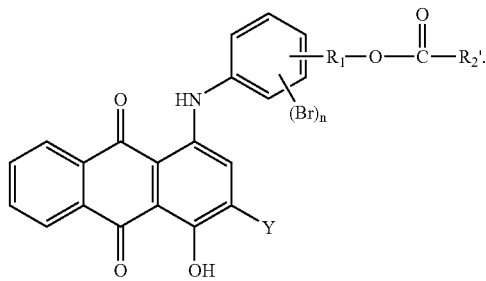

2. A process according to claim 1 wherein quinizarin is present in the first reaction mixture.

3. A process according to claim 2 wherein the quinizarin and the leucoquinizarin are present in relative amounts of at least about 5 moles of leucoquinizarin per every 95 moles of quinizarin.

4. A process according to claim 2 wherein the quinizarin and the leucoquinizarin are present in relative amounts of at least about 2 moles of leucoquinizarin per every 3 moles of quinizarin.

5. A process according to claim 2 wherein the quinizarin and the leucoquinizarin are present in relative amounts of at least about 1 mole of leucoquinizarin per every 1 mole of quinizarin.

6. A process according to claim 1 wherein no quinizarin is present in the first reaction mixture.

7. A process according to claim 1 wherein the alcohol-substituted aminobenzene is present in an amount of at least about 0.95 mole of alcohol-substituted aminobenzene per every one mole of (quinizarin plus leucoquinizarin).

8. A process according to claim 1 wherein the alcohol-substituted aminobenzene is present in an amount of no more than about 1.05 moles of alcohol-substituted aminobenzene per every one mole of (quinizarin plus leucoquinizarin).

9. A process according to claim 1 wherein the boric acid is present in an amount of about 1 mole of boric acid per every one mole of (quinizarin plus leucoquinizarin).

10. A process according to claim 1 wherein in the first reaction mixture a solvent is used which is methanol, ethanol, isopropanol, butanol, ethylene glycol monomethyl ether, ethylene glycol dimethyl ether, or a mixture thereof.

11. A process according to claim 1 wherein the first reaction mixture is heated to a temperature of at least about 60° C.

12. A process according to claim 1 wherein the first reaction mixture is heated to a temperature of no more than about 120° C.

13. A process according to claim 1 wherein the first reaction mixture is heated for a period of time of at least about 3 hours.

14. A process according to claim 1 wherein the first reaction mixture is heated for a period of time of no more than about 24 hours.

15. A process according to claim 1 wherein the alcohol-substituted colorant and the anhydride are present in relative amounts of at least about 1 mole of anhydride per every one mole of alcohol-substituted colorant.

16. A process according to claim 1 wherein the solvent in the second reaction mixture is acetic acid, propionic acid, formic acid, butyric acid, dimethyl formamide, dimethyl sulfoxide, hexamethyl phosphorus triamide, tetrahydrofuran, or a mixture thereof.

17. A process according to claim 1 wherein the second reaction mixture is heated to a temperature of at least about 40° C.

18. A process according to claim 1 wherein the second reaction mixture is heated to a temperature of no more than about 100° C.

19. A process according to claim 1 wherein the second reaction mixture is heated for a period of time of at least about 2.5 hours.

20. A process according to claim 1 wherein the second reaction mixture is heated for a period of time of no more than about 5 hours.

21. A process according to claim 1 wherein bromine is provided in the third reaction mixture by adding elemental bromine.

22. A process according to claim 1 wherein bromine is provided in the third reaction mixture by generating it in situ by the addition of a combination of a bromide salt and a bromate salt.

23. A process according to claim 1 wherein the ester-substituted colorant and the bromine are present in the third reaction mixture in relative amounts of at least about 2 moles of $Br_2$ per every one mole of ester-substituted colorant.

24. A process according to claim 1 wherein the ester-substituted colorant and the bromine are present in the third reaction mixture in relative amounts of no more than about 4 moles of $Br_2$ per every one mole of ester-substituted colorant.

25. A process according to claim 1 wherein the solvent in the third reaction mixture is acetic acid, propionic acid, formic acid, butyric acid, dimethyl formamide, dimethyl sulfoxide, hexamethyl phosphorus triamide, tetrahydrofuran, or a mixture thereof.

26. A process according to claim 1 wherein the third reaction mixture is initially heated to a temperature of from about 30° C. to about 40° C.

27. A process according to claim 1 wherein the third reaction mixture is maintained at a temperature of at least about 50° C.

28. A process according to claim 1 wherein the third reaction mixture is maintained at a temperature of no more than about 100° C.

29. A process according to claim 1 wherein the reaction between the ester-substituted colorant and the bromine is allowed to proceed for a period of time of at least about 5 hours.

30. A process according to claim 1 wherein the reaction between the ester-substituted colorant and the bromine is allowed to proceed for a period of time of no more than about 24 hours.

31. A process according to claim 1 wherein when the third reaction mixture is quenched with water, the amount of water is at least about 1.5 times as much water by volume as the volume of the reaction mixture.

32. A process according to claim 1 wherein the solvent in the fourth reaction mixture is N-methyl-pyrrolidinone, dimethyl sulfoxide, dimethyl formamide, or a mixture thereof.

33. A process according to claim 1 wherein the base in the fourth reaction mixture is sodium hydroxide, potassium hydroxide, or a mixture thereof.

34. A process according to claim 1 wherein the base in the fourth reaction mixture is present in an amount of at least about 1 mole of base per mole of (brominated ester-substituted colorant plus salt thereof).

35. A process according to claim 1 wherein the base in the fourth reaction mixture is present in an amount of no more than about 5 moles of base per mole of (brominated ester-substituted colorant plus salt thereof).

36. A process according to claim 1 wherein the water and the base are added to the fourth reaction mixture as an aqueous solution of the base.

37. A process according to claim 1 wherein the fourth reaction mixture is heated to a temperature of at least about 50° C.

38. A process according to claim 1 wherein the fourth reaction mixture is heated to a temperature of no more than about 70° C.

39. A process according to claim 1 wherein the fourth reaction mixture is heated for a period of time of at least about 45 minutes.

40. A process according to claim 1 wherein the fourth reaction mixture is heated for a period of time of no more than about 90 minutes.

41. A process according to claim 1 wherein, subsequent to completion of the reaction, the fourth reaction mixture is quenched with water.

42. A process according to claim 1 wherein the amount of water used to quench the fourth reaction mixture is at least about 3 times as much water by volume as the volume of the reaction mixture.

43. A process according to claim 1 wherein the brominated alcohol-substituted colorant and the carboxylic acid are present in the fifth reaction mixture in relative amounts of at least about 0.9 mole of carboxylic acid per every one mole of brominated alcohol-substituted colorant.

44. A process according to claim 1 wherein the brominated alcohol-substituted colorant and the carboxylic acid are present in the fifth reaction mixture in relative amounts of no more than about 2 moles of carboxylic acid per mole of brominated alcohol-substituted colorant.

45. A process according to claim 1 wherein in the fifth reaction mixture an esterification catalyst is used which is para-toluene sulfonic acid, dibutyl tin dilaurate, or a mixture thereof.

46. A process according to claim 1 wherein in the fifth reaction mixture an esterification catalyst is used in an amount of at least about 0.05 mole of esterification catalyst per every one mole of brominated alcohol-substituted colorant.

47. A process according to claim 1 wherein in the fifth reaction mixture an esterification catalyst is used in an amount of no more than about 0.5 mole of esterification catalyst per mole of brominated alcohol-substituted colorant.

48. A process according to claim 1 wherein the solvent in the fifth reaction mixture is xylene, toluene, benzene, chlorobenzene, nitrobenzene, dichlorobenzene, or a mixture thereof.

49. A process according to claim 1 wherein the fifth reaction mixture is heated to a temperature of at least about 100° C.

50. A process according to claim 1 wherein the fifth reaction mixture is heated to a temperature of no more than about 130° C.

51. A process according to claim 1 wherein the fifth reaction mixture is heated for a period of time of at least about 2 hours.

52. A process according to claim 1 wherein the fifth reaction mixture is heated for a period of time of no more than about 72 hours.

53. A process according to claim 1 wherein Y is a hydrogen atom.

54. A process according to claim 1 wherein Y is a bromine atom.

55. A process according to claim 1 wherein n is 2.

56. A process according to claim 1 wherein the second ester-substituted colorant is of the formula

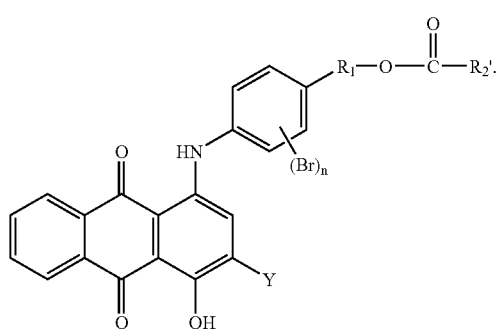

57. A process according to claim 1 wherein the second ester-substituted colorant is of the formula

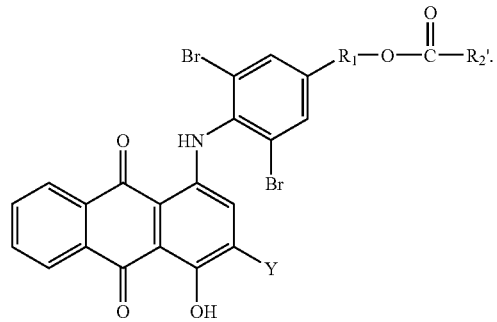

58. A process according to claim 1 wherein the second ester-substituted colorant is of the formula

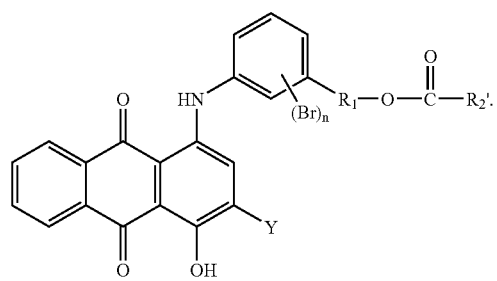

59. A process according to claim 1 wherein the second ester-substituted colorant is of the formula

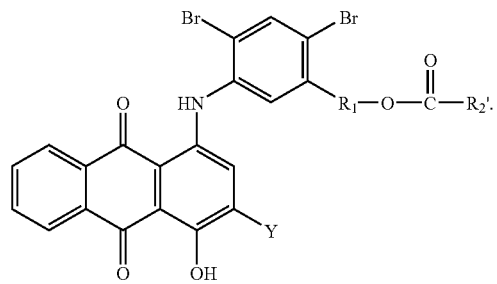

60. A process according to claim 1 wherein $R_1$ is an unsubstituted arylalkylene group.

61. A process according to claim 1 wherein $R_1$ is a substituted arylalkylene group.

62. A process according to claim 1 wherein hetero atoms selected from oxygen, nitrogen, sulfur, silicon, or phosphorus are present in the $R_1$ group.

63. A process according to claim 1 wherein no hetero atoms are present in the $R_1$ group.

64. A process according to claim 1 wherein $R_1$ is an alkylene group having at least about 2 carbon atoms.

65. A process according to claim 1 wherein $R_1$ is of the formula

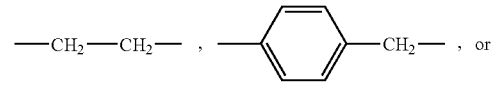

-continued

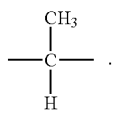

66. A process according to claim 1 wherein $R_2'$ is an unsubstituted alkyl group, an unsubstituted aryl group, an unsubstituted arylalkyl group, or an unsubstituted alkylaryl group.

67. A process according to claim 1 wherein $R_2'$ is a substituted alkyl group, a substituted aryl group, a substituted arylalkyl group, or a substituted alkylaryl group.

68. A process according to claim 1 wherein hetero atoms selected from oxygen, nitrogen, sulfur, silicon, or phosphorus are present in the $R_2'$ group.

69. A process according to claim 1 wherein no hetero atoms are present in the $R_2'$ group.

70. A process according to claim 1 wherein $R_2'$ is a linear alkyl group having an average of about 50 carbon atoms.

71. A process according to claim 1 wherein the second ester-substituted colorant is of the formula

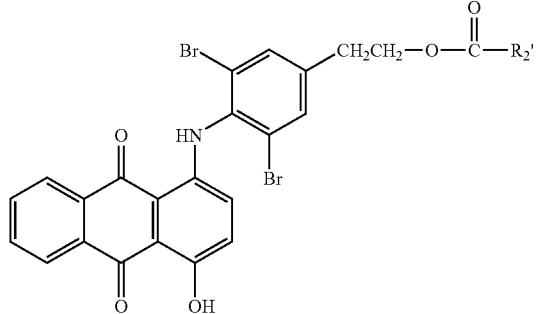

wherein $R_2'$ is a linear alkyl group having an average of about 50 carbon atoms.

72. A process according to claim 1 wherein the second ester-substituted colorant is of the formula

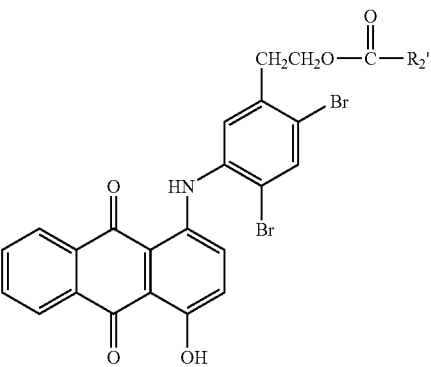

wherein $R_2'$ is a linear alkyl group having an average of about 50 carbon atoms.

73. A process according to claim 1 wherein the second ester-substituted colorant is of the formula

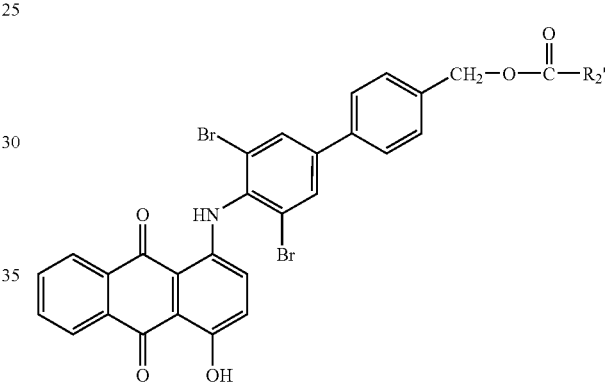

wherein $R_2'$ is a linear alkyl group having an average of about 50 carbon atoms.

* * * * *